(12) United States Patent
Navalgund et al.

(10) Patent No.: US 12,491,563 B2
(45) Date of Patent: Dec. 9, 2025

(54) APPARATUS, SYSTEMS, AND METHODS FOR MONITORING, ANALYZING, AND ADJUSTING ADDITIVE MACHINE AND BUILD HEALTH AND CONFIGURATION

(71) Applicant: General Electric Company, Schenectady, NY (US)

(72) Inventors: Megha Navalgund, Bengaluru (IN); Adam J. McCann, West Chester, OH (US); Thomas D. Citriniti, Niskayuna, NY (US); Kirk Lars Bruns, Niskayuna, NY (US); Saravana Kumar S, Bengaluru (IN); Hiroyuki Tanaka, Bavaria (DE); Venkata Dharma Surya Narayana Sastry Rachakonda, Bengaluru (IN); V S S Srivatsa Ponnada, Bengaluru (IN); Pär Arumskog, Gothenburg (SE); Simon Blomé, Mölnlycke (SE)

(73) Assignee: General Electric Company, Evendale, OH (US)

( * ) Notice: Subject to any disclaimer, the term of this patent is extended or adjusted under 35 U.S.C. 154(b) by 430 days.

(21) Appl. No.: 17/901,234

(22) Filed: Sep. 1, 2022

(65) Prior Publication Data

US 2023/0062971 A1    Mar. 2, 2023

Related U.S. Application Data

(60) Provisional application No. 63/239,729, filed on Sep. 1, 2021.

(51) Int. Cl.
*B22F 10/85*    (2021.01)
*B22F 10/34*    (2021.01)
(Continued)

(52) U.S. Cl.
CPC .............. *B22F 10/85* (2021.01); *B22F 10/34* (2021.01); *B22F 12/224* (2021.01); *B22F 12/67* (2021.01);
(Continued)

(58) Field of Classification Search
CPC ........ B22F 10/85; B22F 10/34; B22F 12/224; B22F 12/67; B22F 12/90; B22F 2999/00;
(Continued)

(56) References Cited

U.S. PATENT DOCUMENTS 8,706,436 B2    4/2014    Rose et al.
9,114,478 B2    8/2015    Scott et al.
(Continued)

FOREIGN PATENT DOCUMENTS

EP    3210697    8/2017
EP    3822725    5/2021
(Continued)

OTHER PUBLICATIONS

European Patent Office, "Extended European Search Report," issued in connection with application No. 22193380.7, dated Feb. 2, 2023, 9 pages.

*Primary Examiner* — Ziaul Karim
(74) *Attorney, Agent, or Firm* — Hanley, Flight & Zimmerman, LLC

(57) ABSTRACT

Systems, apparatus, computer-readable medium, and associated methods to monitor, analyze, and adjust at least one of 1) additive machine health and configuration or 2) build health and configuration are disclosed. An example apparatus includes an analytics processor, separate from and in a trusted relationship with an additive manufacturing machine building a part, to process, based on a trigger, data from monitoring of the additive manufacturing machine and the build of the part, the analytics processor including a hybrid (Continued)

model fusing additive process physics and data science to process the data to identify an abnormality in at least one of the build or the additive manufacturing machine and to adjust a configuration of the additive manufacturing machine during the build to address the abnormality.

20 Claims, 25 Drawing Sheets

(51) Int. Cl.
  *B22F 12/00* (2021.01)
  *B22F 12/67* (2021.01)
  *B22F 12/90* (2021.01)
  *B33Y 10/00* (2015.01)
  *B33Y 30/00* (2015.01)
  *B33Y 50/02* (2015.01)
(52) U.S. Cl.
  CPC .............. *B22F 12/90* (2021.01); *B33Y 50/02* (2014.12); *B33Y 10/00* (2014.12); *B33Y 30/00* (2014.12)
(58) Field of Classification Search
  CPC .......... B22F 10/10; B22F 10/28; B22F 10/31; B22F 10/32; B22F 10/368; B22F 10/37; B22F 12/41; B33Y 50/02; B33Y 10/00; B33Y 30/00; Y02P 10/25
  See application file for complete search history.

(56) References Cited

U.S. PATENT DOCUMENTS

| | | | |
|---|---|---|---|
| 9,507,555 B2 | 11/2016 | Liu et al. | |
| 10,124,537 B2 | 11/2018 | Schwarze et al. | |
| 10,207,489 B2 | 2/2019 | Dave et al. | |
| 10,328,636 B2 | 6/2019 | Versluys et al. | |
| 10,357,957 B2 | 7/2019 | Buller et al. | |
| 10,427,244 B2 | 10/2019 | Jakimov et al. | |
| 10,432,800 B1 | 10/2019 | Bae | |
| 10,478,892 B2 | 11/2019 | Mironets et al. | |
| 10,611,092 B2 | 4/2020 | Buller et al. | |
| 10,620,103 B2 | 4/2020 | Godfrey et al. | |
| 10,639,745 B2 | 5/2020 | Beckett et al. | |
| 10,719,929 B2 | 7/2020 | Craeghs et al. | |
| 10,744,598 B2 | 8/2020 | Hall | |
| 11,072,043 B2 | 7/2021 | Dave et al. | |
| 11,354,456 B2 | 6/2022 | Avdovic et al. | |
| 11,535,927 B2* | 12/2022 | Forseth | B22F 12/86 |
| 11,580,430 B2* | 2/2023 | Salasoo | G06N 20/00 |
| 2012/0310576 A1 | 12/2012 | Rose et al. | |
| 2015/0177158 A1* | 6/2015 | Cheverton | B29C 64/393 |
| | | | 700/119 |
| 2015/0312119 A1 | 10/2015 | Liu et al. | |
| 2016/0288414 A1* | 10/2016 | Ozbolat | C09D 11/30 |
| 2018/0036964 A1 | 2/2018 | DehghanNiri et al. | |
| 2018/0154484 A1 | 6/2018 | Hall | |
| 2019/0178755 A1 | 6/2019 | Lee et al. | |
| 2019/0325098 A1* | 10/2019 | Vernon | G06F 30/23 |
| 2020/0215415 A1* | 7/2020 | Bologna | A42B 3/128 |
| 2020/0221055 A1 | 7/2020 | Surana et al. | |
| 2020/0257933 A1* | 8/2020 | Steingrimsson | B22F 5/04 |
| 2020/0371509 A1* | 11/2020 | Mark | G05B 19/4183 |
| 2021/0146480 A1* | 5/2021 | Srivatsa | B23K 31/125 |
| 2021/0200906 A1 | 7/2021 | Fornander et al. | |
| 2021/0285952 A1* | 9/2021 | Lyden | G01N 33/574 |
| 2021/0342836 A1* | 11/2021 | Cella | G06N 7/01 |
| 2021/0362428 A1 | 11/2021 | Kothari et al. | |
| 2021/0394272 A1 | 12/2021 | Jones et al. | |
| 2022/0042924 A1 | 2/2022 | Beckett et al. | |
| 2022/0197306 A1* | 6/2022 | Cella | H04L 63/1441 |
| 2023/0083724 A1* | 3/2023 | Cella | G06Q 30/0206 |
| | | | 705/28 |

FOREIGN PATENT DOCUMENTS

| | | |
|---|---|---|
| JP | 2020075506 | 5/2020 |
| WO | 2016032075 | 3/2016 |
| WO | 2022046073 | 3/2022 |

* cited by examiner

| SENSOR | SPEC. LIMITS | MACHINE HEALTH IMPACT | TRACKED METRIC | LAYER ANOMALY DETECTION | HEALTH SCORE |
|---|---|---|---|---|---|
| RESIDUAL OXYGEN % | <1.5% | INERTIZATION LEAK | $C_{pu}$ | 1.67 (5σ) | ✓ |
| LASER RAIL TEMP. (°C) | <30 °C | CHILLER HEALTH | $C_{pu}$ | 1.67 (5σ) | ⚠ |
| DEW POINT TEMP. (°C) | <18 °C | PROCESS CHAMBER CONDITION | $\mu_i$ | 3σ / 18 | ✓ |
| ACTUAL HEATING TEMP (°C) | [60, 130] °C | HEATER CONDITION | $C_{pl}$ | 1 (3σ) / 1.67 (5σ) | ✗ |
| DIFFERENTIAL PRESSURE (MBAR) | < 50 MBAR | FILTER HEALTH | $MAX_j$ | 3σ / 50 | ✓ |

FIG. 9

APPARATUS, SYSTEMS, AND METHODS FOR MONITORING, ANALYZING, AND ADJUSTING ADDITIVE MACHINE AND BUILD HEALTH AND CONFIGURATION

CROSS-REFERENCE TO RELATED APPLICATIONS

This patent arises from U.S. Provisional Patent Application Ser. No. 63/239,729, which was filed on Sep. 1, 2021. U.S. Provisional Patent Application Ser. No. 63/239,729 is hereby incorporated herein by reference in its entirety. Priority to U.S. Provisional Patent Application Ser. No. 63/239,729 is hereby claimed.

FIELD

The present disclosure relates to systems, and methods for monitoring an additive manufacturing device, and more specifically, for monitoring, analyzing, and adjusting additive machine and build health and configuration.

BACKGROUND

In additive manufacturing processes such as melting of a powder layer to create an article, there exist some challenges to diagnose aborted or failed builds or identify performance issues of an additive manufacturing device. Specifically, an expert has to manually diagnose a build or the device, which requires a significant amount of time and human labor. In addition, finding a root cause of a failure of the additive manufacturing device is a difficult and time-consuming process, which is more or less impossible during a build.

BRIEF DESCRIPTION OF THE DRAWINGS

FIG. 9 shows an example listing of sensors and specified limit(s) associated with the respective sensor.

Figure 1:
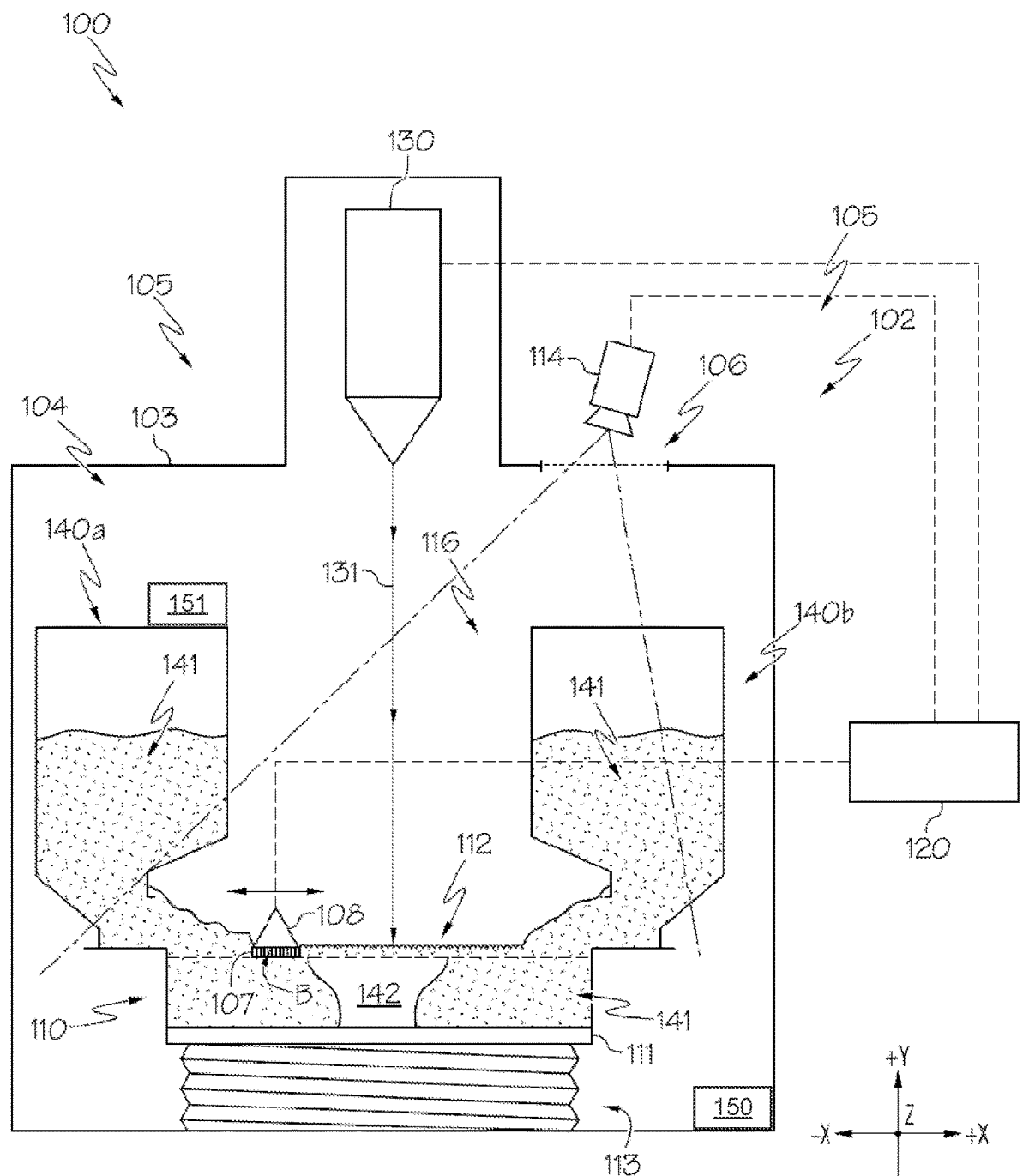
FIG. 1 depicts an additive manufacturing system of the present disclosure, according to one or more examples shown and described herewith.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Certain examples provide improved additive manufacturing and associated monitoring and control. Certain examples enable in situ monitoring and adjustment via a process and associated system that are separate from, yet connected to, the additive manufacturing machine or device. As such, an ongoing build process can proceed while analytics are processed in a separate device without introducing error, interruption, or other negative impact into the build. When the analysis of the separate device determines that an adjustment is warranted, the separate device interjects itself into the build and the additive manufacturing machine. Otherwise, processing load on the analysis device, storage of a volume of monitoring data on the analysis device, and modeling on the analysis device do not affect the ongoing operation of the additive manufacturing machine and its build. Memory-, processing-, and data-intensive tasks can be targeted and handled by the separate analysis device (e.g., one or more separate field programmable gate arrays (FPGAs), high-resolution imaging processors, other computing devices, etc.) without placing a load on the additive manufacturing device that can result in build error or failure. For example, the large amount of memory involved in storing monitoring data and establishing an environment for modeling of that data can result in buffer overflows, delays, and errors when forced into the same memory as the specifications and data, which are also very memory intensive, for an ongoing build on an additive manufacturing device. Thus, by separating the processes and the physical devices on which those processes execute, the integrity and quality of the build can be maintained and improved, rather than degraded. The ongoing build can be "walled off" from the modeling and analysis processing until the processing determines that an intervention is justified (e.g., based on score, type of error/abnormality/trend, timing, build type/quality, etc.). As such, the process of additive manufacturing is improved, the additive manufacturing device is improved, and the infrastructure or framework for additive manufacturing is improved in terms of speed, accuracy, stability, error reduction, and security, for example. These technical improvements are important and impactful to the viability and reliability of additive manufacturing of parts in industries such as aviation, automotive, power, etc.

Additive manufacturing is a process by which a three-dimensional structure is built, usually in a series of layers, based on a digital model of the structure. While some examples of additive manufacturing technology rely on sintering or melting/fusing using an energy source to form the structure, rather than "printing", in which material is deposited at select locations, the term "print" is often used to describe the additive manufacturing process (e.g., three-dimensional (3D) printing, 3D rapid prototyping, etc.). Examples of additive manufacturing techniques include Fused Deposition Modeling, Electron Beam Melting, Laminated Object Manufacturing, Selective Laser Sintering (including Direct Metal Laser Sintering, also referred to as Direct Metal Laser Melting or Selective Laser Melting), and Stereolithography, among others. Although 3D printing technology is continually developing, the process to build a structure layer-by-layer is complex, inefficient, and prone to failure. An error in the 3D process can lead to weakness or failure in the manufactured part and, therefore, waste, risk, and other unreliability. Thus, it may be necessary to diagnose a failure of the additive manufacturing device with reduced time and find a cause for the failure of the additive manufacturing device and associated solution.

Alternatively or additionally, a predictive trend can be identified with respect to health, calibration, etc., of the additive manufacturing device. In some examples, a health or calibration metric for the additive manufacturing device, may fall within acceptable/specified limits or margin for error. However, a trend can be determined which will result in that metric falling outside the limit. The predictive trend can be used to identify an error or issue in a component, setting, etc., so that the error/issue can be addressed before it becomes a problem that endangers the additive manufacturing device or associated build.

The phrase "additive manufacturing apparatus" is used interchangeably herein with the phrases "printing apparatus", "additive manufacturing device", "additive manufacturing machine", "additive machine", and the term "printer", and the term "print" is used interchangeably herein with the word "build", referring to an action to build a structure using an additive manufacturing apparatus, regardless of the particular additive manufacturing technology being used to form the structure. As used herein, print and printing refer to the various forms of additive manufacturing and include three-dimensional (3D) printing or 3D rapid prototyping, as well as sintering or melting/fusing technologies. Additive manufacturing systems may use an electron-beam or a laser beam to manufacture builds, for example. Additive manufacturing systems may include multiple electron-beam guns or laser designs. Examples of additive manufacturing or printing techniques include Fused Deposition Modeling, Electron Beam Melting, Laminated Object Manufacturing, Selective Laser Sintering (including Direct Metal Laser Sintering also referred to as Direct Metal Laser Melting or Selective Laser Melting), BinderJet (direct binder application), Direct Ceramic Additive Technology (also referred to as Ceramic Directed Light Projection), and Stereolithography, among others.

For example, selective laser melting (SLM), also known as direct metal laser melting (DMLM), Direct Metal Laser Sintering (DMLS), or laser powder bed fusion (LPBF), is a rapid prototyping, 3D printing, or additive manufacturing (AM) technique designed to use a high power-density laser to melt and fuse metallic powders together. The SLM process can fully melt the metal material into a solid three-dimensional part, for example.

SLM is a part of additive manufacturing in which a high power density laser is used to melt and fuse metallic powders together. With SLM, thin layers of atomized fine metal powder are evenly distributed onto a substrate plate (e.g., a metal, etc.) using a coating mechanism. The substrate plate is fastened to an indexing table that moves in the vertical (Z) axis. This takes place inside a chamber containing a tightly controlled atmosphere of inert gas, either argon or nitrogen at oxygen levels below 500 parts per million, for example. Once each layer has been distributed, each two-dimensional (2D) slice of the part geometry is fused by selectively melting the powder. Melting of the powder is accomplished with a high-power laser beam, such as an ytterbium (Yb) fiber laser with hundreds of watts, etc. The laser beam is directed in the X and Y directions with two high frequency scanning mirrors. The laser energy is intense enough to permit full melting (welding) of the particles to form solid metal. The process is repeated layer after layer until the part is complete.

Direct Metal Laser Melting (DMLM) or Direct Metal Laser Sintering (DMLS) are particular type(s) of SLM that use a variety of alloys and allows prototypes to be functional hardware made out of the same material as production components. Since the components are built layer by layer, it is possible to design organic geometries, internal features, and challenging passages that could not be cast or otherwise machined. For example, DMLS produces strong, durable metal parts that work well as functional prototypes and/or end-use production parts, for example.

In other examples, BinderJet deposits alternating layers of powder and liquid binder material to form a part. Direct Ceramic Additive Technology (DCAT, also referred to as Ceramic Directed Light Projection or Ceramic DLP) provides printing or building of parts using ceramics and directed light projection.

Objects are built directly from a file generated from CAD (computer-aided design) data. The DMLS process begins by slicing 3D CAD file data into layers (e.g., from 20 to 100 micrometers thick, 30-120 µm thick, 50-150 µm thick, etc.), creating a two-dimensional (2D) image of each layer. For example, a format of the 3D CAD file is a .stl file used on most layer-based 3D printing or stereolithography technologies. This file is then loaded into a file preparation software package that assigns parameters, values and physical supports that allow the file to be interpreted and built by different types of additive manufacturing machines, for example.

In DMLS/DMLM, use of a laser to selectively melt thin layers of tiny particles yields objects exhibiting fine, dense, and homogeneous characteristics. The DMLS machine uses a high-powered 200 watt Yb-fiber optic laser, for example. The machine includes a build chamber area including a material dispensing platform and a build platform along with a re-coater blade used to move new powder over the build platform. The technology fuses metal powder into a solid part by melting it locally using the focused laser beam. A melt pool is formed when the powder melts from exposure to the laser beam radiation. Parts are built up additively layer by layer (e.g., using layers 10 micrometers thick, 20 µm thick, 30 µm thick, 50 µm thick, etc.).

The DMLS process begins with a roller spreading a thin layer of metal powder on the print bed. Next, a laser is directed based on the CAD data to create a cross-section of the object by completely melting metal particles. The print bed is then lowered so the process can be repeated to create the next object layer. After all the layers are printed, the excess unmelted powder is brushed, blown, or blasted away. The object typically requires little, if any, finishing.

The machine can include and/or operate with monitoring and control systems and methods, such as iterative learning control, continuous autocalibration, and real-time melt pool monitoring, etc., to introduce a step change in the build process performance and stability, for example. Certain examples enable melt pool monitoring, iterative learning control, continuous auto-calibration, real-time melt pool control, filter monitoring, pump monitoring, jet application monitoring, cathode and beam monitoring, etc.

Other additive manufacturing methods, such as Electron Beam Melting (EBM), can be used for crack-prone metal alloys, such as titanium, etc. With EBM, high-performance electron beam sources and in-situ process monitoring using "self-generated" x-ray imaging and backscatter electron technologies can be used for improved quality control. A binder jet allows fast printing at lower cost with novel support structure designs and clean-burning binders to solve two key technology challenges of sintering distortion and material properties to enable additive manufacturing for automotive, other transportation solutions, powder generation, etc. EBM utilizes a raw material in the form of a metal powder or a metal wire, which is placed under a vacuum (e.g., within a vacuum sealed build chamber). Generally speaking, the raw material is fused together from heating via an electron beam.

Systems that utilize EBM generally obtain data from a 3D computer-aided design (CAD) model and use the data to place successive layers of the raw material using an apparatus to spread the raw material, such as a powder distributor. The successive layers are melted together utilizing a computer-controlled electron beam. As noted above, the process takes place under vacuum within a vacuum sealed build chamber, which makes the process suited to manufacture parts using reactive materials having a high affinity for oxygen (e.g., titanium). In certain examples, the process operates at higher temperatures (up to about 1,200° C.) relative to other additive manufacturing processes, which can lead to differences in phase formation though solidification and solid-state phase transformation.

Examples described herein are applicable to other additive manufacturing modalities employing other types of additive manufacturing devices beyond those disclosed herein. For example, directed energy deposition (DED), direct ceramic, BinderJet, stereolithography, photopolymerization, etc., can benefit from the monitoring, analysis, and correction described herein.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module," "engine," "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

The present disclosure generally relates to devices, systems, and methods for monitoring, determining, and adjusting health of an additive manufacturing device and/or an associated process, build, etc. Example systems and methods obtain data for a build, process, machine configuration, etc., and ingest, fuse, analyze, and aggregate the data for state determination and analytics analysis. Such methods may include consideration and analysis of actual sensor data from machine or process, as well as metadata derived from statistical process control or other quality scoring, for example. Certain examples determine build, process, and/or machine health, on a layerwise and/or overall basis without requiring manual analysis. In addition, the systems and methods according to the present disclosure enhance the accuracy of diagnosing builds and/or additive manufacturing devices using analytics containers and specialized computing hardware to provide actionable output (e.g., to correct a build, adjust an additive manufacturing device and/or associated process, etc.).

FIG. 1 depicts an additive manufacturing device of the present disclosure, according to one or more examples shown and described herewith. As shown in FIG. 1, an additive manufacturing system 100 (also referred to herein as an additive manufacturing device, an additive manufacturing machine, an additive machine, etc.) includes at least a build chamber 102, an imaging device 114, and a control component 120. The build chamber 102 defines an interior 104 that is separated from an exterior environment 105 via one or more chamber walls 103. In some examples, at least a portion of the one or more chamber walls 103 of the build chamber 102 may include a window 106 therein. The imaging device 114 is generally located adjacent to the build chamber 102 in the exterior environment 105 (i.e., not located within the interior 104 of the build chamber 102), and is arranged such that a field of view 116 of the imaging device 114 extends through the window 106 into the interior 104 of the chamber.

In some examples, the interior 104 of the build chamber 102 may be a vacuum sealed interior such that an article 142 formed within the build chamber 102 is formed under optimal conditions for EBM or DMLM, as is generally understood. The build chamber 102 is capable of maintaining a vacuum environment via a vacuum system. Illustrative vacuum systems may include, but are not limited to, a turbo molecular pump, a scroll pump, an ion pump, and one or more valves, as are generally understood. In some examples, the vacuum system may be communicatively coupled to the control component 120 such that the control component 120 directs operation of the vacuum system to maintain the vacuum within the interior 104 of the build chamber 102. In some examples, the vacuum system may maintain a base pressure of about $1\times10^{-5}$ mbar or less throughout an entire build cycle. In further examples, the vacuum system may provide a partial pressure of He or other reactive or inert control gas to about $2\times10^{-3}$ mbar during a melting process.

In other examples, the build chamber 102 may be provided in an enclosable chamber provided with ambient air and atmosphere pressure. In yet other examples, the build chamber 102 may be provided in open air.

The build chamber 102 generally includes within the interior 104 a powder bed 110 supporting a powder layer 112 thereon, as well as a powder distributor 108. In some examples, the build chamber 102 may further include one or more raw material hoppers 140a, 140b that maintain raw material 141 therein. In some examples, the build chamber 102 may further include an emitter 130. The build chamber 102 may further include other components, particularly components that facilitate EBM or DMLM, including components not specifically described herein.

The powder bed 110 is generally a platform or receptacle located within the interior 104 of the build chamber 102 that is arranged to receive the raw material 141 from the one or more raw material hoppers 140a, 140b. The powder bed 110 is not limited in size or configuration by the present disclosure, but may generally be shaped and sized to hold an amount of the raw material 141 from the raw material hoppers 140a, 140b in the form of the powder layer 112, one or more portions of article 142, and/or unfused raw material 141, as described in greater detail herein.

In some examples, the powder bed 110 may include a movable build platform 111 supported by a lifting component 113. The movable build platform 111 may generally be a surface within the powder bed 110 that is movable by the lifting component 113 in a system vertical direction (e.g., in the +y/−y directions of the coordinate axes of FIG. 1) to increase and/or decrease a total volume of the powder bed 110. For example, the movable build platform 111 within the powder bed 110 may be movable by the lifting component 113 in a downward direction (e.g., toward the −y direction of the coordinate axes of FIG. 1) so as to increase the volume of the powder bed 110. In addition, the movable build platform 111 may be movable by the lifting component 113 to add each successive powder layer 112 to the article 142 being formed, as described in greater detail herein.

The lifting component 113 is not limited by the present disclosure, and may generally be any device or system capable of being coupled to the movable build platform 111 and movable to raise or lower the movable build platform 111 in the system vertical direction (e.g., in the +y/−y directions of the coordinate axes of FIG. 1). In some examples, the lifting component 113 may utilize a linear actuator type mechanism to effect movement of the movable build platform 111. Illustrative examples of devices or systems suitable for use as the lifting component 113 include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some examples, the lifting component 113 may be located within the build chamber 102. In other examples, the lifting component 113 may be only partially located within the build chamber 102, particularly in examples in which it may be desirable to isolate portions of the lifting component 113 that are sensitive to the harsh conditions (high heat, excessive dust, etc.) within the interior 104 of the build chamber 102.

The powder distributor 108 is generally arranged and configured to lay down and/or spread a layer of the raw material 141 as the powder layer 112 in the powder bed 110 (e.g., on start plate or build platform 111 within the powder bed). That is, the powder distributor 108 is arranged such that movement of the powder distributor 108 is in a horizontal plane defined by the x-axis and the z-axis of the coordinate axes depicted in FIG. 1. For example, the powder distributor 108 may be an arm, rod, or the like that extends a distance in the z direction of the coordinate axes of FIG. 1 over or above the powder bed 110 (e.g., from a first end to a second end of the powder bed 110). In some examples, the length of the powder distributor 108 may be longer than a width of the build platform 111 such that the powder layer 112 can be distributed on each position of the build platform 111. In some examples, the powder distributor 108 may have a central axis in parallel with a top surface of the build platform 111 (e.g., generally parallel to the +x/−x axis of the coordinate axes of FIG. 1). One or more motors, actuators, and/or the like may be coupled to the powder distributor 108 to effect movement of the powder distributor 108. For example, a rack and pinion actuator may be coupled to the powder distributor 108 to cause the powder distributor 108 to move back and forth over the powder bed in the +x/−x directions of the coordinate axes of FIG. 1, as indicated by the double sided arrow depicted above the powder distributor 108 in FIG. 1. In some examples, movement of the powder distributor 108 may be continuous (e.g., moving without stopping, other than to change direction). In other examples, movement of the powder distributor 108 may be stepwise (e.g., moving in a series of intervals). In yet other examples, movement of the powder distributor 108 may be such that a plurality of interruptions occur between periods of movement.

As described in greater detail herein, the powder distributor may further include one or more teeth (e.g., rake fingers or the like) that extend from the powder distributor 108 into the raw material 141 from the raw material hoppers 140a, 140b to cause disruption of the raw material 141 when the powder distributor 108 moves (e.g., to distribute the raw material 141, to spread the powder layer 112, etc.).

In some examples, the powder distributor 108 includes a plurality of rake teeth 107 extending from a bottom surface B of the powder distributor 108 (e.g., extending generally towards the −y direction of the coordinate axes of FIG. 1). In some examples, the rake teeth 107 may extend in a direction that is substantially perpendicular to a plane of the build platform 111 (e.g., perpendicular to the plane formed by the x-axis and z-axis of the coordinate axes depicted in FIG. 1). In another example, the rake teeth 107 may be slanted with respect to the build platform 111. An angle a of the slanted rake teeth 107 with respect to a normal to the build platform may be any value, and, in some examples, is between about 0 and about 45°.

In some examples, each one of the plurality of rake teeth 107 may be a metal foil or a metal sheet. The total length of the plurality of rake teeth 107 may be longer than a width of the build platform 111 in order to make it possible to distribute powder on each position of the build platform 111. The rake teeth 107 may be shaped and sized to rake through the raw material 141 to distribute the powder layer 112 on the build platform 111. Some examples may not include rake teeth 107.

It should be understood that while the powder distributor 108 described herein generally extends a distance in the x direction of the coordinate axes depicted in FIG. 1 and moves in the +x/−x directions of the coordinate axes depicted in FIG. 1 to spread the powder layer 112 as described above, this is merely one illustrative example. Other configurations are also contemplated. For example, the powder distributor 108 may rotate about an axis to spread the powder layer 112, may articulate about one or more joints or the like to spread the powder layer 112, and/or the like without departing from the scope of the present disclosure.

In some examples, a cross section of the powder distributor 108 may be generally triangular, as depicted in FIG. 1. However, it should be understood that the cross section may be any shape, including but not limited to, circular, elliptical, quadratic, rectangular, polygonal or the like. A height of the powder distributor 108 may be set in order to give the powder distributor 108 a particular mechanical strength in the system vertical direction (e.g., along the +y/−y axis of the coordinate axes of FIG. 1). That is, in some examples, the powder distributor 108 may have a particular controllable flex in the system vertical direction. The height of the powder distributor may also be selected considering that the powder distributor 108 pushes an amount of the raw material 141. If the height of the powder distributor 108 is too small, the powder distributor 108 can only push forward a smaller amount relative to a higher power powder distributor 108. However, if the height of the powder distributor 108 is too high, the powder distributor 108 may complicate the powder catching from a scree of powder, (e.g., the higher the height of the powder distributor 108, the more force may be required in order to catch a predetermined amount of powder from the scree of powder by moving the powder distributor 108 into the scree of powder and letting a predetermined amount of powder fall over the top of the powder distributor 108 from a first side in the direction of travel into the scree of powder to a second side in the direction of the build platform 111). In still yet other examples, the height of the powder distributor 108 may be such that areas adjacent to both a leading edge and a trailing edge of the powder distributor 108 are within a field of view 116 of the imaging device 114, as described herein.

In some examples, the powder distributor 108 may be communicatively coupled to the control component 120, as depicted by the dashed line in FIG. 1 between the powder distributor 108 and the control component 120. As used herein, the term "communicatively coupled" generally refers to any link in a manner that facilitates communications. As such, "communicatively coupled" includes both wireless and wired communications, including those wireless and wired communications now known or later developed. As the powder distributor 108 is communicatively coupled to the control component 120, the control component 120 may transmit one or more signals, data, and/or the like to cause the powder distributor 108 to move, change direction, change speed, and/or the like. For example, a "reverse direction" signal transmitted by the control component 120 to the powder distributor 108 may cause the powder distributor 108 to reverse the direction in which it is moving (e.g., reverse movement in the +x direction to movement in the −x direction).

Each of the raw material hoppers 140a, 140b may generally be containers that hold an amount of the raw material 141 therein and contain an opening to dispense the raw material 141 therefrom. While FIG. 1 depicts two raw material hoppers 140a, 140b, the present disclosure is not limited to such. That is, any number of raw material hoppers may be utilized without departing from the scope of the present disclosure. Further, while FIG. 1 depicts the raw material hoppers 140a, 140b as being located within the interior 104 of the build chamber 102, the present disclosure is not limited to such. That is, the raw material hoppers 140a, 140b may be located outside or partially outside the build chamber 102 in various other examples. However, it should be understood that if a raw material hopper is located outside or partially outside the build chamber 102, one or more outlets of the raw material hoppers that supply the raw material 141 may be selectively sealed when not distributing the raw material 141 in order to maintain the vacuum within the build chamber 102.

The shape and size of the raw material hoppers 140a, 140b are not limited by the present disclosure. That is, the raw material hoppers 140a, 140b may generally have any shape and or size without departing from the scope of the present disclosure. In some examples, each of the raw material hoppers 140a, 140b may be shaped and or sized to conform to the dimensions of the build chamber 102 such that the raw material hoppers 140a, 140b can fit inside the build chamber. In some examples, the raw material hoppers 140a, 140b may be shaped and sized such that a collective volume of the raw material hoppers 140a, 140b is sufficient to hold an amount of raw material 141 that is necessary to fabricate the article 142, which includes a sufficient amount of material to form each successive powder layer 112 and additional material that makes up the unfused raw material 141.

The raw material hoppers 140a, 140b may generally have an outlet for ejecting the raw material 141 located within the raw material hoppers 140a, 140b such that the raw material 141 can be spread by the powder distributor 108, as described herein. In some examples, such as the example depicted in FIG. 1, the raw material 141 may freely flow out of the raw material hoppers 140a, 140b under the force of gravity, thereby forming piles or scree of raw material 141 for the powder distributor 108 to spread. In other examples, the outlets of the raw material hoppers 140a, 140b may be selectively closed via a selective closing mechanism so as to only distribute a portion of the raw material 141 located within the respective raw material hoppers 140a, 140b at a particular time. The selective closing mechanisms may be communicatively coupled to the control component 120 such that data and/or signals transmitted to/from the control component 120 can be used to selectively open and close the outlets of the raw material hoppers 140a, 140b.

The raw material 141 contained within the raw material hoppers 140a, 140b and used to form the article 142 is not limited by the present disclosure, and may generally be any raw material used for EBM or DMLM now known or later developed. Illustrative examples of raw material 141 includes, but is not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material 141 include, but are not limited to, Ti6Al4V titanium alloy, Ti6Al4V ELI titanium alloy, Grade 2 titanium, and ASTM F75 cobalt-chrome (all available from Arcam AB, Mölndal, Sweden). Another specific example of raw material 141 is INCONEL® alloy 718 available from Special Metals Corporation (Huntington W. Va.).

In certain examples, the raw material 141 is pre-alloyed, as opposed to a mixture. This may allow classification of EBM or DMLM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

The emitter 130 is generally a device that emits an electron beam (e.g., a charged particle beam), such as, for example, an electron gun, a linear accelerator, or the like. The emitter 130 generates an energy beam 131 that may be used for melting or fusing together the raw material 141 when spread as the powder layer 112 on the build platform 111. In some examples, the emitter 130 may include at least one focusing coil, at least one deflection coil and an electron beam power supply, which may be electrically connected to an emitter control unit. In one illustrative example, the emitter 130 generates a focusable electron beam with an accelerating voltage of about 60 kilovolts (kV) and with a beam power in the range of about 0 kilowatts (kW) to about 10 kW. The pressure in the vacuum chamber may be in the range of about $1\times10^{-3}$ mBar to about $1\times10^{-6}$ mBar when building the article 142 by fusing each successive powder layer 112 with the energy beam 131. The emitter 130 may sit in a gun vacuum chamber. The pressure in the gun vacuum chamber may be in the range of about $1\times10^{-4}$ mBar to about $1\times10^{-7}$ mBar. In some examples, the emitter 130 may emit a laser beam using direct metal laser melting (DMLM). The emitter 130 may emit laser to melt ultra-thin layers of metal powder to build a three-dimensional object. When using DMLM, a gas flow may be provided over a build in contrast with electron beam melting manufacturing that requires a vacuum chamber.

In some examples, the emitter 130 may be communicatively coupled to the control component 120, as indicated in FIG. 1 by the dashed line between the emitter 130 and the control component 120. The communicative coupling of the emitter 130 to the control component 120 may provide an ability for signals and/or data to be transmitted between the emitter 130 and the control component 120, such as control signals from the control component 120 that direct operation of the emitter 130.

Still referring to FIG. 1, the imaging device 114 is generally located in the exterior environment 105 outside the build chamber 102, yet positioned such that the field of view 116 of the imaging device 114 is through the window 106 of the build chamber 102. The imaging device 114 is generally positioned outside the build chamber 102 such that the harsh environment within the interior 104 of the build chamber 102 does not affect operation of the imaging device 114. That is, the heat, dust, metallization, x-ray radiation, and/or the like that occurs within the interior 104 of the build chamber 102 will not affect operation of the imaging device 114. In some examples, the imaging device 114 is fixed in position such that the field of view 116 remains constant (e.g., does not change). Moreover, the imaging device 114 is arranged in the fixed position such that the field of view 116 of the imaging device 114 encompasses an entirety of the powder bed 110. That is, the imaging device 114 is capable of imaging the entire powder bed 110 within the build chamber 102 through the window 106.

In some examples, the imaging device 114 is a device particularly configured to sense electromagnetic radiation, particularly heat radiation (e.g., thermal radiation) that is generated by the various components within the powder bed 110 (e.g., the powder layer 112, the raw material 141, and/or the article 142). Thus, the imaging device 114 may generally be a device particularly tuned or otherwise configured to obtain images in spectra where heat radiation is readily detected, such as the visible spectrum and the infrared spectrum (including the far infrared and the near infrared spectrum). As such, one illustrative example of a device particularly tuned or otherwise configured to obtain images in spectra where heat radiation includes, but is not limited to, an infrared camera. In some examples, the imaging device 114 may be a camera that is sensitive within a range of wavelengths of about 1 micrometer (μm) to about 14 μm, including about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 µm, or any value or range between any two of these values (including endpoints). As such, the imaging device 114 is suitable for imaging temperatures which occur during EBM or DMLM of the powder layer 112. In some examples, the wavelength sensitivity of the imaging device 114 may be selected in accordance with the type of raw material used. Illustrative examples of suitable devices that may be used for the imaging device 114 include, but are not limited to, an IR-camera (Infrared-camera), NIR-camera (Near Infrared-camera), a VISNIR-camera (Visual Near Infrared-camera), a CCD camera (Charged Coupled Device-camera), a line-scan camera, and a CMOS-camera (Complementary Metal Oxide Semiconductor-camera).

In some examples, the imaging device 114 may be an area scan camera that is capable of providing data specific to one or more regions of interest within the field of view 116, including regions of interest that move within the field of view 116. That is, an area scan camera includes a matrix of pixels that allows the device to capture a 2D image in a single exposure cycle with both vertical and horizontal elements. Area scan cameras can further be used to obtain a plurality of successive images, which is useful when selecting regions of interest within the field of view 116 and observing a change in the regions of interest, as described in greater detail herein. Illustrative examples of such area scan cameras include those available from Basler AG (Ahrensburg, Germany), JAI Ltd. (Yokohama, Japan), National Instruments (Austin, Tex.), and Stemmer Imaging (Puchheim, Germany). In some examples, the imaging device 114 may be a line scan camera that can be used for jet pattern detection and/or power deposition anomaly detection for short feed, clumping, pushing, etc.

In some examples, the imaging device 114 may have a monochrome image sensor. In other examples, the imaging device 114 may have a color image sensor. In various examples, the imaging device 114 may include one or more optical elements, such as lenses, filters, and/or the like. In a particular example, the imaging device 114 may include a Bayer filter. As is generally understood, a Bayer filter is a color filter array (CFA) for arranging RGB color filters on a square grid of photosensors to create a color image, such as a filter pattern of about 50% green, about 25% red, and about 25% blue.

In some examples, the imaging device 114 may further be a device particularly configured to provide signals and/or data corresponding to the sensed electromagnetic radiation to the control component 120. As such, the imaging device 114 may be communicatively coupled to the control component 120, as indicated by the dashed lines depicted in FIG. 1 between the imaging device 114 and the control component 120.

It should be understood that, by locating the imaging device 114 in the exterior environment 105 outside the interior 104 of the build chamber 102, it is possible to easily retrofit existing build chambers having windows in the chamber walls 103 therein with a kit that includes the imaging device 114 so as to upgrade the existing build chambers with the capabilities described herein.

The control component 120 (also referred to as the additive machine controller) is generally a device that is communicatively coupled to one or more components of the additive manufacturing system 100 (e.g., the powder distributor 108, the imaging device 114, and/or the emitter 130) and is particularly arranged and configured to transmit and/or receive signals and/or data to/from the one or more components of the additive manufacturing system 100, such as the imaging device 114, one or more sensors 150-151 (residual oxygen percentage sensor, laser rail temperature sensor, dew point temperature sensor, heating temperature sensor, differential pressure sensor, etc.) positioned with respect to (e.g., on or within components of) the additive manufacturing system 100 to record temperature, motion, vibration, power, etc.

Figure 2:
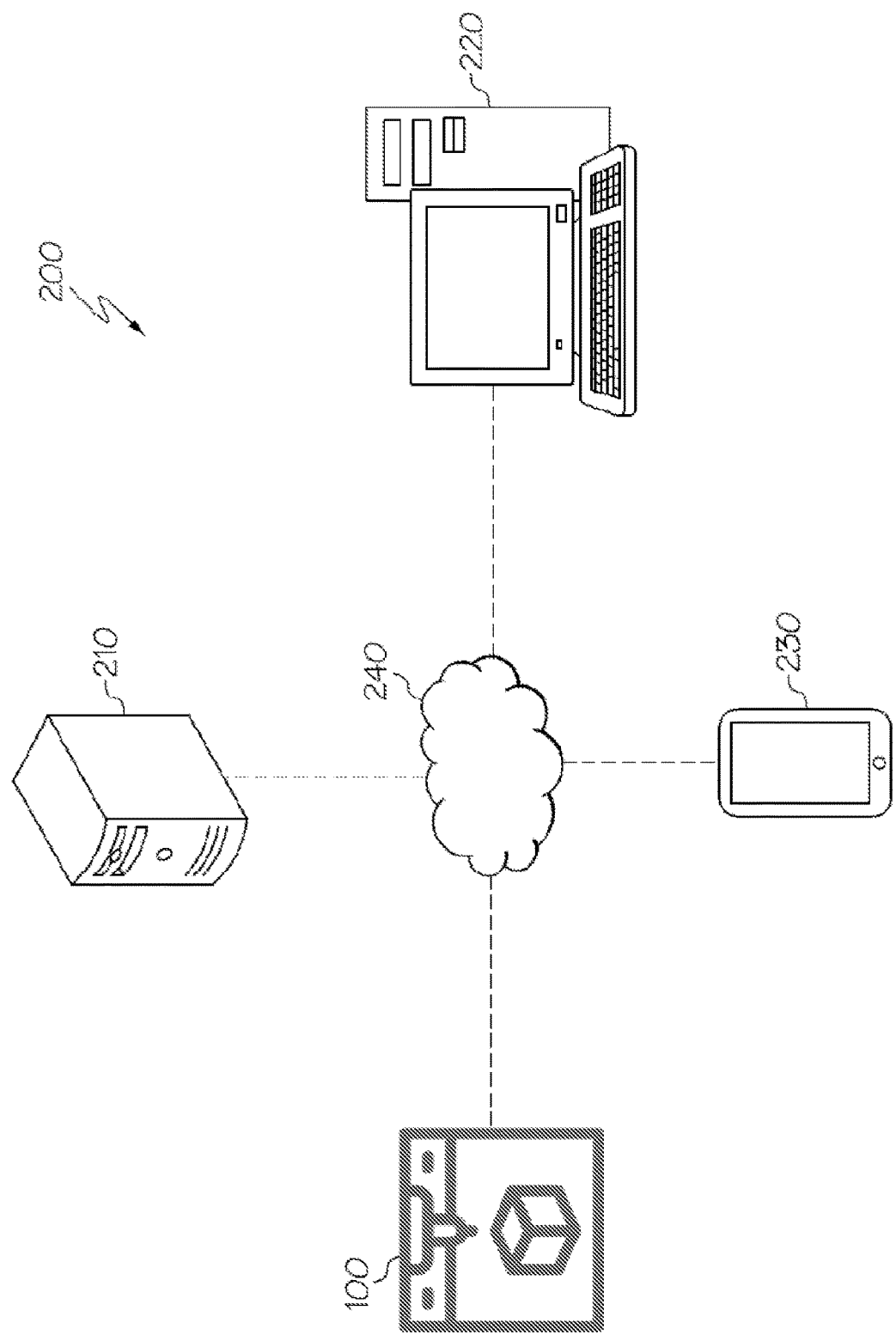
FIG. 2 is a block diagram of an example system according to one or more examples shown and described herein.

FIG. 2 is a block diagram of an example architecture 200 according to one or more examples shown and described herein. In certain examples, the architecture or infrastructure 200 can include the additive manufacturing machine 100, a server 210, a user computing device 220, and a mobile computing device 230. One or more of the server 210, the user computing device 220, or the mobile computing device 230 can implement the additive machine controller 120, for example. The additive manufacturing machine 100 (also referred to herein as an additive machine, additive manufacturing system, additive manufacturing device, and/or additive manufacturing apparatus) can be communicatively coupled to the server 210, the user computing device 220, and the mobile computing device 230 by a network 240. In certain examples, the network 240 can include one or more computer networks (e.g., a personal area network, a local area network, or a wide area network), cellular networks, satellite networks and/or a global positioning system and combinations thereof. Accordingly, the user computing device 220 can be communicatively coupled to the network 240 via a wide area network, via a local area network, via a personal area network, via a cellular network, via a satellite network, etc. Suitable local area networks can include wired Ethernet and/or wireless technologies such as, for example, wireless fidelity (Wi-Fi). Suitable personal area networks can include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

In certain examples, the additive manufacturing system 100 can transmit captured information such as images, sensor signals (e.g., open platform connections unified architecture (OPC UA) signals, etc.), build states, log files, etc., related to builds to the server 210, the user computing device 220, and/or the mobile computing device 230. The log files can include a plurality of parameters that are output from a plurality of subsystems of the additive manufacturing system 100 such as a vacuum system, a beam system, a powder layering system, and the like. The plurality of parameters may be raw data output from the additive manufacturing system 100, or parameters further processed based on machine operations. For example, parameters can be processed based on domain knowledge and/or one or models, such as physics-based, statistical, and/or mathematical models, to generate new features and/or parameters. The combination and analysis of multiple machine functions and metadata can identify, for example, parameter issues affecting a machine, process, build, etc. For example, smoke and/or soot deposition can be detected, which indicates an inadequate gas flow, incorrect speed/beam/power parameter(s) (e.g., set too high, etc.), etc. Machine health and process data can together indicate an effect on build and part quality. The image data and/or log files can be stored in the server 210, the user computing device 220, and/or the mobile computing device 230.

The server 210 generally includes processors, memory, and chipsets for delivering resources via the network 240. Resources can include providing, for example, processing, storage, software, and information from the server 210 to the user computing device 220 via the network 240. The server 210 can store and/or dynamically compute machine learning models or statistical models on parameters/features from the additive manufacturing system 100. The user computing device 220 generally includes processors, memory, and chipsets for communicating data via the network 240.

Referring to FIG. 2, the mobile computing device 230 can be any device having hardware (e.g., chipsets, processors, memory, etc.) for communicatively coupling with the network 240. Specifically, the mobile computing device 230 can include an antenna for communicating over one or more of the wireless computer networks described above. Moreover, the mobile computing device 230 can include a mobile antenna for communicating with the network 240. Accordingly, the mobile antenna may be configured to send and receive data according to a mobile telecommunication standard of any generation (e.g., 1G, 2G, 3G, 4G, 5G, etc.). Specific examples of the mobile computing device 230 include, but are not limited to, smart phones, tablet devices, e-readers, laptop computers, or the like. The mobile computing device 230 can have a display similar to the display device 408 of the user computing device 220 and display user interfaces.

Referring to FIG. 2, the network 240 generally includes a plurality of base stations that are configured to receive and transmit data according to mobile telecommunication standards. The base stations are further configured to receive and transmit data over wired systems such as public switched telephone network (PSTN) and backhaul networks. The network 240 can further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Figure 3:
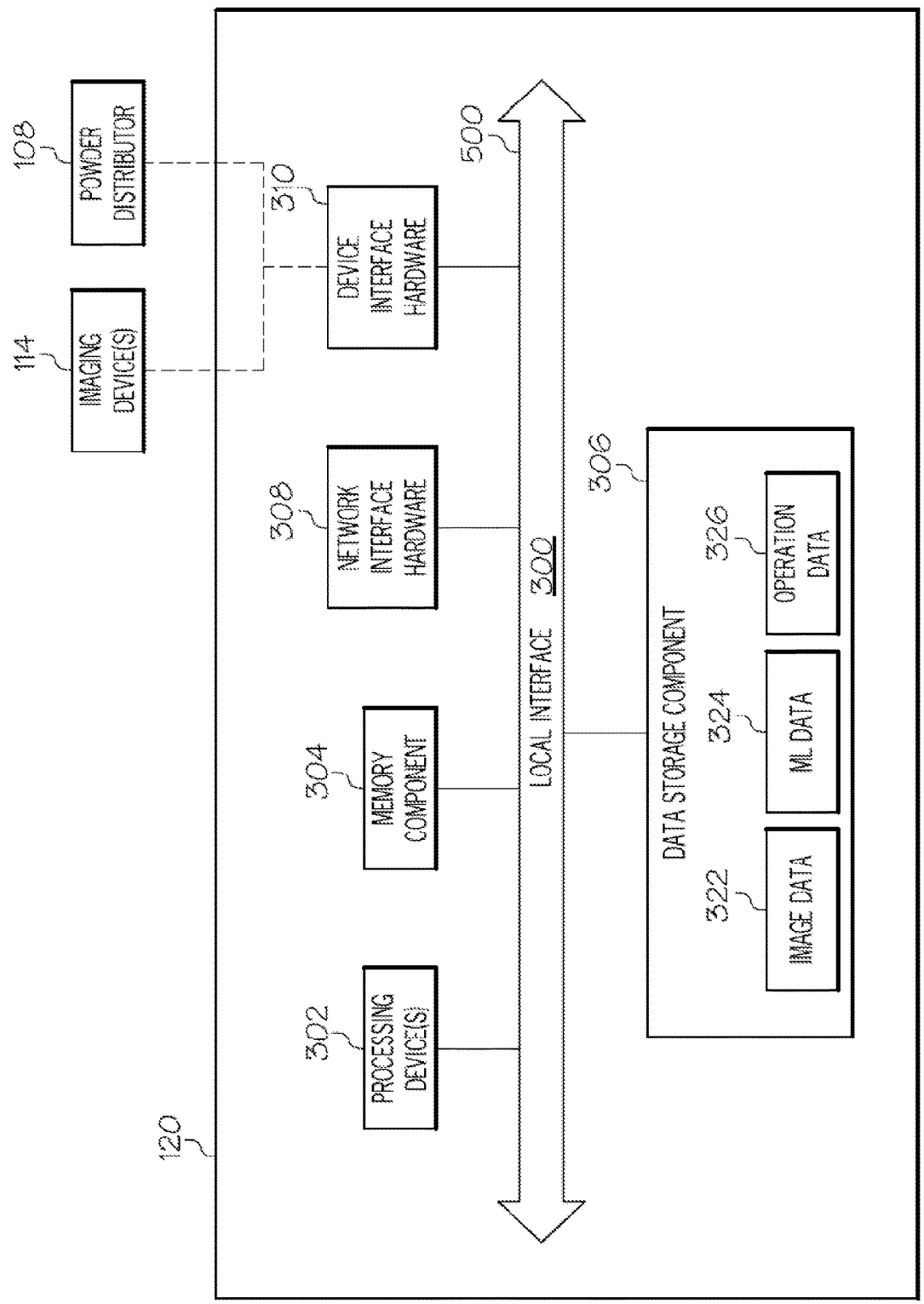
FIG. 3 depicts various internal components of a control component of an additive manufacturing system, according to one or more examples shown and described herein.

Turning to FIG. 3, the various internal components of the control component, also referred to herein as an additive machine controller, 120 depicted in FIG. 1 are shown. Particularly, FIG. 3 depicts various system components for collecting parameters and images for operating the additive manufacturing system 100, analyzing parameters and image data and/or assisting with the control of various components of the additive manufacturing system 100 depicted in FIG. 1.

As illustrated in FIG. 3, the additive machine controller 120 can include one or more processing devices 302, a non-transitory memory component 304, network interface hardware 308, device interface hardware 310, and a data storage component 306, all of which are interconnected by a local interface 300, such as a bus or the like.

The one or more processing devices 302, such as a computer processing unit (CPU), may be the central processing unit of the additive machine controller 120, performing calculations and logic operations to execute a program. The one or more processing devices 302, alone or in conjunction with the other components, are illustrative processing devices, computing devices, processors, or combinations thereof. The one or more processing devices 302 can include any processing component configured to receive and execute instructions (such as from the data storage component 306 and/or the memory component 304).

The memory component 304 can be configured as a volatile and/or a nonvolatile computer-readable medium and, as such, can include random access memory (including SRAM, DRAM, and/or other types of random access memory), read only memory (ROM), flash memory, registers, compact discs (CD), digital versatile discs (DVD), and/or other types of storage components. The memory component 304 can include one or more programming instructions thereon that, when executed by the one or more processing devices 302, cause the one or more processing devices 302 to complete various processes.

Still referring to FIG. 3, the programming instructions stored on the memory component 304 can be embodied as a plurality of software logic modules, where each logic module provides programming instructions for completing one or more tasks.

Still referring to FIG. 3, the network interface hardware 308 can include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 308 can be used to facilitate communication between the additive manufacturing system 100 and external devices such as the server 210, the user computing device 220, the mobile computing device 230 and the like via a network 240 as shown in FIG. 2.

Referring to FIG. 3, the device interface hardware 310 can communicate information between the local interface 300 and one or more components of the additive manufacturing system 100 of FIG. 1. For example, the device interface hardware 310 can act as an interface between the local interface 300 and the imaging device 114 of FIG. 1, the powder distributor 108, and/or the like. In some examples, the device interface hardware 310 can transmit or receive signals and/or data to/from the imaging device 114 of FIG. 1 and/or other sensors.

Still referring to FIG. 3, the data storage component 306, which may generally be a storage medium, can contain one or more data repositories for storing data that is received and/or generated. The data storage component 306 can be any physical storage medium, including, but not limited to, a hard disk drive (HDD), memory, removable storage, and/or the like. While the data storage component 306 is depicted as a local device, it should be understood that the data storage component 306 can be a remote storage device, such as a server computing device, cloud based storage device, or the like. Illustrative data that can be contained within the data storage component 306 includes, but is not limited to, image data 322, machine learning (ML) data 324, and/or operation data 326. The image data 322 can generally be data that is used by the control component 120 to recognize particular objects, determine one or more points on the powder layer 112 (FIG. 1), monitor an amount of electromagnetic radiation at the one or more points, determine a change in electromagnetic radiation, and/or the like. For example, the additive machine controller 120 can access the image data 322 to obtain a plurality of images received from the imaging device 114, determine an amount of electromagnetic radiation from the image data 322, and generate one or more commands accordingly.

Still referring to FIG. 3, the ML data 324 can be data that is generated as a result of one or more machine learning processes or statistical modelling processes used to determine features of the powder layer 112 (FIG. 1) from the image data 322. Still referring to FIG. 3, the operation data 326 can include parameters output from a plurality of subsystems from the additive manufacturing system 100. For example, the operation data 326 can include parameters output from a vacuum system, an inertization system, a beam system, a powder layering system, and the like. Specifically, parameters for the beam system can include, but are not limited to, a maximum power supply voltage, a minimum power supply voltage, a filament burn time, an average preheat grid voltage, a grid voltage drop after arctrip, an average cathode power, an average effective work function, an average smoke count, a smoke warning, an average column pressure, a number of arc trips, a maximum deviation in grid voltage, a grid voltage at 2 mA, and the like. Parameters for the vacuum system can include, but are not limited to, a maximum chamber pressure, a minimum chamber pressure, a maximum column pressure, a minimum column pressure, a vacuum failure error, an average variation in chamber vacuum, a minimum helium supply line pressure, an average current in chamber turbo pump, an average current in column turbo pump, a turbo pump idle duration, an average internal circuit temperature, an average incoming cooling water temperature, and the like.

It should be understood that the components illustrated in FIG. 3 are merely illustrative and are not intended to limit the scope of this disclosure. More specifically, while the components in FIG. 3 are illustrated as residing within the additive machine controller 120, this is a non-limiting example. In some examples, one or more of the components can reside external to the additive machine controller 120.

Figure 4:
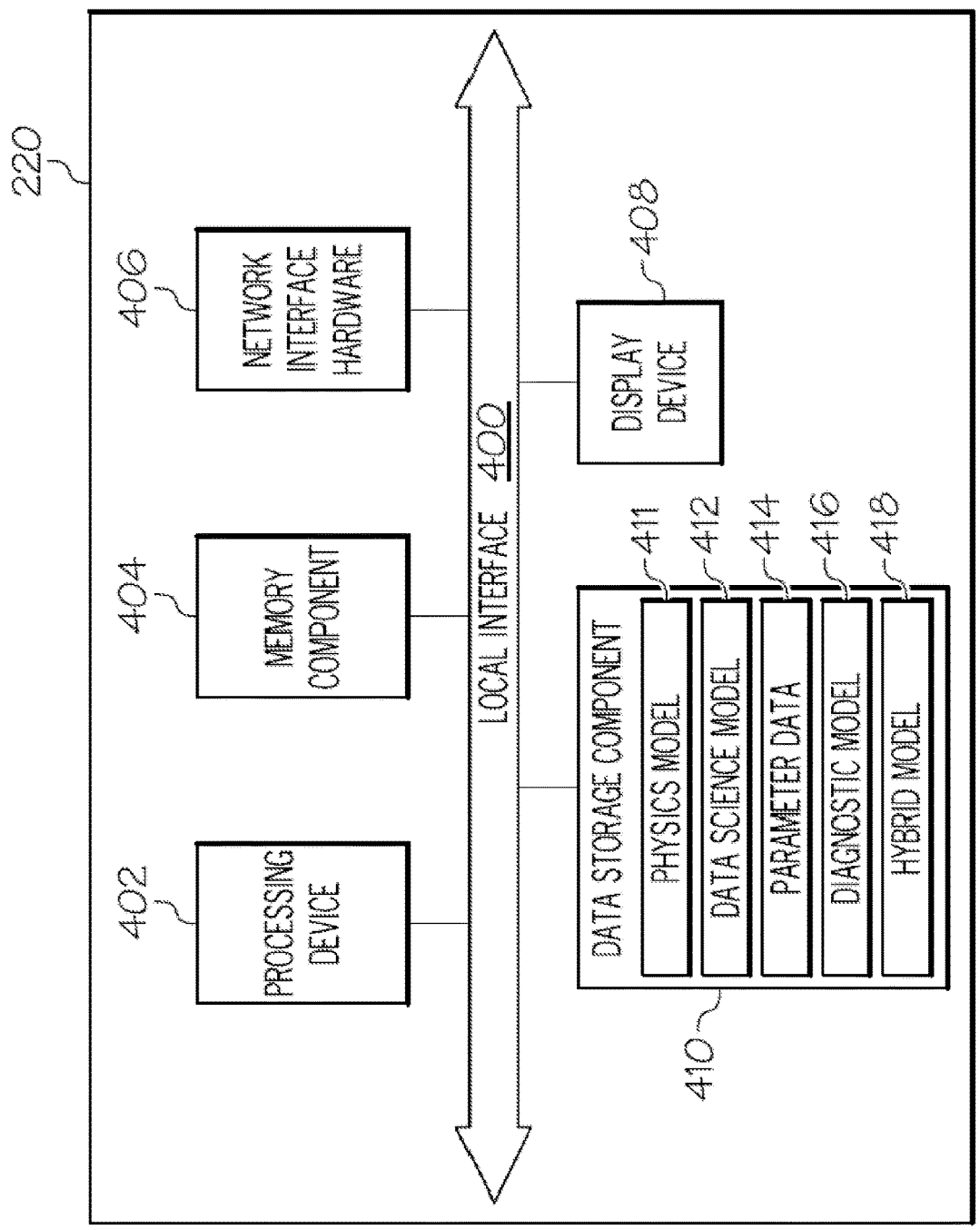
FIG. 4 depicts the various internal components of a user computing device communicating with an additive manufacturing system, according to one or more examples shown and described herein.

FIG. 4 depicts the various internal components of the user computing device 220 depicted in FIG. 2. As illustrated in FIG. 4, the user computing device 220 can include one or more processing devices 402, a non-transitory memory component 404, network interface hardware 406, a display device 408, and a data storage component 410, all of which are interconnected by a local interface 400, such as a bus or the like. While FIG. 4 depicts the components of the user computing device 220, the server 210 in FIG. 2 can have the same or similar components as illustrated in FIG. 4.

The one or more processing devices 402, such as a computer processing unit (CPU), can be the central processing unit of the user computing device 220, performing calculations and logic operations to execute a program. The one or more processing devices 402, alone or in conjunction with the other components, are illustrative processing devices, computing devices, processors, or combinations thereof. The one or more processing devices 402 can include any processing component configured to receive and execute instructions (such as from the data storage component 410 and/or the memory component 404).

The memory component 404 can be configured as a volatile and/or a nonvolatile computer-readable medium and, as such, can include random access memory (including SRAM, DRAM, and/or other types of random access memory), read only memory (ROM), flash memory, registers, compact discs (CD), digital versatile discs (DVD), and/or other types of storage components. The memory component 404 can include one or more programming instructions thereon that, when executed by the one or more processing devices 402, cause the one or more processing devices 402 to diagnose a component or a build of the additive manufacturing system.

Still referring to FIG. 4, the display device 408 can include any medium capable of transmitting an optical output such as a cathode ray tube, a light emitting diode (LED) display, an organic light emitting diode (OLED) display, a liquid crystal display, a plasma display, or the like. In some examples, the display device 408 can be a touchscreen that, in addition to visually displaying information, detects the presence and location of a tactile input upon a surface of or adjacent to the display device 408.

Still referring to FIG. 4, the data storage component 410, which can generally be a storage medium, can contain one or more data repositories for storing data that is received and/or generated. The data storage component 410 can be any physical storage medium, including, but not limited to, a hard disk drive (HDD), memory, removable storage, and/or the like. While the data storage component 410 is depicted as a local device, it should be understood that the data storage component 410 can be a remote storage device, such as a server computing device, cloud based storage device, or the like. As shown in the example of FIG. 4, the data storage component 410 can store one or more models and/or data, such as a physics model 411, a data science model 412, parameter data 414, a diagnostic model 416, a hybrid model 418, etc.

Figure 5:
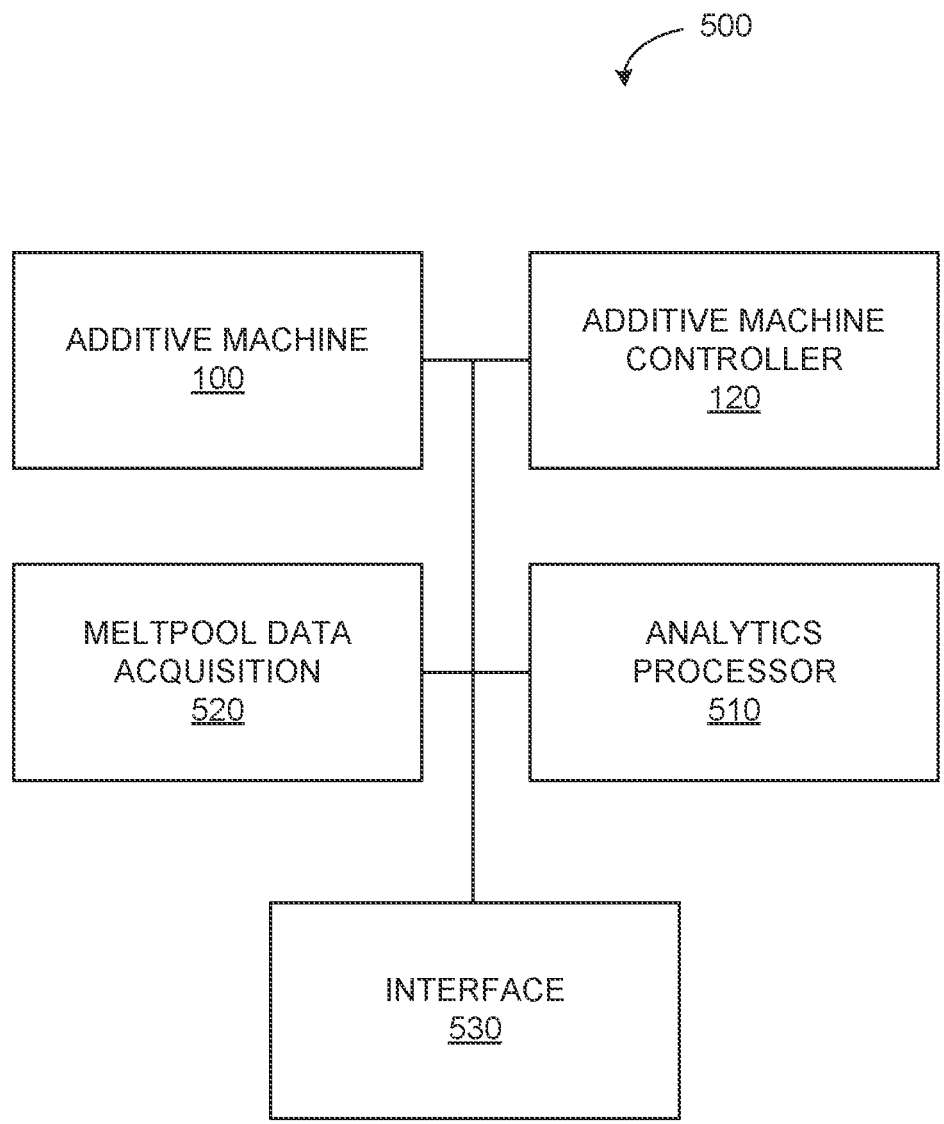
FIG. 5 illustrates an example infrastructure or framework 500 to monitor and adjust additive manufacturing based on machine health monitoring and analysis.

FIG. 5 illustrates an example infrastructure or framework 500 to monitor and adjust additive manufacturing based on machine health monitoring and analysis. In the example framework 500 of FIG. 5, the additive manufacturing machine 100 and its controller 120 are in communication with an analytics processor 510 which leverages meltpool data acquisition 520 and information from the additive manufacturing machine 100 and/or its control computer 120 to model the additive machine 100 and its operation, assess a health of the additive manufacturing machine 100, score or otherwise evaluate build quality (e.g., layerwise in real time or near real time, etc.), and/or otherwise monitor, model, evaluate, and modify a configuration, performance, control, etc., of the additive manufacturing machine 100. While the analytics processor 510 is shown as a single device in the example of FIG. 5, the analytics processor 510 can be implemented as one or more FPGAs, processors, trusted platform modules (TPMs), and/or other computing devices, for example. When the analytics processor 510 is implemented using a plurality of devices, the FPGA(s) and processor(s) can coordinate with each other toward a common data fusion and/or analysis. The multiple devices can be synchronized to a same time base, build meta-data, and/or machine control events, for example.

A plurality of process parameters affect the microstructure and mechanical properties of a 3D printed object using a powder bed fusion and/or other laser-based melting process, including scanning speed (e.g., in millimeters per second (mm/s), etc.), beam speed/speed function, beam current or beam power (e.g., in Watts (W), etc.), layer thickness (e.g., in mm, etc.), powder layer uniformity, and line offset. Such parameters can be adjusted and/or optimized to result in desired 3D printed object properties. For example, beam power, scan speed, spacing, layer thickness, etc., affect an energy density (e.g., average applied energy per volume of material, J/mm3). In some examples, the beam speed can be adjusted near an edge of the object to prevent overheating. Layer thickness (e.g., 50-150 um) affects geometric accuracy of a fabricated object and can be varied depending on the type of 3D printer used, as well as other process parameters such as material powder particle size, etc. Additionally, a scanning pattern and scanning speed also affect the final 3D printed object microstructure and porosity. For example, a scanning pattern (e.g., cross-section of layer) represents the geometric track of the electron beam, laser beam, and/or other energy beam 131 used to melt the metal powder to form a cross-section on a powder bed/build area. Such geometries can include outer contours, inner contours, and/or a hatch pattern, for example.

Issues with other components aside from the energy beam 131 can also result in build defects and/or process imperfections. For example, obstacles or abruptions in powder fetching and spreading on the build plate or platform 111 can also cause imperfections in a resulting build part. Other components can also be analyzed and associated abnormalities or issues identified/predicted and addressed. For example, the laser/emitter 130 may have low power issues, material issues, etc. A scanner can experience issues with wear (e.g., detectable via a pattern), speed (e.g., detectable with respect to time), etc. Wear can also be evaluated with respect to movable components such as pump(s), motor build chamber motor powder chamber, motor recoater, build module, for example. One or more sensors (e.g., optic temperature sensor, oxygen sensor, pressure sensor, temperature sensor, dew point sensor, etc.) can be evaluated for accuracy, for example. Functionality and/or performance can be evaluated for one or more components such as a collimator, optics chiller, valve(s), seal(s), etc. Control board (s) can be evaluated with respect to runtime, mean-time-to-failure (MTTF), etc., for example.

Parameters/settings involved in other modalities can differ from those described above. For example, in a BinderJet system, both single layer statistical process control (SPC) and multi-layer SPC can be facilitated. Such SPC can include image-based defect detection including powder bed monitoring with a short spread and closed loop control to trigger another dose and recoat. SPC can also include image-based defect detection with powder bed monitoring wherein streaking/pushing of powder indicates recoater damage resulting in a recoat close loop control or stop build. Image-based defect detection can also include jetting health with pattern test image analysis (e.g., pre-print, jet onto paper a pattern, image and analyze, etc.) in a closed loop to re-clean the jet automatically with a solvent. In certain examples, jetting health can include a jetting onto powder analysis (e.g., image binder on powder, potentially with IR camera, and check binder deposition into powder, etc.) in a closed loop to re-clean the jet automatically with a solvent. Image-based defect detection can also include geometric conformance with analysis of jetting onto powder versus an expected geometry. Images can be used to compare an expected geometry to an actual geometry, for example. BinderJet analysis can also involve closed loop control of curing parameters, recoat parameters, jetting parameters, etc. Curing parameters (e.g., IR lamp intensity, etc.) can be modified based on real-time (or substantially real-time) health (e.g., based on powder bed temperature, images, etc.). Recoat parameters (e.g., dosing factor, roller speed, etc.) can be modified based on real-time (or substantially real-time) health (e.g., based on powder bed temperature from IR camera, images, etc.). Jetting parameters (e.g., measure/modify saturation, manifold pressures, drop velocity, etc.) can be modified based on real-time health metrics (jetting quality, saturation, etc.) to enable detection, correction, and preventative measures. Other parameters, such as humidity, temperature, pressure, drive/pump current, and torque can all affect binding speed, quality, saturation of binder into the powder bed, and overall part quality. IR lamps that cure each layer of a build can be monitored in conjunction with these parameters (e.g., higher humidity can affect cure time and saturation). Lower IR temperature resulting from lamp degradation can affect print time and overall quality, etc.

In certain examples, one sensor can provide information about one parameter for one subsystem. In other examples, a plurality of sensors can be assigned to the subsystem such that different types of sensors provide different types of data with respect to one or more parameters for the subsystem. Using multiple sensors, more correlation can be established between parameters for the subsystem to drive improved error prediction, detection, and correction, for example.

Certain examples provide multimodal data fusion for near real-time detection, diagnosis and prediction of additive machine, process health, and build quality. The layerwise printing process of additive manufacturing technology allows for data capture of the printing process from the first layer to last layer of a printed part. This data can include but is not limited to part design, material parameter definition, machine settings and configurations, as well as sensor and programmable logic controller (PLC) data, logging information, software errors/warnings, and other build information such as recoat imaging and print video.

Within a given build, for example, intelligent data weighting can be used to identify an anomaly across one or more layers. A decay strategy can also be employed across one more layers because a single layer anomaly can become a multi-layer concern sometimes. However, other times, a problem in one layer can be naturally cured by thermally effects from surrounding layers, etc. Weighting factors and employing decay can be helpful in identifying anomalies and evaluating whether the anomaly is likely to spread to other layers or be corrected by other layers, for example.

Certain examples provide a foundational data architecture to facilitate data fusion and establish a complete digital genealogy for each 3D print. With this foundation, statistical process control methods can be utilized to monitor machine, process, and part health in situ throughout the build process on a layer-wise basis to detect anomalies, defects, and enable closed loop control and correction, for example. In certain examples, a same machine and/or multiple machines can experience variability across multiple builds. One or more additive manufacturing machines repeating builds for the same part can leverage such foundational data to compare/contrast build health including statistical processor control analysis of subsystem components and process variables/configuration, for example.

Certain examples enable real-time monitoring of an additive build process, machine quality, and build quality. During a build, as a layer is created, health and performance analysis is performed to determine if there are any critical issues so that an operator can take timely action. Health and performance analysis can relate to build and/or print health, machine performance and/or part quality, etc. Multi-modal data (e.g., time series data from installed sensors, simulation/compensation modeling results, build inputs, settings, images from optical and/or infrared cameras related to powderbed, meltpool, etc.) is fed to a hybrid model that includes a series of analytical modules (e.g., data science, statistics, and additive domain-based physics). The hybrid model filters and/or otherwise pre-processes the data for feature extraction, signal-to-noise ratio (SNR) enhancements, etc., and then feeds the processed data to analytics models that compute physics-based metrics, which are further analyzed using data-science models based on one of more methods such as, statistical process control (SPC), statistics, Bayesian, machine learning, etc., to determine an overall quality of the process and a health of the additive manufacturing machine. The health metrics and model results are further combined using probabilistic models to determine an overall severity (e.g., health) score for the layer as well as individual quality scores for each 'critical x' associated with each modality. Single-layer scoring, multi-layer scoring, etc., can be determined and used to detect, correct, and prevent issues with a build, process, and/or device. Modalities can include but are not limited to DMLM, EBM, DCAT, and BinderJet, for example.

The analysis enables health detection and diagnosis of the build process, additive manufacturing machine, and build quality at an individual layer level and over multiple layers using multi-layer analytics, trend analysis, change point detection, cumulative damage assessment etc. While a build is progressing, cumulative damage assessment is performed based on performance of previous layers leading to improved confidence of health and/or anomaly detection and correction as the build progresses as well as an overall health diagnosis of an entire build at the end of the build. In certain examples, forecasting and/or other prediction can be provided based on prior build data, trend analysis, etc., to identify issues before the issues occur and/or before the issues become a problem affecting the build of a part or machine performance.

These analytics are performed on a separate, secure computing device isolated from control operations to minimize risk to additive build machine performance. The authenticity and integrity of the analytics application code is securely protected with one or more integrated Trusted Platform Modules (e.g., implemented on one or more FPGAs, etc.), for example. As such, a root of trust is established between the analytics processor 510 and the additive manufacturing machine 100 (and, in some examples, the additive machine controller 120). Analytics results are displayed with live update on a web-based human machine interface (HMI). The HMI can be accessed by the printer's control computer and/or remotely via network connection, for example.

As illustrated in the example of FIG. 5, the analytics processor 510 provides in-situ monitoring of the additive manufacturing machine 100 during a build of a part or set of parts. The example analytics processor 510 can apply analytics to its real-time (or substantially real-time given transmission and/or processing latency, etc.) monitoring to determine additive machine 100 health. Rather than extracting data from the machine 100 at the end of a build, the analytics processor 510 receives and processes data during a build and provides automated quality scoring of the machine, process, and/or build data. The analytics processor 510 can facilitate layerwise process monitoring of machine health, build process health, and/or part quality, for example. Such monitoring can be facilitated by acquisition of real-time (or substantially real-time) data from one or more on-machine sensors, cameras, etc. Acquired information is analyzed using statistical and/or artificial intelligent (AI) models to determine a quality score of machine health, process health, and/or part quality, for example. Data is transferred from the additive machine 100, additive machine controller 120, etc., to the analytics processor 510. In certain examples, meltpool data from the additive machine 100 is gathered by the meltpool data acquisition circuitry 520 and provided to the analytics processor 510.

By providing the analytics processor 510 separate from the additive manufacturing machine 100 or the additive machine controller 120, the dedicated analytics processor 510 can perform high-compute processes without reducing efficiency or speed of the additive manufacturing machine 100 itself. The analytics processor 510 is isolated from the additive manufacturing machine 100, processing information from the additive machine 100 without interfering with operation of the additive machine 100 unless the processing reveals a problem and an adjustment to be made to the machine settings, process configuration, current and/or subsequent build, etc. The analytics processor 510 can examine specific processes of the additive manufacturing machine 100 (e.g., melting, recoating, etc.) as well as the overall health of the machine, process, build, etc., on a layer-by-layer basis. Certain examples provide a modular architecture that can be configured and extended to a plurality of product lines (e.g., M2, Mline, etc.), modalities (e.g., EBM, binder jet, etc.), and the like.

Physics and interplay of parameters is built into the analytics of the analytics processor 510. Analysis is enriched with knowledge of the additive manufacturing machine 100, sensor(s), and interplay between material parameters and machine operation, for example. Correlations and physical properties can be affected by input parameters of materials, additive manufacturing machine 100 configuration (e.g., gas flow, beam speed, and laser power, layer thickness of deposited powder, etc.), etc. Correlations can include correlation of log/time series, static images (e.g., thermal, still, infrared (IR), etc.), video, SPC and quality score metadata, and/or fusion thereof, for example.

FIG. 5 illustrates an example infrastructure or framework 500 to monitor and adjust additive manufacturing based on machine health monitoring and analysis. In the example framework 500 of FIG. 5, the additive manufacturing machine 100 and its controller 120 are in communication with an analytics processor 510 which leverages meltpool data acquisition 520 and information from the additive manufacturing machine 100 and/or its control computer 120 (e.g., from the camera or other imaging device 114, emitter 130, build plate/platform 111 and positioner and/or other lifting component 113, sensor(s) 150-151, etc.) to model the additive manufacturing machine 100 and its operation, assess a health of the additive manufacturing machine 100, score or otherwise evaluate build quality (e.g., layerwise in real time or near real time, etc.), and/or otherwise monitor, model, evaluate, and modify a configuration, performance, control, etc., of the additive manufacturing machine 100.

As such, the additive machine controller 120 can act on information provided by the analytics processor 510 to adjust or correct operation of the additive machine 100. As described further below, the analytics processor 510 performs layerwise analysis to detect and/or predict an error or other issue to drive a correction or modification to affect a current layer, future layer, future build, etc. Single and/or multi-layer analysis by the analytics processor 510 can correct, optimize, and/or otherwise improve future layers, for example.

For example, multi-layer laser health monitoring can be enabled by the analytics processor 510 implemented with a combination of FPGA data capture and analysis of laser power delivered versus expected or commanded laser power. Over time, laser power can degrade and/or laser calibration can fade and/or drift. The analytics processor 510, alone or in conjunction with one or more FPGAs, can monitor commanded power and position and detect/correct alignment issues, for example. Similarly, over multiple layers, health of a scanner galvanometer can also be observed including drift in accuracy over time related back to galvanometer temperature. The hotter the temperature, the greater probability that the scanner is experiencing wear, which affects accuracy, etc.

The analytics processor 510 provides an analysis of sub-systems of the additive machine 100 and its processes to generate build process optimization, inspection advice, and/or predictive machine maintenance, for example. The analytics processor 510 uses multi-sensor time series analysis, image analytics, correlation analysis, etc., across sensor, logfile, and other machine health and process data (images, meltpool emissivity, etc.). Near-real time analysis by the analytics processor 510 enables the additive manufacturing machine 100 and/or an associated user to make timely decisions, adjustments, etc., to affect machine/material as well as post-process work in progress (WIP) cost avoidance during a build (without having to wait or depend on post processing inspection), for example. The analytics processor 510 uses automatic data transfer and data analysis of each layer as the build is printed. The analytics processor 510 is a separate and secure analytics compute platform with a delay no longer than one layer behind the current layer being printed, for example, which does not interfere with the additive machine 100 but allows near-real time monitoring and adjustment of the additive manufacturing machine 100, for example. The analytics processor 510 can include physics-based models leveraging system expertise and additive physics to model the structure, configuration, and operation of the additive machine 100 and its associated process(es) and build(s), for example. Alternatively or additionally, the analytics processor 510 can include one or more data science models for diagnosis and/or prediction of machine, process, and/or build errors. In certain examples, the analytics processor 510 leverages one or more fusion models combining physics and data science to determine/predict an outcome. In certain examples, the analytics processor 510 is constructed with a modular architecture to help ensure faster adoption to new product lines and modalities (e.g., EBM, DMLM, BinderJet, DCAT, etc.) through easy reuse and 'swapping' of modality and/or product line software Docker containers (e.g., 20-30%) while retaining common analytic and software capabilities (e.g., 70%).

In certain examples, the analytics processor 510 provides statistical process control (SPC) using automatic SPC calculation of X "most important" variable for a given modality. Layer-by-layer analysis and visualization includes subsystems, processes, and sub-processes of the additive manufacturing machine 100. Multi-layer analysis is used by the analytics processor 510 to form a cumulative damage assessment as the build progresses as well as an overall end-of-build health state. Alternatively or in addition to the multi-layer analysis, a multitude or variety of sensors can be analyzed with SPC to form a cumulative assessment. SPC can be used to calculate individual sensor values, which can then be combined across a layer for a layerwise score, for example. As such, one or more data sets per sensor and/or one or more sensors can be evaluated, combined, etc. The analytics processor 510 can employ an array of analytics that are activated based on modality (e.g., DMLM, EBM, BinderJet, DCAT, etc.), objective (which component or process), etc., enabling machine and/pr modality agnosticism, for example.

In certain examples, hybrid models (e.g., hybrid AI models) provide a fusion of additive process physics, machine know-how, and data science (e.g., SPC/Statistics/Bayesian/Machine Learning) to process data from the additive machine 100 and/or meltpool analyzer 520. 'Default' and 'configurable' analytics modules work with the models and enable machine and/or modality agnosticism in the analytics processor 510. For example, a default module can include circuitry and instructions for computing and extracting of statistical features. An example of a configurable module (e.g., a physics-based module) is circuitry and instructions for computing 'filter clogging coefficient' (for DMLM), 'cathode health coefficient', 'print head health' (for BinderJet), 'light projector health' (for DCAT), etc. Configurable analytics can change sensitivity of detection, for example. For example, a "sensitivity slider" can set increased or decreased sensitivity for trial/benchmarks versus "production/qualified" builds. Configurable software modules allow configuration and selection of type of data, frequency of data, storage location, etc. (e.g., wherein data includes sensor data, log data, image data, build parameters, etc.). Within a build, layer-wise monitoring of machine and process health performance through sensors, meltpool data, powder bed information, etc., enables automated inspection and modification of machine, process, and/or build, for example. The analytics processor 510 provides a dedicated compute device to help ensure isolation of compute resources from control operations of the additive machine controller 120 and the additive machine 100. The analytic sensitivity and/or severity of reported alert can be made configurable based on defined regions of interest within the build. For example, the image based analytics are configured according to region definitions that can include but are not limited to part boundaries, layer ranges, bounded areas, or bounded volumes.

In certain examples, analytics code authenticity and integrity are protected with one or more integrated Trusted Platform Module (TPM). Use of the TPM(s) can provide a hardware root of trust for the analytics processor 510, the additive machine controller 120, etc. (e.g., establishing a trusted relationship). The TPM(s) can provide a tamper-proof grounding for detection and correction of errors, for example. The root of trust can include ensuring the authenticity of signed and/or otherwise certified analytics, for example. In certain examples, a combination of TPM and code-signing provides enhanced security with the root of trust to enable the analytics processor 510 to communicate with and affect the machine controller 120, the additive machine 100, etc. The TPM supports disk encryption and boot chain to protect the authenticity and integrity of code on the analytics processor 510, for example. Signed/certified packages can be sent from the analytics processor 510 to the additive machine controller 120 and/or directly to the additive manufacturing machine 100 for secure update.

Alternatively or additional to physics-based models, data science models, and/or hybrid models, data-driven analytics can be provided using a neural network (NN) or convolutional neural network (CNN) model, random forest, and other AI/machine learning (ML) approach involving big data, manual defect characterization, and model training. In certain examples, the machine learning models are trained in an offline system with access to large data sets, and then the trained models are deployed to the analytics processor 510. In certain examples, the trained models are aided by the used of compute accelerators such as GPUs, VPUs, and/or FPGAs. As such, models can be trained on prior build data (e.g., showing "good" builds, errors, corrections, etc.), "gold" reference build data, etc., across one or more systems/builds, etc.

Thus, certain examples provide layer-wise process and machine health monitoring in real time or substantially real time. A layer-wise view of process variable build 'vital signs' with SPC metrics is provided using the analytics processor 510 for timely identification of process and machine performance deviations (e.g., layer-wise during a build, etc.). A multi-layer process view can also be provided for one or more geometrically complex areas of concern for a build. Multi-layer analysis provides more insights into particular areas/regions having more complex geometry, while simpler areas of a part may only involve a single layer analysis. The analytics processor 510 enables a mix of single- and multi-layer analysis depending upon part geometry, configuration, monitoring criterion, etc. The analytics processor 510 provides a "one-stop" solution for process monitoring features, sensors, and powder bed/binder applications, for example.

In certain examples, machine health and build quality monitoring are integrated with automated data transfer from the additive machine 100, the controller 120, and/or the meltpool data analyzer 520 (e.g., via the interface 530). On-machine sensors, data transfer, and single layer analysis can provide a layer health score as well as SPC metrics, for example. In certain examples, multi-layer sensor analysis can be used by the analytics processor 510 to determine a trend, detect a change point, etc. Analysis of the analytics processor 510 can be integrated with a modality-specific closed-loop control including recoat monitoring, binder application monitoring, powder bed monitoring (e.g., for shortfeed, protrusion, etc., in combination with gas flow, oxygen content, etc.) etc., for the additive machine 100. In certain examples, a monitored layer can be compared with a reference (e.g., "gold") layer to identify error(s) and/or other difference(s) with the current build. The reference or 'golden' layer may be digitally determined and/or generated from an actual build, for example. In certain examples, a reference or golden build formed of multiple layers can be leveraged. Overall equipment effectiveness (OEE), additive manufacturing machine 100 efficiency, and overall build health quality scoring (e.g., layerwise and multi-layer analysis) can be determined.

As such, machine health can be monitored, evaluated, and addressed using the example system 500. Machine faults can be detected and isolated by the analytics processor 510 (e.g., implemented as one or more processors, FPGAs, other computing devices, etc., to detect and/or predict additive manufacturing machine 100 failure modes from in-situ data). Machine health concerns can include degradation in optical train, recoater, gas flow, laser glass fouling detection, etc. Automatic calibration of the optics (e.g., beam alignment, multi-laser alignment, closed-loop spot size control, power calibration, etc.) can also be driven by machine health monitoring and analysis.

In-situ process monitoring includes melt pool monitoring, powder bed monitoring, part defect detection, laser health monitoring, inertization monitoring, sensor-assisted parameter/part development, closed-loop meltpool control, etc. Meltpool monitoring includes sensing technologies to obtain meltpool properties. Meltpool monitoring can include modification to optics to include sensors and can include both optical and non-optical technologies, as well as on-axis/off-axis technologies. In-process sensors can be calibrated, and algorithms can be used to detect anomalous conditions in meltpool monitoring data, for example. Powder bed monitoring includes technologies to monitor a powder bed of the additive machine 100, including technologies to detect powder bed defects, including short feed, chatter, ripples, spatter, etc. Powder bed monitoring includes sensing modalities (e.g., camera, profilometer, scanning, time of flight sensing, etc.), and data/image analysis to perform defect detection. Powder bed monitoring includes accommodation technologies in case of detected defects (e.g., dose factor control and automatic recoat, etc.). Part defect detection includes technologies to infer part defects from in-situ data (e.g., meltpool and powder bed). Sensor-assisted parameter/part development can involve closed-loop meltpool control technologies to use on-axis data from the meltpool to control build parameters in a closed-loop to achieve target outcomes in build quality. Closed-loop meltpool control includes a closed loop from build-to-build, layer-to-layer, and/or in real-time, for example.

Layer quality measurement includes in-situ machine health monitoring, in-situ process health monitoring, in-situ metrology, in-situ nondestructive evaluation (NDE), and defect repair, for example. In certain examples, in-situ metrology includes technologies to measure dimensional accuracy from layer-wise in-situ data. In-situ NDE includes technologies to directly measure part quality on a layerwise basis, such as detecting surface and subsurface detects (e.g., flash infrared (IR), eddy current probe array, etc.). Defect repair includes technologies that, upon detection of defect(s) in the build process, correct the defect(s) during the build process. In certain examples, post-process inspection can identify presence and/or absence of defect(s) to inform quality processes.

Machine health monitoring relating to powder supply can include a powder flow sensor to monitor powder level, calibrating powder dispenser geometrical parameter(s), powder shape imaging, etc. Machine health monitoring of the re-coater can include repair/replacement of a damaged applicator, calibration using height of the powder bed surface with respect to a reference, etc. Machine health monitoring related to the build plate or other build platform can include a position sensor for the build plate, an optical sensor to determine build plate orientation, a calibration model corresponding to a desired inclination of the build plate, etc. Machine health monitoring of sensors includes calibrating a meltpool monitor using a calibrated platform and energy sources, calibrating an acoustic sensor, etc.

Machine health monitoring can also include adjusting an energy beam of the additive manufacturing machine 100 using a reference beam, generating calibration information, and determining calibration status using spatial arrangement of patterns, for example. A sensor can be provided to evaluate beam parameter(s), and deviation from beam focus, path velocity of energy beam, filament wear (e.g., in an EBM process), etc., can be monitored and adjusted, for example. A calibration file for the additive machine 100 can be updated (e.g., if estimated scaling error is greater than a tolerance level, etc.). Build parameters can be determined, foreign matter can be detected in the build chamber, etc., using one or more sensors, log files, etc. In certain examples, a scanner can be calibrated using a calibration grating, etc.

Certain examples provide in-process monitoring of the additive manufacturing machine 100 such as melt pool monitoring, melt pool control, digital twin modeling/simulation, powder bed monitoring, etc. For example, melt pool monitoring can include melt pool emission monitoring, compensated emission signal analysis from two or more focal points, melt pool position detection, off-axis melt pool emission, powder shape imaging, etc. In certain examples, geometrical parameter(s) of a powder dispenser can be calibrated. Melt pool control can include melt pool image classification (e.g., using an ML and/or other model. Melt pool boundary(-ies) can also be monitored and controlled (e.g., using Green's theorem). One or more meltpool properties such as geometric Length, algebraic connectivity, fractal dimension, correction factor, etc., can be monitored and adjusted (e.g., using the analytics processor 510 in conjunction with the additive machine 100 and meltpool data acquisition 520). One or more meltpool attributes can be measured and calculated for process control, for example. A digital twin model and/or other simulation can be used to determined updated build parameters from sensor values, thermal model(s), etc.

In certain examples, in-situ process monitoring also involves pre-calculated models from processes outside the defined system to aid in determining if sensors are signaling a deviation from the correct values. These pre-calculated models provide the expected results of the monitored values to facilitate the correction of the monitored process in real time. These pre-calculated models can include but are not limited to thermal models, stress models, deformation models, gas flows, laser paths, etc. Including post-process information such as inspection data can also be used to help identify when a print process is deviating from the acceptable values for a specific part, and the current running print job can be corrected in real time (or substantially real time given processing and/or transmission latency). This includes but is not limited to production parts tolerances, acceptable part deformations, known issues with layer meltpools, error prone geometry features, etc.

In certain examples, powder bed monitoring can be performed using a camera on a recoater blade of the additive machine 100. Surface topography, profilometry data, temperature, etc., can be measured. A powder bed image can be obtained from the additive machine 100 and compared to a reference image by the analytics processor 510, for example. Alternatively or additionally, one or more sensors can measure torque data of a motor driving a rake and/or recoater blade in the additive machine 100. One or more powder bed characteristics can be determined based on vibration/output torque data, recoater parameter control, etc. Powder lifting can be detected in an EBM process, for example. Local powder thickness, powder particle size, etc., can be evaluated to vary energy beam parameter(s).

In certain examples, layer quality can be monitored, defect(s) in a layer can be identified, etc. For example, layer quality can be measured using powder bed monitoring with a camera on a recoater blade. A surface of the part being built can be scanned, and the analytics processor 510 can receive the data and perform layer quality detection to identify and correct a defect in the layer of the part being built. Sensor data can be provided from the additive manufacturing machine 100 and/or its controller 120 to the analytics processor 510 to generate a quality output and associated correction(s)/adjustment(s). Recoater image(s) can be provided from the recoater camera, etc.

In certain examples, the analytics processor 510 can perform in-situ NDE and associated repair. For example, a backscatter x-ray scan of the additive manufacturing machine 100 can provide information to the analytics processor 510 for defect detection. Part, meltpool, and/or powder bed surface can be scanned in the additive machine 100 to enable the analytics processor 510 to perform part layer quality detection and trigger associated defect correction, for example. One or more quality output can be generated by the analytics processor 510 based on sensor data, image data, and/or other information, for example. In-situ metrology can be driven by the analytics processor 510 to adjust build parameters using differences in geometry, etc.

In certain examples, powder bed monitoring (PBM) can be monitored with high resolution imaging using CMOS camera technology to capture an in-weld image with high resolution. High resolution, in-weld data can be combined with SPC and/or other metric(s) with respect to the powder bed 110 and/or other component(s) of the additive manufacturing machine 100. High resolution imaging based on obtained pre- and/or post- a current or selected layer including an in-weld image, which is a single (combined) image of an entire layer exposure. For example, soot/smoke can be identified in the in-weld image and verified in a post-layer lasting image. The images can be analyzed to identify a protrusion based on the soot/smoke in the images. The protrusion anomaly can be connected to an incorrect gas flow speed setting that produced the soot/smoke. The recoater 108 can then be stopped to adjust the gas flow speed setting and then either continue with a corrected build or discard and restart a new build with the adjusted setting, for example.

Using the analytics processor 510 in communication with the additive machine 100, the additive machine controller 120, the meltpool data acquisition processor 520, etc., layerwise machine sensor and build quality information can be provided during and after a building/printing process. One or more sensors and/or cameras (e.g., recoat camera, temperature sensor(s), pressure sensor(s), oxygen sensor(s), etc.) can provide information to the additive machine controller 120, for example. One or more sensors and/or cameras (e.g., photodiode, on-axis camera, etc.) can provide meltpool information to the meltpool data acquisition processor, for example. Information such as residual oxygen (O2) percentage, laser rail temperature, platform temperature, dewpoint temperature, filter differential pressure, powder bed/recoat imaging, etc., can be collected, stored, processed, etc., to correct a build in-progress as well as adjust the additive machine 100 for future use. As such, final build data can be gathered and processed to form a layer-wise genealogy for build to build (B2B) variability, additive manufacturing process (AMP) connectivity, usage/archiving, etc.

Figure 6:
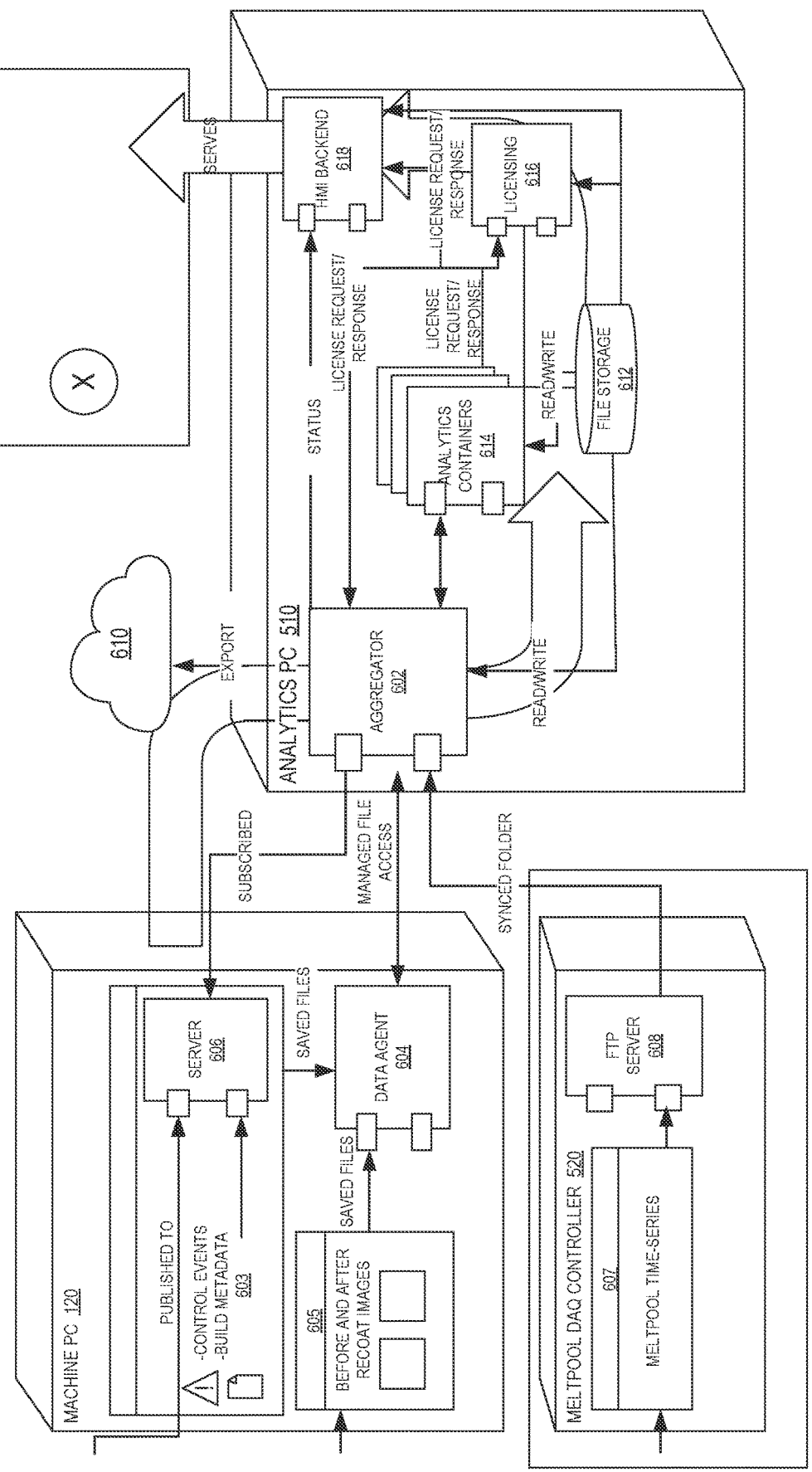
FIG. 6 illustrates an example component architecture provides further example detail to implement the example infrastructure of FIG. 5.

The example component architecture of FIG. 6 provides further example detail regarding the arrangement, configuration, and interaction of the example additive machine controller 120, the example analytics processor 510, and the example meltpool data acquisition controller 520. As shown in the example of FIG. 6, data such as control events and build metadata from the additive machine controller 120 are ingested by the analytics processor 510. Before and after recoat images are also provided from the controller 120 to the processor 510.

In certain examples, an aggregator module 602 (e.g., a finderkeeper) at the analytics processor 510 coordinates with a data agent 604 and a server 606 at the additive machine controller 120 to access files, subscribe for data updates, etc., including control events and build metadata 603, recoat images 605, etc. The meltpool data acquisition controller 520 can include a file transfer protocol (FTP) server 608 to transfer meltpool time-series data 607 from the additive machine 100 to the analytics processor 510, for example.

The aggregator module 602 of the example analytics processor 510 can synchronize, organize, and manage data (e.g., image data, control data, time series meltpool data, etc.) from the additive controller 120 and the meltpool data acquisition controller 520. The data can be used for determination of additive manufacturing machine 100 state, analytics processing, storage in the cloud and/or other remote data store 610, display, etc. The process of gathering and aggregating a variety of data such as log/timeseries data, image data, video, multi-modal, sensing data (e.g., eddy current, etc.), etc., is referred to as data fusion or digital DNA, for example. Data fusion can be driven on a layerwise basis and/or for overall build quality, for example. The example aggregator 602 can store the ingested data in an internal file storage 612 and provide the data to one or more analytics containers 614 for processing in a container or virtual machine environment. Using container(s) 614, trends, anomalies, situations, etc., can be modeled and solutions/adjustments evaluated in a safe, secure environment separated from the actual build, for example. SPC can be facilitated using one or more containers 614. The analytics containers 614 can include one or more feature extraction containers, for example. In certain examples, the analytics containers 614 store and/or otherwise instantiate one or more statistical or AI models that can be used to process the data to generate a quality score of process health, machine health, and/or part quality, for example. Meltpool data 607, image(s) 605, sensor data, etc., can be correlated with control events and metadata 603 using one more models to determine health, quality, etc. In certain examples, data access and/or other legal permissions can be provided via a licensing processor 616 to generate analytics including quality score, predicted/likely outcome, etc. Such scoring, predictive outcome, suggested action, etc., can be compiled, formatted, and/or otherwise organized for display via a human-machine interface (HMI) backend 618, which serves content for display and interaction via an HMI 620, such as a Web browser-based HMI.

In certain examples, a container 614 can be implemented using a TPM to provide a secure analytics container 614. In certain examples, different analytic functions can be running in different secure containers 614, and the results of the executed functions can be compared and/or otherwise evaluated by the aggregator 602 and/or other circuitry. Using multiple containers 614, changes can be simulated, rolled forward, rolled back, etc. Based on evaluation, one or more of the analytics/functions can be selected and leveraged to improve operation of the additive manufacturing machine 100.

Figure 7:
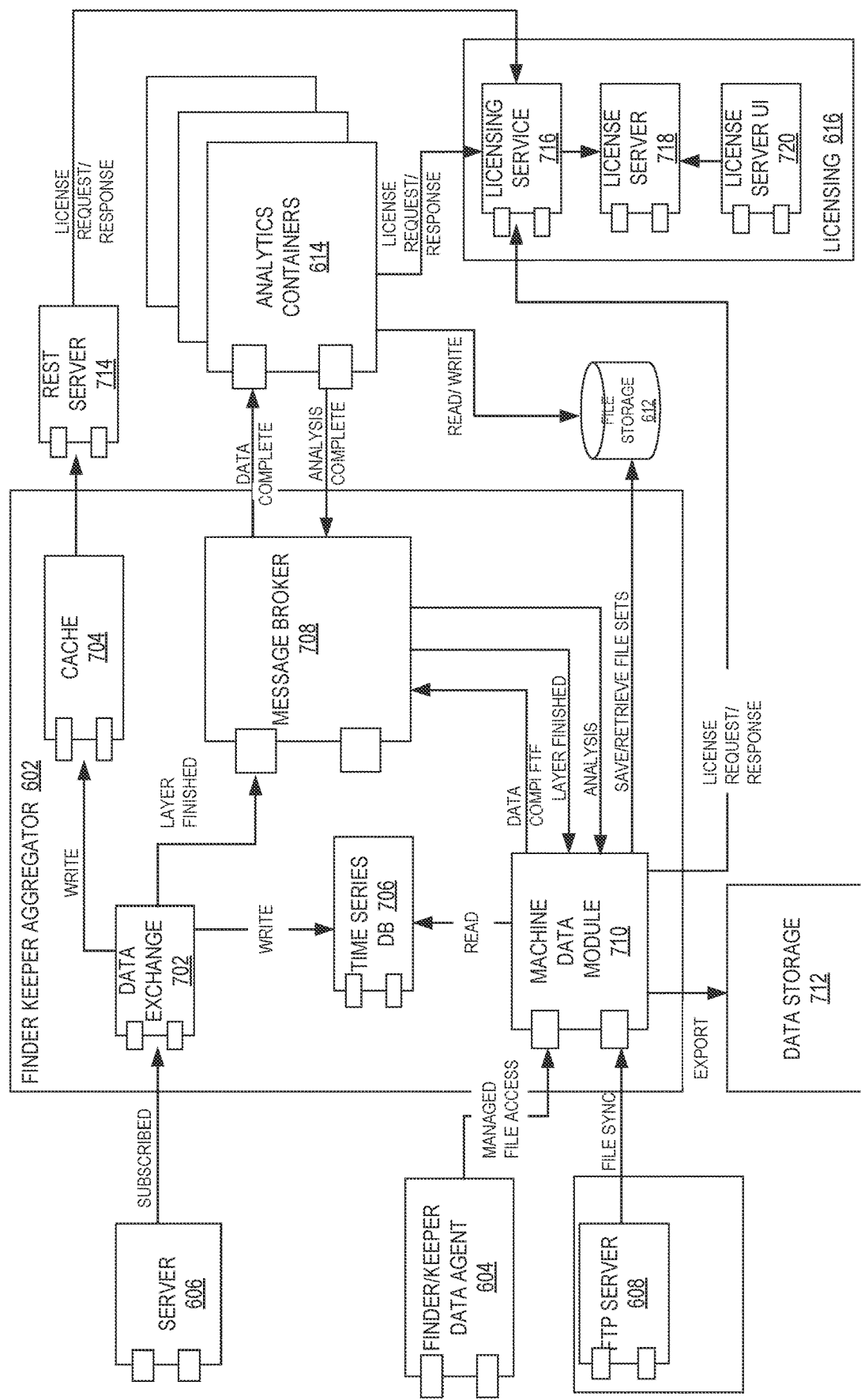
FIG. 7 provides a more detailed view of the example aggregator circuitry of the example of FIG. 6.

FIG. 7 provides a more detailed view of the example aggregator module/circuitry 602 (e.g., the finderkeeper) of the example of FIG. 6. In the example of FIG. 7, the aggregator 602 includes a data exchange 702, a cache 704, a time series data store 706, a message broker 708, and a machine data module 710. The example data exchange 702 receives data 603 from the server 606 according to a subscription, such as laser rail temperature, platform temperature, dew point temperature, percent oxygen, filter pressure, control events, build metadata, etc. The example data exchange 702 writes the incoming data to the cache 704 and/or to the time series data store 706, depending on the data. Time series data can include meltpool data and/or other sensor data that has been selected and monitored over a period of time (e.g., 10 seconds, 1 minute, 10 times per second, once per minute, etc.) to form a time series of data for the corresponding sensor. Additionally, the example machine data module 710 has managed file access to before and after recoat images 605 via the data agent 604. The FTP server 608 also synchronizes a data file with the machine data module 710 including meltpool time series data 607.

When the data exchange 702 receives an indication that a build layer has been completed, the data exchange 702 notifies the message broker 708, which also receives a message from the machine data module 710 indicating that its data transfer is complete. The machine data module 710 reads time series data from the time series data store 706 and interacts with the message broker 708 to receive layer completion and analysis information. The machine data module 710 can export data to a data storage 712 and/or save and/or retrieve file sets from the file storage 612, for example. The machine data module 710 can also send a license request and/or response to the licensing processor 616 for access to and/or use of the data and associated analysis, for example.

The message broker 708 queues build status, data status, analytic status, etc., in response to input from the data exchange 702 and the machine data module 710, for example. The message broker 708 provides data to the analytics container(s) 614 which process the data and return analytics to the message broker 708. The analytics container(s) 614 can also retrieve and/or store data to the file storage 612, transmit a license request/response to the licensing processor 616, etc. One or more models (e.g., digital twin, physics-based model, data science model, other AI/ML, etc.) process the data in one or more analytics containers 614 and provide analysis to the message broker 708. The message broker 708 provides analysis and layer completion information to the machine data module 710, for example.

As shown in the example of FIG. 7, the cache 704 provides a representational state transfer (REST) server 714 with information stored in the cache 704 by the data exchange 702. The REST server 714 transmits a license request/response to the licensing processor 616 based on the data from the cache 704. The example licensing processor 616 includes a licensing service 716, a license server 718, and a user interface 720 to process license request/response information from the REST server 714, the analytics containers 614, and/or the machine data module 710 to determine authorization for access to and utilization of information and analytics, for example. The example licensing processor 616 can determine which analytics container(s) 614 are enabled for use given a particular additive manufacturing machine 100, user, build, and/or other constraint, etc.

As such, the example system of FIGS. 6-7 provides data aggregation of sensor, machine state, settings, recoat settings, meltpool intensity, etc., and enable orchestration to determine and/or otherwise generate state events that drive behavior on a layer-by-layer basis for a build in the additive manufacturing machine 100. Queues (e.g., in the message broker 708, etc.) allow for extensible coordination of data collection and analysis activities, for example. Such a modular data management system can be leveraged across multiple applications. The modular, componentized architecture separates ingestion, processing, and presentation of results.

Figure 8:
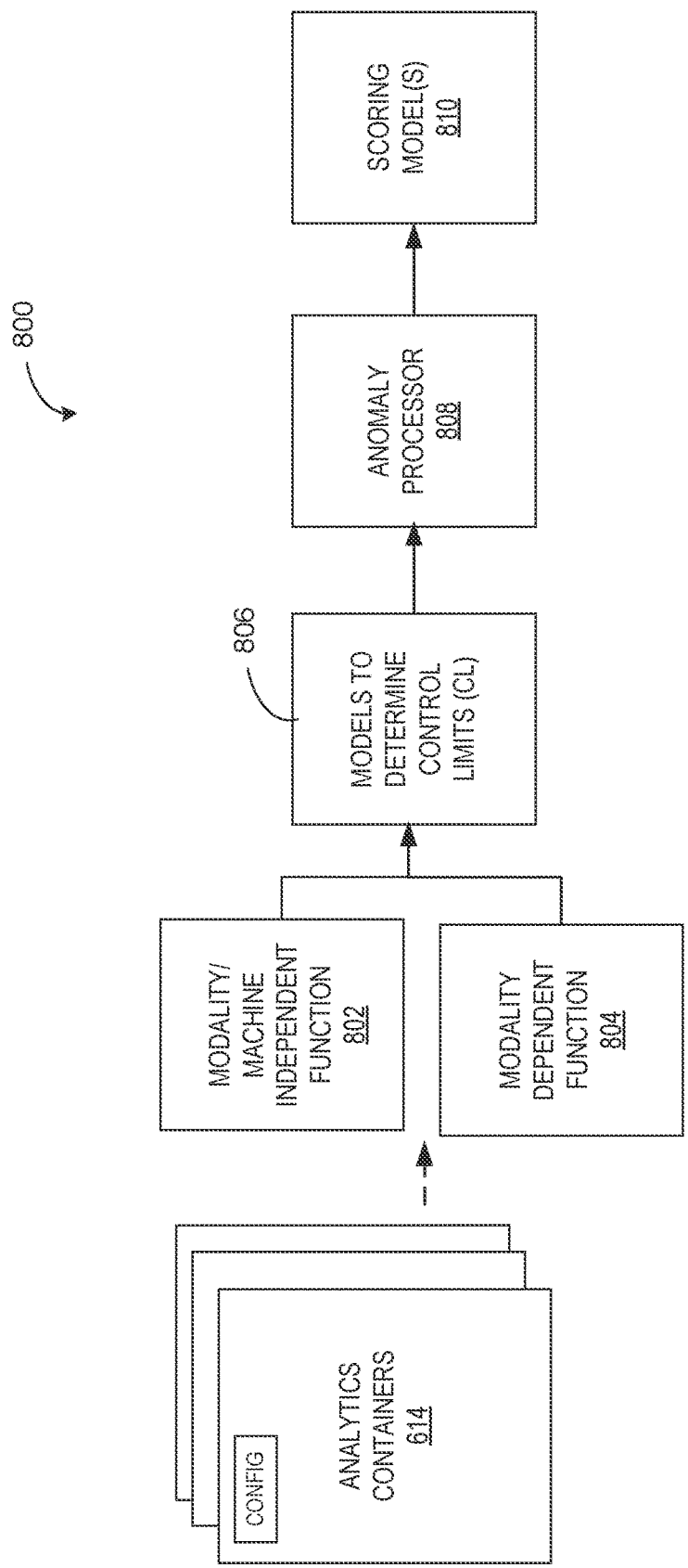
FIG. 8 illustrates an example of analytics functions that can be implemented in one or more analytics containers of the example of FIG. 6.

FIG. 8 illustrates an example of analytics functions 800 that can be implemented in one or more analytics containers 614. As shown in the example of FIG. 8, the analytics container(s) 614 can implement modality and/or machine independent functions 802 to compute statistical features and modality dependent functions 804 to compute domain specific features. The functions 802, 804 are provided to one or more models 806 (e.g., AI models, physics-based models, data science models, etc. such as the example physics model 411, data science model 412, diagnostic model 416, and/or hybrid model 418 of FIG. 4, etc.) to determine control limits (CL). An anomalies processor 808 processes the CL determined by the model(s) 806 to identify one or more anomalies for individual features where a CL is exceeded. One or more scoring models 810 and/or methods combine multi-feature results in an overall layer score. As such, a score for build health, etc., can be determined for a layer of the build using the analytics such as set forth in the example analytics container(s) 614 of FIG. 8.

For example, a modality dependent function can be implemented as a model representing a filter coefficient, also referred to as a filter clogging coefficient, Fc. In one example, the filter coefficient, Fc, can be calculated, and the calculated Fc can inform in situ filter purging and/or cleaning during a build, etc. Measurements such as temperature and pressure are taken before and after the filter, and flow rate is measured to determine the filter coefficient. These measurements in combination with the dimensions of the physical filter unit enable defining the non-liner filter coefficient equation. The filter coefficient is a characteristic property of the filter, which is an independent, dimensionless feature that can be adjusted for compressible or incompressible gas. Thus, the filter coefficient is a function of gas temperature, volumetric flow, differential pressure, and filter porous number.

For example, a volumetric flow rate of a fluid, v̇, and a pressure drop across the filter, ΔP, can be used with a known area of a filter, A, and a density of the fluid, ρ, to calculate a discharge coefficient, Cd, and filter coefficient, Fc, as follows:

$$Fc = Cd * A = V\sqrt{\frac{\rho}{\Delta P}}.$$ (Equation 1)

The function of Equation 1 can be generated by a physics model (e.g., digital twin), regression model, etc., and provided for use to determine the filter coefficient and associated status of the filter, associated environment/component(s), etc., for example.

Computation of the filter coefficient enables the analytics processor 510 to understand machine health of the additive manufacturing machine 100. The filter coefficient is a function of material parameters, multiple sensors, and geometric aspects of additive machine hardware. Such a coefficient can be calculated in a single-layer analysis and expanded to a multi-layer analysis to assess overall build and machine health, for example. While a filter issue can be identified by analyzing a single layer of a build, inertization involves combining multiple layers to assess machine health, for example. In certain examples, analyses from multiple layers, multiple sensors, etc., and associated levels of risk (e.g., good, warning, critical, etc.) can be combined into an overall machine health score (e.g., formed from a combination of coefficients, other values, comparison to a threshold, etc.).

Another example of physics based function or modality based function is the cathode health function for the EBM machines. A physics based model for the cathode health is designed and developed as function of the cathode temperature, cathode brightness and the vacuum environment:

Cathode Temperature=f(Cathode Power);

Cathode Brightness=f(beam current,grid voltage); and

Vacuum Environment: Ratio of Actual Vacuum/Ideal Vacuum Levels machine.

Inertization, pumping down to remove oxygen, etc., can be analyzed based on a material being used (e.g., process health can vary based on material used, etc.). For example, some materials can be used with good quality results at 1.9% oxygen. Other materials are more effective or require less than 1% oxygen (reactive materials).

As such, the analytics processor 510 stores data for a plurality of builds for one or more machines including build/machine data and associated analytics. Build and/or machine data can be exported by the analytics processor 510 to an external device, long-term storage, etc., for further processing, analytics, etc. Meltpool data is synchronized with control events to identify a pattern for each layer of a build, each build, etc. The additive machine controller 120 transfers files/data to the analytics processor 510, which can manage file access and save images, log files, audit records, etc., for a build, build layer, additive manufacturing machine 100, machine component, etc. Data frequency, data format, data source, data destination, etc., can be adjusted by the data aggregator 602 of the analytics processor 510, for example. Analytics can be modality-specific, modality-agnostic, etc., with each analytics container 614 representing a methodology. Output of the analytics can be displayed via the HMI 620, provided to the additive machine controller 120 to adjust additive machine 100 configuration/operation/build/etc., and/or directly to the additive machine 100 to adjust one or more settings of the additive machine 100, for example.

As such, the example analytics processor 510 can be used to determine and/or otherwise analyze individual feature(s) of a build, process, additive manufacturing machine 100, etc., as well as correlated features for a given layer of a build, correlated features across multiple layers, etc. The analytics processor 510 can drive orchestration of one or more parts of the additive manufacturing machine 100 and/or its controller 120 with respect to recoat imaging, temperature(s), pressure(s), torque, voltage/amperage, etc.

In certain examples, an overall health score can be determined for a layer of a build based on one or more of such analyzed factors/features. The health score can be evaluated to classify, rank, or categorize the health of the build/machine/etc. For example, an overall layer health score is deemed 'critical' if any one sensor has been evaluated as 'critical'. Similarly, the overall layer health score is deemed 'good' if all sensors are evaluated as 'good'. An analysis falling in between 'critical' and 'good' can be classified as a 'warning', for example. In certain examples, sensor(s) can be weighted based on an importance associated with the respective sensor, and the overall health score can be adjusted accordingly (e.g., providing a weighted result). In certain examples, a given subsystem may have multiple types and/or quantities of sensors, as well as sampling rates, which are taken into account based on the subsystem and overall subsystem and/or machine component health. Trend analysis over time can be used to evaluate multiple sensors at multiple sampling rates, and can provide comparison(s) across multiple builds. Some anomalies may be expected given particular machine performance in a given layer (e.g., significant exposure area for multiple lasers may expect a temporary slight rise in temperature, etc.), and some anomalies are not expected. Both expected and unexpected anomalies can be identified and addressed and/or otherwise flagged. Alternatively or additionally, probability-based computation can be used to evaluate build/machine health. For example, an extent of 'severity' can be computed based on 'how far' the current/measured/calculated value is from an expected value. The expected value can be dynamically updated or computed. The greater the distance, the higher the probability that the health/health risk is classified as 'severe', for example. For example, values such as oxygen leak over time, galvanometer degradation (e.g., higher galvo temperatures), drive/torque on a z-axis (e.g., correlated with temperature/current), chiller temperature, etc., can be evaluated and assigned a rating or severity value or score.

A score can be assigned based on an extent of compliance with or deviation from an expected and/or reference value, range, threshold, etc. For example, a score of 1-3 is good (e.g., represented in color as shades of green, etc.). A score of 4-6 is acceptable (e.g., represented in color as shades of yellow/orange, etc.), for example. A score of 7-9 is problematic (e.g., represented in color as shades of red, etc.), for example.

In one example, chiller outlet temperature can be monitored and compared to a reference/expected temperature (e.g., 22.5 degrees Celsius, etc.) with a deviation of 0.5 degrees Celsius. The temperature and its deviation from the reference can be evaluated and scored, and a deviation greater than the 0.5 degree threshold can be flagged, for example.

In another example, maintaining pressure in a process chamber is important to maintain consistent focus of the laser and/or other emitter 130 in some additive manufacturing machine 100 implementations. A sudden drift in pressure moves the scanners and effects focus and position of laser and/or other energy beam 131 incidence. As such, an expected pressure value can be derived from a previous n layers of the build, and deviation from the expected pressure value can be determined using SPC metrics such as performance (Cpk), which evaluates deviation in terms of severity/probability, etc.

In another example, a layer-level assessment can be conducted for a time taken for the electron/energy beam 131 to preheat the layer, as well as a time taken by the beam 131 to melt the layer to form the part. A build may include four thousand layers, for example. For each layer, a distribution of preheat and melt times can be determined. The distribution for a current or selected layer can be compared to an aggregate or trend of the preheat times and melt times across the plurality of layers. Based on the comparison, the preheat and melt times for the current/selected layer can be associated with a probability and severity score. The scores can be added to assign a severity to the layer. For example, based on a numeric score, the layer can be assigned a low (e.g., green), medium (e.g., yellow), or high (e.g., red) severity, etc. Several aspects can be combined for the current/selected layer to yield a composite/aggregate score, for example. Scores for several layers can be combined to provide a cumulative assessment, for example.

The analytics processor 510 facilitates sensor and control system data collection such as from simple sensor(s) (e.g., a signal with a raw value, such as temperature, oxygen (O2) concentration, dew point, etc., along with a time stamp) and/or advanced sensor(s) (e.g., CMOS camera, line scan camera, thermal camera, etc.). Machine control state value(s) (e.g., recoater position, commanded laser position, laser on/off, laser scan strategy (e.g., BulkExposure, ContourExposure, etc.)) can also be collected with associated time stamp. Machine control event(s) (e.g., LayerStart, LayerEnd, RecoatStart, RecoatEnd, ExposureStart, ExposureEnd, etc.) and associated time stamp(s) can also be collected. Part metadata, such as number, name, bounding box, etc., can also be collected. The analytics processor 510 can process large datasets from simple and advanced sensors which avoid storing/transferring large datasets. Instead, the analytics processor 510 extracts and uses information such as image/video analysis, time and frequency-based analysis of high-frequency time series signals, etc., and provides data compression for efficient transfer and long term storage.

Having access to a collected data set for the build, additive manufacturing machine 100, associated process, etc., enables a layer-based analysis on a unified, rather than siloed, set of sensor values and other data via the analytics processor 510. The analytics processor 510 can then flexibly organize the data (e.g., per part, per layer, per scan strategy, per subset(s) of parts, etc.). The analytics processor 510 is better able to interpret nominal/anomalous sensor values for statistical process control when the machine control state is available using the aggregated data set, for example.

The analytics processor 510 can provide control system interaction and feedback. For example, analytics results can create warning(s) and alerts to be displayed in the control interface (HMI) 620 to inform a next action. Analytics results can drive control actions by the additive machine controller 120 to correct a detected issue, such as stop a build, perform recoat again, change setpoints, etc., driven by the analytics processor 510. As such, the analytics processor 510 drives both quality improvement and yield performance. In certain examples, network security hardening and other protection enables data forwarding from the analytics processor 510 by enabling recorded data and analytics results to be transferred to long term storage periodically in smaller increments instead of as a batch upload after the build. Reporting and visualization can also be driven by the analytics processor 510 during/after each layer of a build, etc., and can be accessible from the additive manufacturing machine 100 and via the network, driven by the analytics processor 510, for example.

In certain examples, the analytics processor 510 drives state management for the additive manufacturing machine 100 and maintains a plurality of queues relating to the additive machine 100, a build, another process, etc. The example system 500 listens for additive manufacturing machine 100 state events (e.g., LayerStart, LayerEnd, BuildStart, BuildComplete, BuildPaused, etc.) and notifies the analytics processor 510 and associated application(s) to trigger processing of a layer's data. Queues (e.g., of the message broker 708, etc.) are used to notify application(s) from a single state event change. For example, the state event is used to create a message (e.g., which includes metadata such as BuildID, timestamp, layerIndex, etc.) which is placed in the queue. The analytics containers 614 subscribe to messages from this queue, perform their activities, and then publish a message on a different queue for analytics status. The machine data module 710 application subscribes to messages from the analytics status queue so that when the analytics are complete per layer, the data is uploaded to a long term storage area, for example. In certain examples, the analytics processor 510 analyzes data with respect to certain metrics/analytics for each layer of a build and, periodically, analyzes data with respect to other metrics/analytics every several layers (e.g., every 5 layers, 10 layers, etc.). Such aggregation can be used in conjunction with prior build data to inform a predictive build forecast based on trend and predictive probability/uncertainty, etc.

Figure 10:
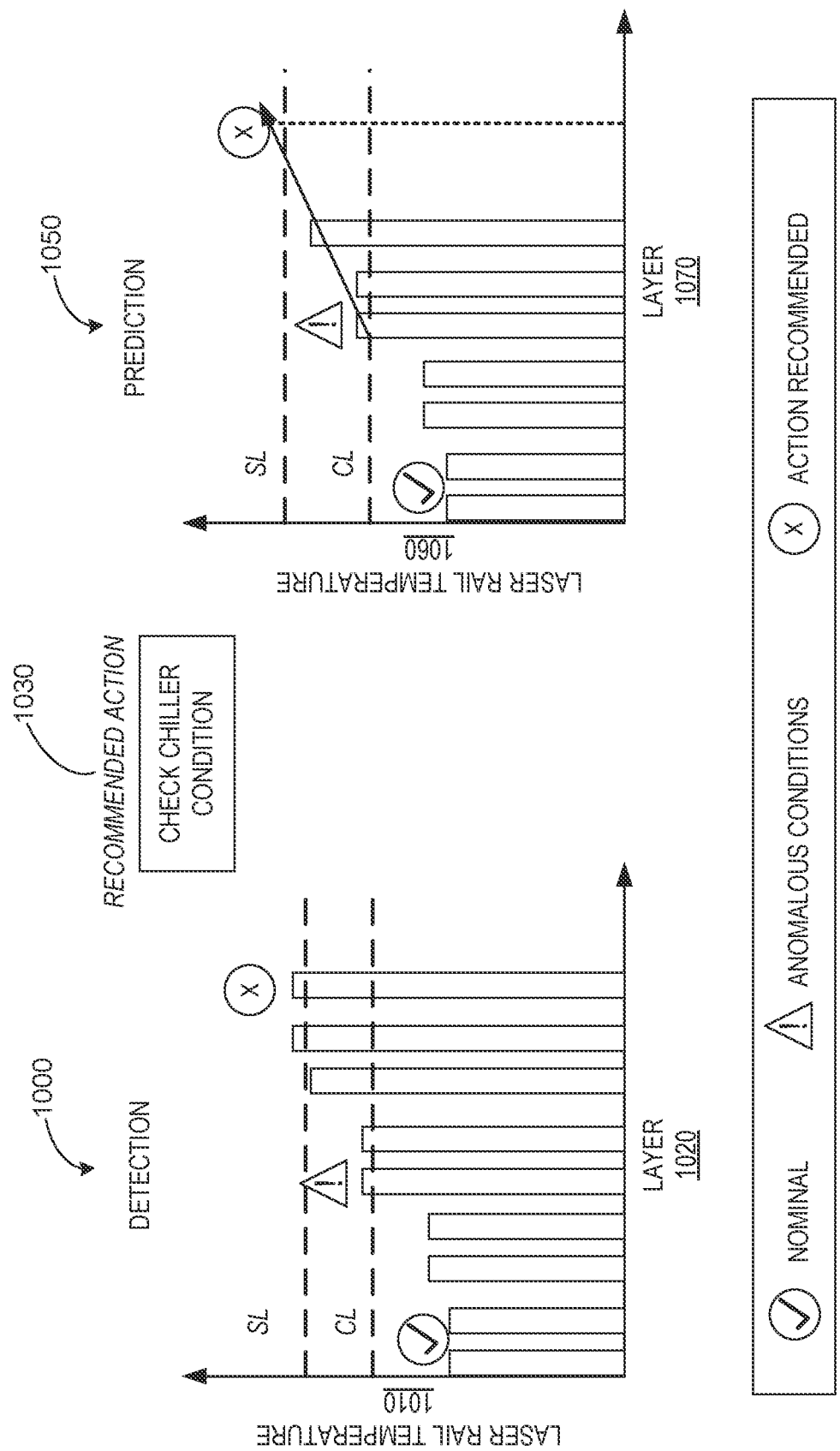
FIG. 10 illustrates an example detection chart and an example prediction chart to provide a recommended action.

FIGS. 9-10 illustrate examples of machine health analytics visualized such as via the example HMI 620 and/or other actionable output (e.g., interactive dashboard(s), parameter/configuration change(s), build adjustment(s), state change(s), etc.). For example, FIG. 9 shows an example listing of sensors 910 (e.g., residual oxygen percentage, laser rail temperature, dew point temperature, actual heating temperature, differential pressure, etc.) and specified limit(s)/threshold 920 associated with the respective sensor 910. An impact on machine health 930 (e.g., inertization leak, chiller health, process chamber condition, heater condition, filter health, etc.) of the parameter associated with the sensor 910 is also provided, along with a tracked metric 940. An indication of layer anomaly detection 950 is provided along with a health score 960, for example. Such a dashboard 900 can highlight results of a single layer anomaly detection 950 by the analytics processor 510 (e.g., based on exceeding the specified limit(s) 920, etc.), for example. Layer identification can be highlighted for each available sensor with an aggregation of results to determine an overall health score. A current layer value (e.g., in the layer anomaly detection 950) can be indicated with an asterix and/or other visual indicator, for example. Data and associated analytics driving the example dashboard 900 can form a foundational aggregation of a complete build data set, for example.

FIG. 10 illustrates an example detection chart 1000 and an example prediction chart 1050 comparing laser rail temperature 1010, 1060 by layer 1020, 1070 to provide a recommended action 1030. Such charts 1000, 1050 focus on sub-system health (e.g., laser, etc.) and can be used to trend and track exceedance over time, which can drive assessment and confirmation of severity by the analytics processor 510. In certain examples, a root cause of a problem can be diagnosed by multi-sensor correlations and associated setting/configuration checks.

As shown in the example of FIG. 10, a control limit (CL) and a specification (spec) limit (SL) are tracked to determine one or more layers that exceed the CL and/or the SL to trigger corrective action 1030. A value (e.g., laser rail temperature 1010, etc.) that is below the CL is considered nominal, for example. A value that exceeds the CL but is below the SL is considered an anomalous condition, for example. A value that exceeds the SL is considered a condition triggering an action to address, for example. By tracking the CL and SL over multiple layers, issues can be detected and corrected. In some examples, a defect or issue in one layer can be corrected through corrective adjustment of subsequent layer(s) (e.g., "self-healing"). In other examples, a build is scrapped and setting(s) adjusted for a future build.

In certain examples, powder layering in the additive machine 100 can be monitored for imperfections. Uneven powder layering in the powder bed 110 can lead to poor part quality. For example, as described above, a motor drives the powder distributor 108, which can be a rake or recoater including rake teeth 107, to fetch powder and/or other raw material 141 from the raw material hoppers 140a, 140b and spreading the powder/raw material 141 uniformly across the build plate 111 to form the powder bed 110. The powder distributor 108 and/or its associated motor can include or be connected to a sensor to measure motor torque as the rake/recoater is moved to distribute the powder 141 with its teeth 107. The motor data can be provided to the analytics processor 510 by the controller 120, and the analytics processor 510 can analyze the motor torque data to identify obstacles and/or abruptions in the powder bed 110. An aberration in the powder bed 110 can then be addressed once identified.

Figure 11:
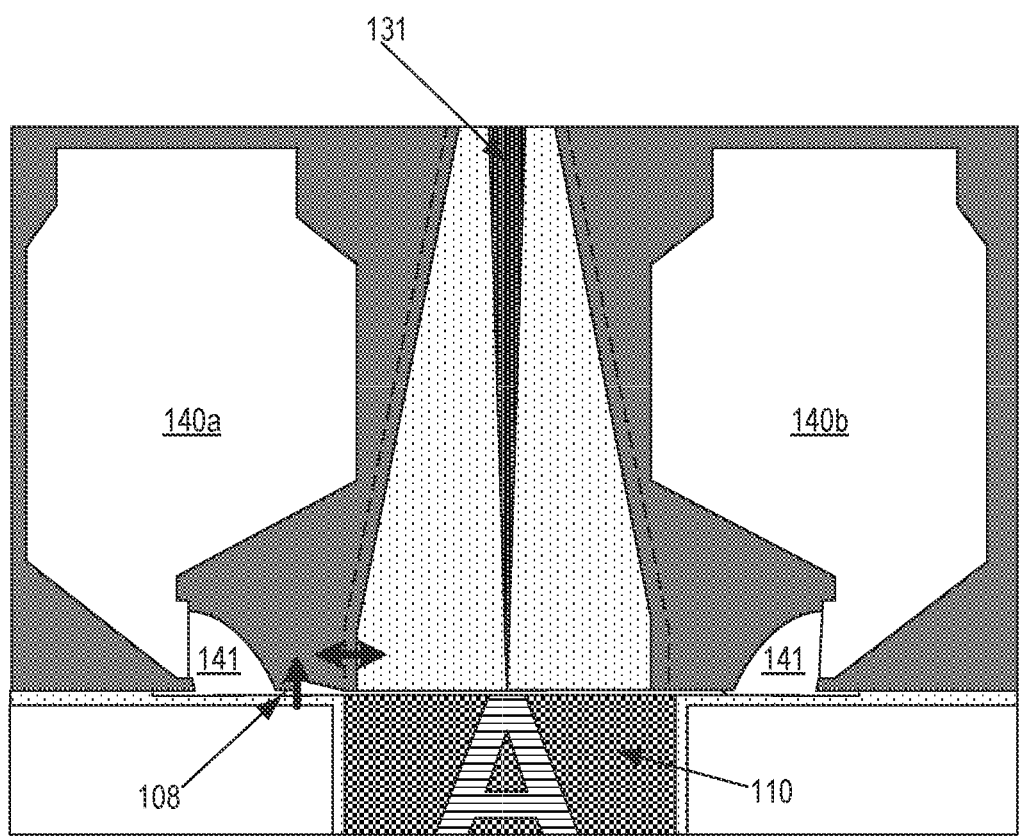
FIG. 11 illustrates a portion of the additive machine of FIG. 1.

FIG. 11 illustrates another view of a portion of the additive machine 100 in which the powder distributor 108 implements a rake with a motor to fetch, spread, and sweep powder/raw material 141 from the raw material/powder hoppers 140a, 140b to form the powder bed 110 onto which the energy beam 131 is emitted by the emitter 130 (not shown in this view). Torque data can be extracted from the motor associated with the rake 108, and deviation in the torque data beyond a "normal" or standard deviation can be indicative of an error or issue.

For example, rake and/or recoater motor torque data can be analyzed over the build area 111. Movement of the rake/recoater 108 can be divided into three phases: fetch (e.g., fetching the powder 141 from the hoppers 140a, 140b), spread (e.g., spreading the powder 141 over the build plate 111), and sweep (e.g., sweeping the powder 141 evenly to form the powder bed 110). During a build, maximum torque for a layer can be analyzed in each of the three phases. Based on historical data, a normal or standard deviation can be quantified. Torque that extends beyond that standard deviation can be identified and used to trigger an alert, alarm, further processing, etc., as indicative of a problem or other issue in distribution of powder/raw material 141 and uniformity of the powder bed 110 across the build area 111. Once identified, movement of the rake and/or recoater 108 can be adjusted, evaluation of the powder hopper(s) 140a, 140b can be triggered, the build can be scrapped, and/or other troubleshooting/maintenance of the additive manufacturing machine 100 can be initiated, for example. By monitoring rake motor torque in operation during a build, for example, an aberration in the powder bed 110 can be identified, which triggers an in situ corrective action such as stopping the build, altering a process parameter, re-raking the powder and/or other raw material 141, etc.

For example, motor data indicating one hundred percent torque can be indicative of the rake 108 being stuck in one position resulting in a rake failure or rake fault error. A reading of zero torque can indicate that the motor has been disconnected from the rake 108, for example. Lack of rake 108 movement triggers an error and alert for preventative maintenance and/or corrective maintenance by changing and/or otherwise maintaining bearings and/or other parts of the rake and motor 108, monitoring torque trends over time compared to a baseline for the additive manufacturing machine 100, etc.

Similarly, a lubrication issue (e.g., burn out of vacuum grease, etc.) can cause rake 108 movement to deteriorate. Rather than stopping the build, the issue can be flagged for maintenance (e.g., application of more grease, etc.) after the build has finished, for example. Preventative maintenance can be triggered based on analysis of torque trends over time (e.g., normalized or otherwise adjusted against a baseline for the particular additive manufacturing machine 100).

Figure 12:
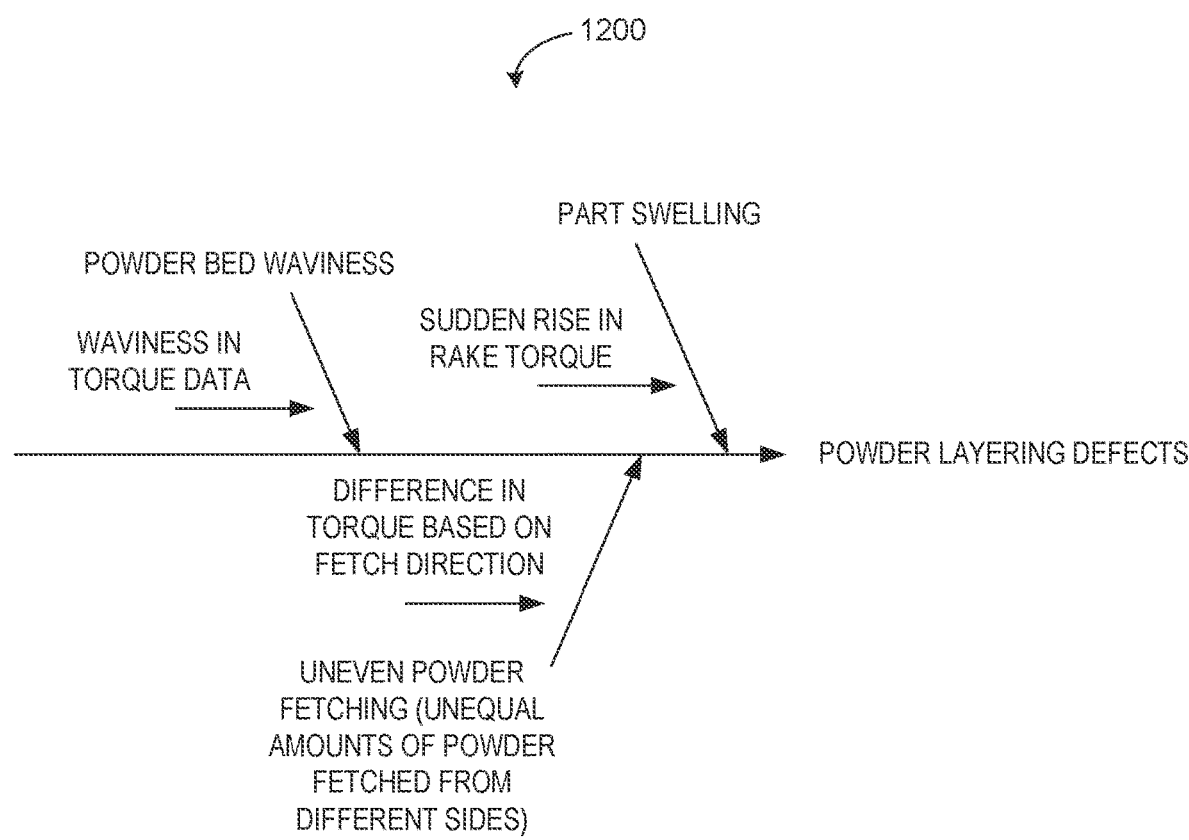
FIG. 12 is a failure model diagram of failure modes driving powder layering defects.

Powder bed 110 aberrations can include powder bed waviness, uneven powder fetching, and part swelling, for example. Errors/aberrations in powder bed can be identified and adjusted for a variety of additive machines 100 including EBM, DMLM, BinderJet, etc. A failure mode driving powder layering defects can be identified such as in the failure model diagram 1200 of FIG. 12. As shown in the example relationships of FIG. 12, powder bed waviness can be identified based on waviness in captured motor torque data. Uneven powder fetching can be identified using a difference in torque based on fetch direction. Part swelling can be determined by a sudden rise in rake torque.

With powder bed waviness, a build may be stopped before the waviness causes a crash. Alternatively, the build may continue if the part is swollen, and the additive manufacturing machine 100 can be stopped after completion of the board. In some examples, activity of the additive machine 100 is adjusted (e.g., reduced or scaled back) for a few layers to attempt to correct the waviness in the powder bed 110 (e.g., by cooling down the additive machine 100, allowing the rake 108 to adjust the powder bed 110, etc.). Maintenance can also be triggered to evaluate bearings, add lubrication, etc.

Uneven powder fetching can occur when the rake 108 is off-center. When the rake 108 is off center, the rake 108 is fetching more powder/raw material 141 from one hopper 140a, 140b than the other hopper 140a, 140b. In certain examples, uneven powder distribution can be determined by evaluating a delta or difference in torque from left to right for a given layer, as well as a mean delta torque at a build level. If delta torque is greater than a threshold (e.g., 2%, 3%, 5%, etc.) in spread and fetch phases, uneven powder fetching may be occurring. The rake 108 position can be adjusted (e.g., re-centered, etc.) in situ to the allow the build to continue, for example.

When part swelling occurs, the build can be stopped and the swollen part removed. Melt parameters can be adjusted for swollen parts. In certain examples, images are analyzed to identify the part(s) causing the part swelling. For example, melting can be turned off locally for a few layers at a given X-position. While melting is turned off, that portion can still be pre-heated. If parts are oriented in the direction of rake 108 movement, the part being swollen can be identified through comparison of image and/or sensor data. For example, more than ten consecutive transients identified in sweep and spread torque data can be indicative of part swelling. If parts are stacked, the swollen part can be discarded, but the remaining parts in the stack can be printed after parameter adjustment, for example.

In certain examples, the interface 530 provides an interactive display to surface status, statistics, trends, issues/problems, etc., in an ongoing build, prior builds, etc. Via the interface 530, a current and/or future build can be adjusted to account for issues, trends, etc., identified from monitoring, modeling, and analyzing build and machine data by the analytics processor 510, etc. FIGS. 13-17 illustrate example graphical user interfaces implemented by the interface 530 to provide information and facilitate interaction to address issues, modify a build, configure the additive machine 100 and/or the additive machine controller 120, etc.

Figure 13:
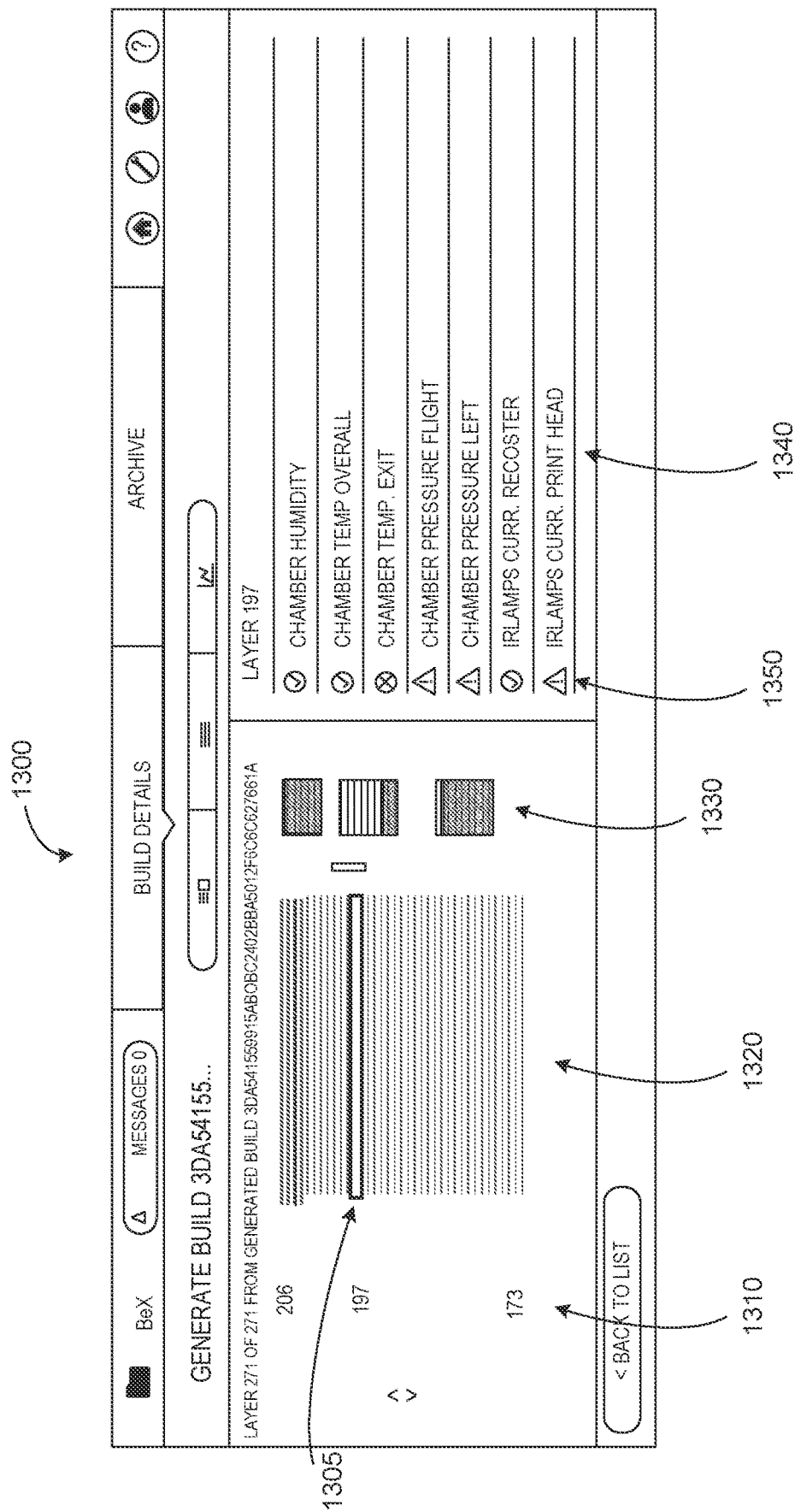
FIGS. 13-17 illustrate example graphical user interfaces to provide information and facilitate interaction to address issues, modify a build, configure the additive machine and/or the additive machine controller of the infrastructure of FIG. 5.

For example, FIG. 13 shows an interface 1300 that provides information and enables interaction regarding an ongoing build. In the example interface 1300, a particular layer 1305 can be selected for evaluation. Layers can be evaluated numerically 1310, via a portion 1320 of a build (e.g., a range of layers), and/or in the context of the whole 1330 build via the example interface 1300, for example. For a selected layer 1305, one or more associated metrics 1340 (e.g., temperature, pressure, current, humidity, etc.) can be displayed along with an associated indicator 1350, which indicates whether or not the metric 1340 is within an acceptable range or other limit. For example, the indicators 1350 can include a normal or acceptable indicator (e.g., a green indicator, a checkmark, etc.), a warning indicator (e.g., an orange triangle, an exclamation point, etc.), an error indicator (e.g., a red circle, an "X", etc.), etc. One or more metric 1340, indicator 1350, etc., can be selected to view the underlying information for the metric 1340 determining the character of the indicator 1350 (e.g., satisfactory, warning, error, etc.).

Figure 14:
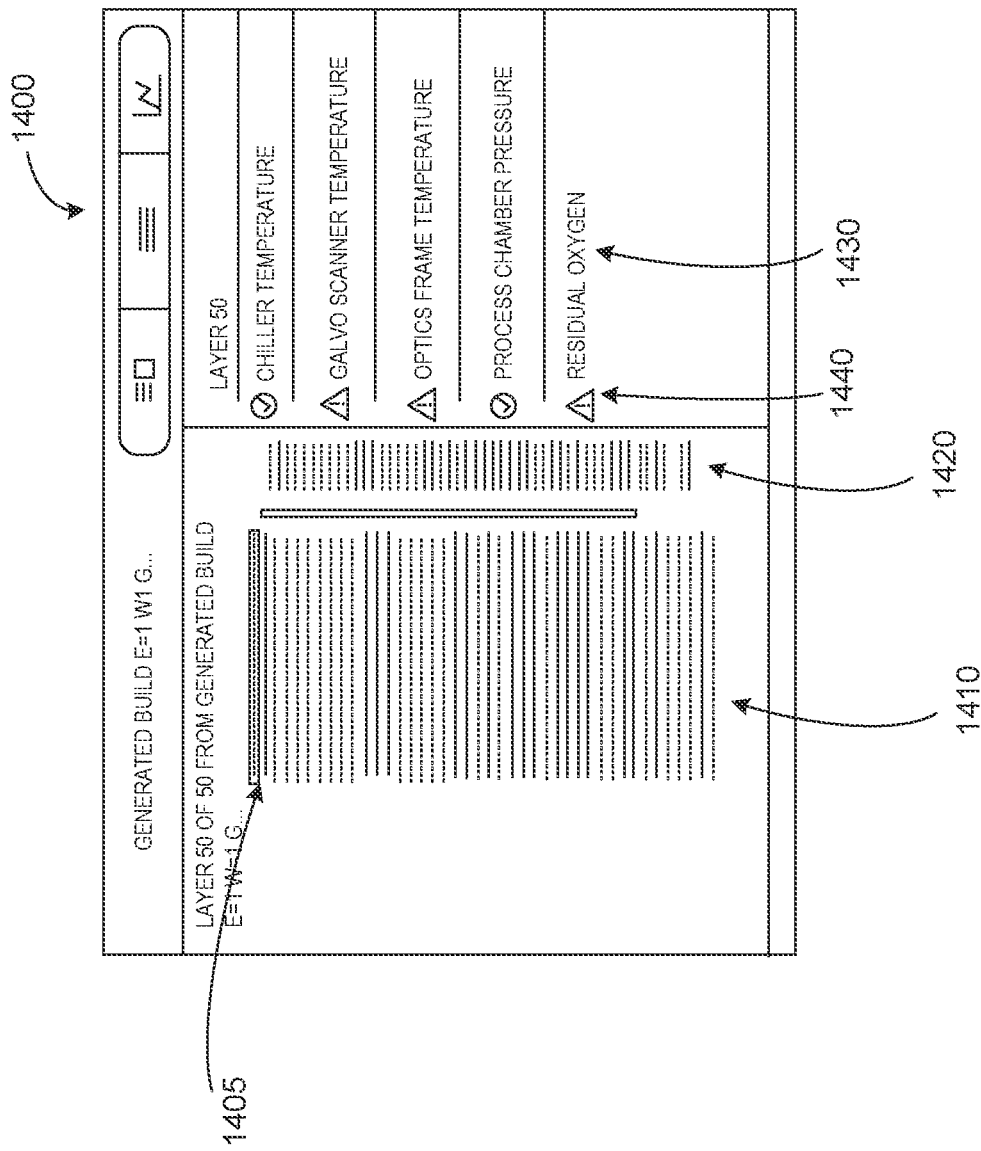

FIG. 14 illustrates another example interface 1400 which evaluates parameters 1430, rather than metrics 1340, for a selected layer 1405 viewed in a subset of layers 1410 and/or an entire build 1420 along with a set of indicators 1440 associated with the parameters 1430. As with the indicators 1350, the indicators 1440 associate a severity, warning level, status, etc., with each parameter 1430. As such, a viewer can tell if a pressure, temperature, oxygen level, etc., is normal/acceptable, high, low, warning, error, danger, malfunction, etc. The associated parameter 1430 can then be adjusted to address the indicator 1440 (e.g., when a pressure is high, a temperature is low, etc.).

Figure 15:
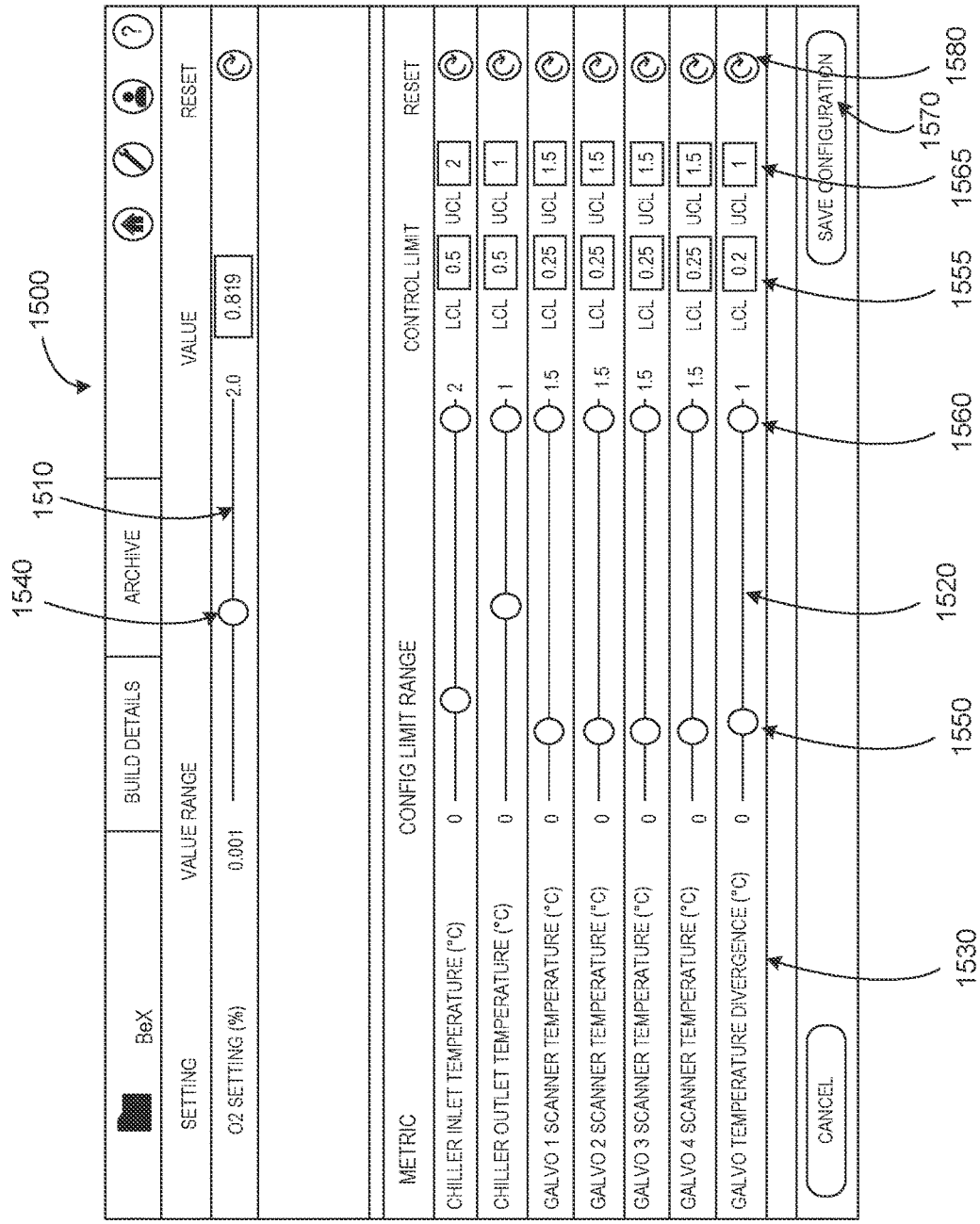

FIG. 15 shows an example interface 1500 enabling a user to set a series of sensitivity sliders 1510, 1520 for a variety of metrics 1530, oxygen level/percentage, etc. Using the interface 1500, a range or limit or sensitivity can be set by one or more endpoints 1540, 1550, 1560. For example, the oxygen (O2) setting can be determined using an endpoint 1540 to set a value along a sliding range 1510 for O2. For other metrics 1530, such as chiller inlet temperature, chiller outlet temperature, scanner temperature, temperature divergence, etc., boundaries can be set using a pair of endpoints 1550, 1560 to define a range, rather than a single value. Values corresponding to a lower control limit (LCL) 1555 and an upper control limit (UCL) 1565 are set based on the endpoints 1550, 1560 on the respective slider 1520. Alternatively or additionally, values 1555, 1565 can be overridden and entered apart from the endpoints 1550, 1560 on the slider 1520. One more values can be reset 1570 via the interface 1500, for example.

A configuration can be saved 1580 to be applied to the additive machine 100 by the additive machine controller 120 in conjunction with the analytics processor 510. For example, the interface 1500 (and/or 1300, 1400, etc.) can be driven by the analytics processor 510 as the interface 530. Working with the additive machine controller 120, build/machine status, issues, etc., can be visualized via the interface 530, and adjustments can be made via the controller 120 to adjust current and/or future builds using the additive machine 100, for example.

Figure 16:
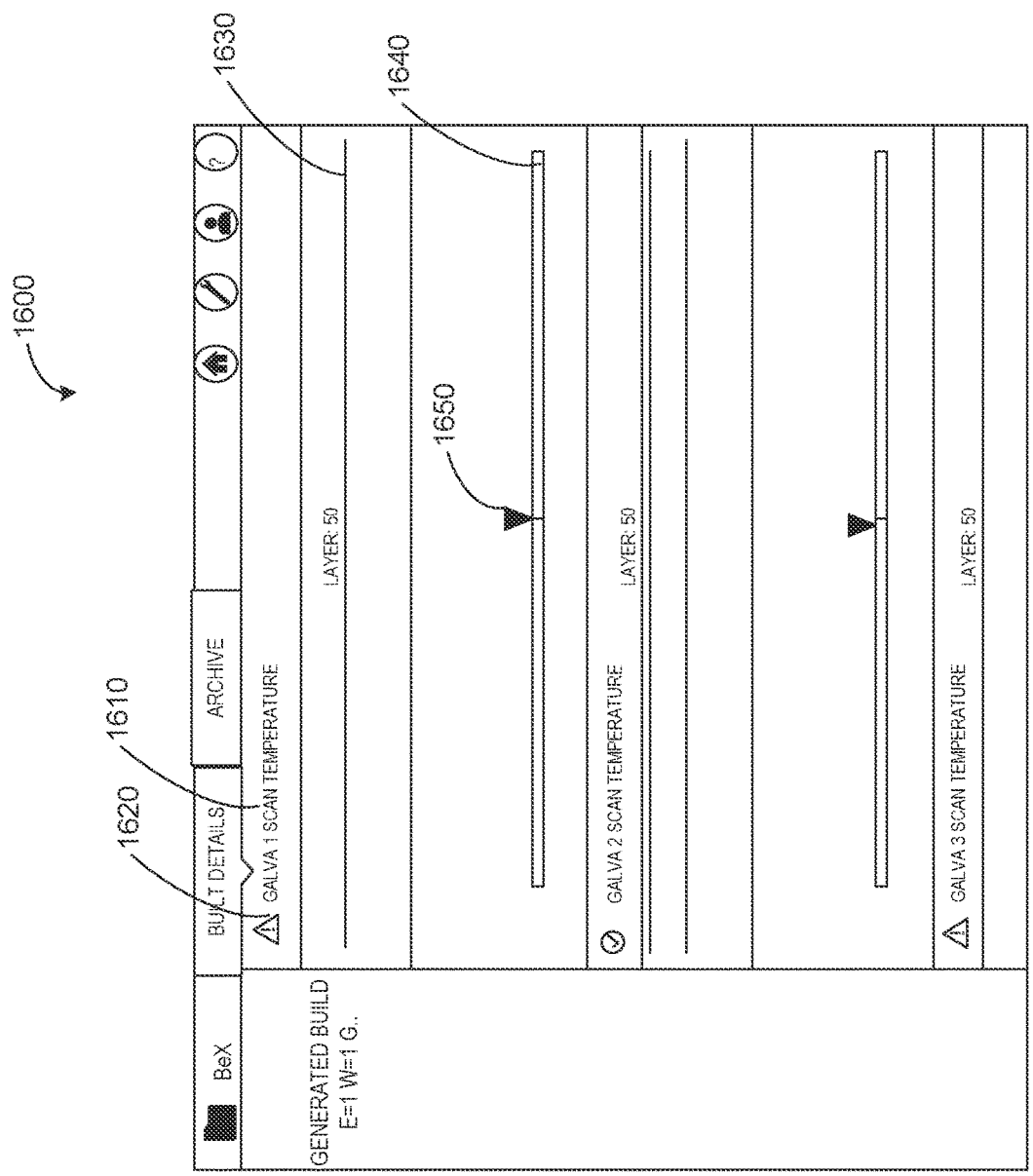

In certain examples, one or more parameters 1430 can be selected via the interface 1400 to display related metric(s) 1340. FIG. 16 illustrates an example detail view 1600 showing metrics 1610 and associated indicators 1620. For a given layer 1630, a range 1640 for the metric 1610 is displayed along with an indicator 1650 of the current/set value for that metric 1610. In some examples, the detail view 1600 shows whether then indicator 1650 aligns or does not align with a division in the range 1640 between good/bad, optimal/warning/non-optimal, etc.

Figure 17:
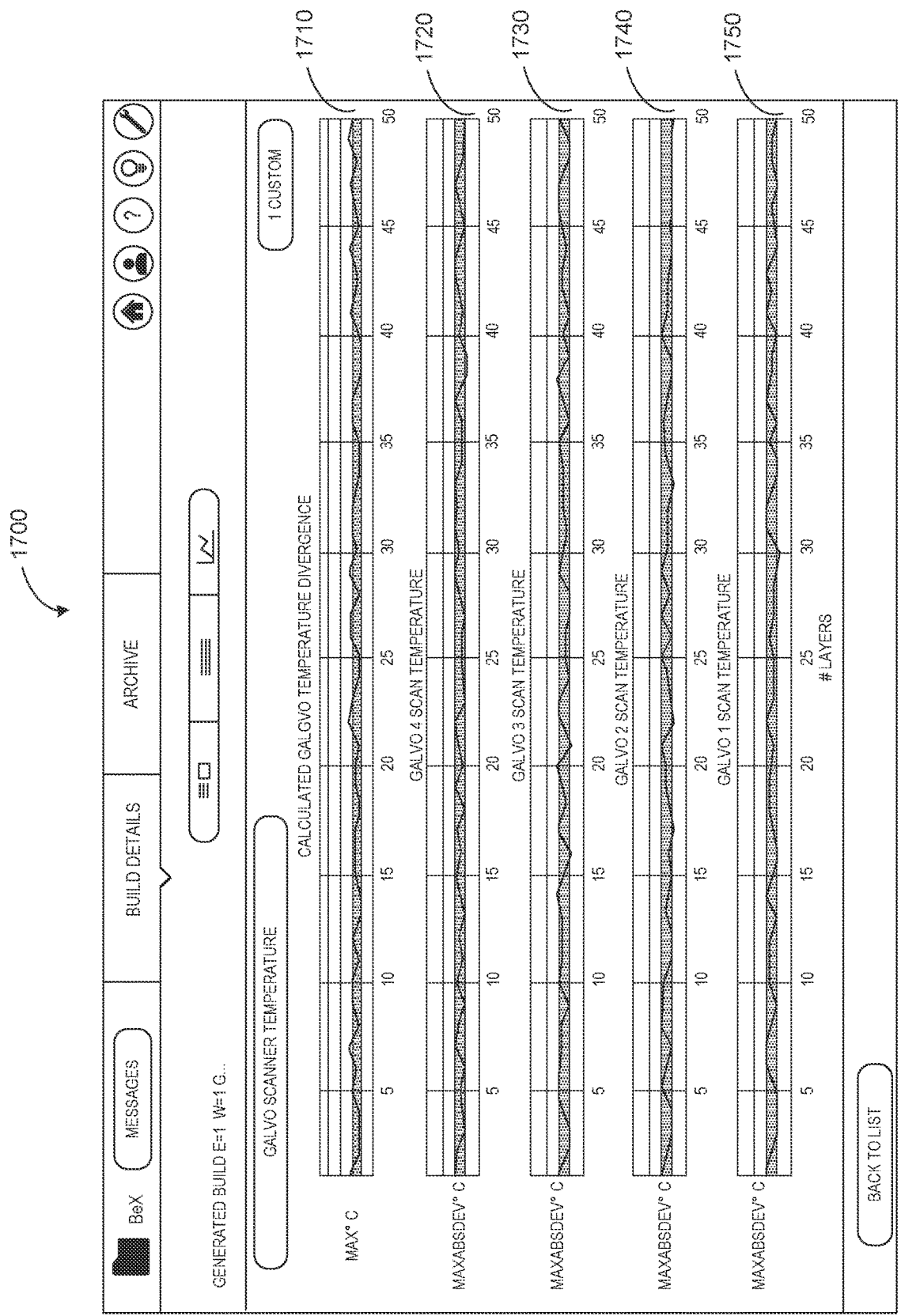

FIG. 17 illustrates another example interface 1700 providing a view of trends among a build or builds. The example interface 1700 shows a plurality of plots 1710-1750 of trends by parameter for one or more builds. Plots 1710-1750 showing trend views can be visualized together to gain an improved understanding of trends within a single parameter and/or among multiple parameters for a current build, prior build, etc. Trend information can be generated by the analytics processor 510 to predict an outcome (e.g., of the build), a change, an issue, a solution, etc. Trend information can be used by the analytics processor 510 to predict an outcome (e.g., of the build), a change, an issue, a solution, etc.

As such, the analytics processor 510 can drive the additive machine controller 120 to adjust the additive manufacturing machine 100 such as through the energy beam 131, temperature, rake/recorder 108 movement, build plate/platform 111 movement, powder/raw material 141 distribution from the hopper(s) 140a, 140b, etc.

Figure 18:
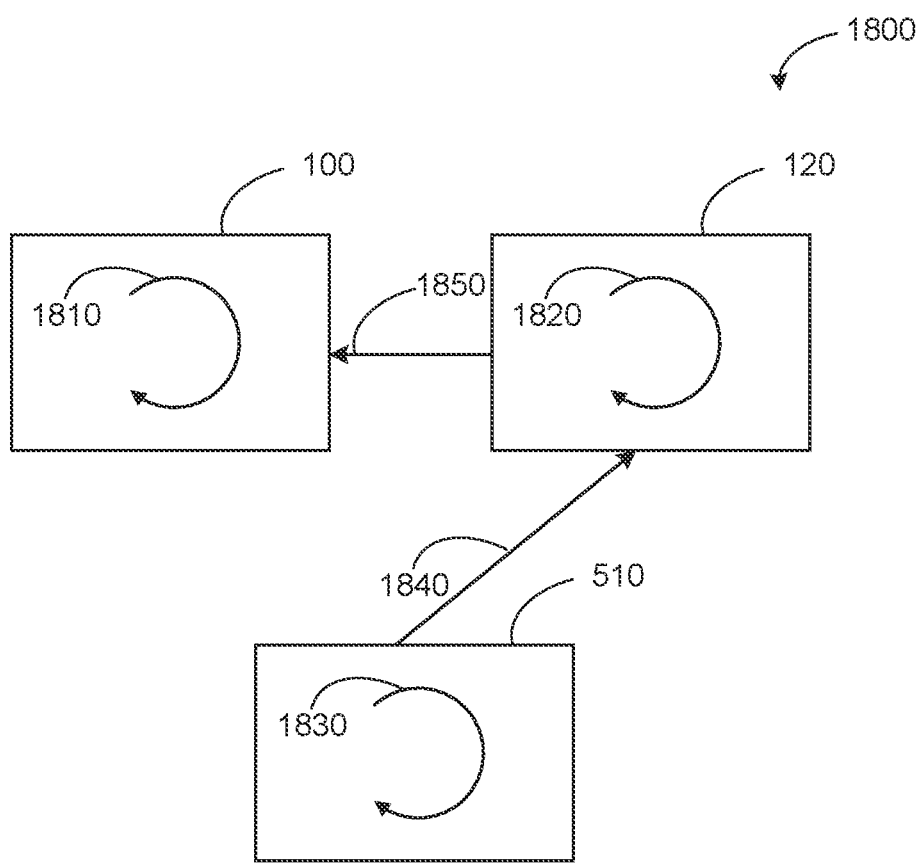
FIG. 18 is a data flow among the additive machine, the additive machine controller, and the analytics processor of FIG. 5.

FIG. 18 illustrates an example data flow 1800 among the additive manufacturing machine 100, the additive machine controller 120, and the analytics processor 510. The additive manufacturing machine 100 is executing a first process 1810, the additive machine controller 120 is executing a second process 1820, and the analytics processor 510 is executing a third process 1830, for example. More specifically, the additive machine 100 is executing a build of a part in the first process 1810. The additive machine controller 120 is monitoring and controlling the additive manufacturing machine 100 in the second process 1820, which is executing during the first process 1810. The analytics processor 510 is processing the monitoring data from the additive machine 100 and the additive machine controller 120 to model the additive machine 100 and the build, identify and/or predict issues, and adjust settings of/for the additive machine 100 to reconfigure and/or otherwise adjust the additive machine 100 directly and/or via the additive machine controller 120 in the third process 1830, which is executing during the first process 1810 and the second process 1820.

The third process 1830 of the analytics processor 510 determines a change to the additive machine 100 and/or the first process 1810 executing to build a part with the additive machine 100. The analytics processor 510 transmits, in a fourth process 1840, instructions to the additive machine controller 120. The additive machine controller 120 adjusts the additive machine 100 in a fifth process 1850. The additive machine 100 then operates according to a change in configuration driven by the fifth process 1850, for example.

While example implementations of the additive machine 100, the additive machine controller 120, the analytics processor 510, and the meltpool data acquisition processor 520 are illustrated in FIGS. 1-18, one or more of the elements, processes and/or devices may be combined, divided, re-arranged, omitted, eliminated and/or implemented in any other way. Further, one or more of the elements of FIGS. 1-18 may be implemented by hardware, software, firmware and/or any combination of hardware, software and/or firmware. Thus, for example, any of the example elements of FIGS. 1-18 can be implemented by one or more analog or digital circuit(s), logic circuits, programmable processor(s), programmable controller(s), graphics processing unit(s) (GPU(s)), video processing unit(s) (VPU(s)), accelerator card(s), digital signal processor(s) (DSP(s)), application specific integrated circuit(s) (ASIC(s)), programmable logic device(s) (PLD(s)), TPM(s), FPGA(s), and/or field programmable logic device(s) (FPLD(s)). When reading any of the apparatus or system claims of this patent to cover a purely software and/or firmware implementation, at least one of the example elements of FIGS. 1-18 is/are hereby expressly defined to include a non-transitory computer readable storage device or storage disk such as a memory, a digital versatile disk (DVD), a compact disk (CD), a Blu-ray disk, etc. including the software and/or firmware. Further still, the elements of FIGS. 1-18 may include one or more elements, processes and/or devices in addition to, or instead of, those illustrated in FIGS. 1-18, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example analytics processor 510 are shown in FIGS. 19-22. The machine readable instructions may be one or more executable programs or portion(s) of an executable program for execution by a computer processor and/or processor circuitry, such as the example analytics processor 510 and/or the example processor platform 2300 discussed below in connection with FIG. 23. The program may be embodied in software stored on a non-transitory computer readable storage medium such as a CD-ROM, a floppy disk, a hard drive, a DVD, a Blu-ray disk, or a memory associated with the processor 2312, but the entire program and/or parts thereof could alternatively be executed by a device other than the processor 2312 and/or embodied in firmware or dedicated hardware. Further, although the example program is described with reference to the flowcharts illustrated in FIGS. 19-22, many other methods of implementing the example analytics processor 510 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 19-22 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 19:
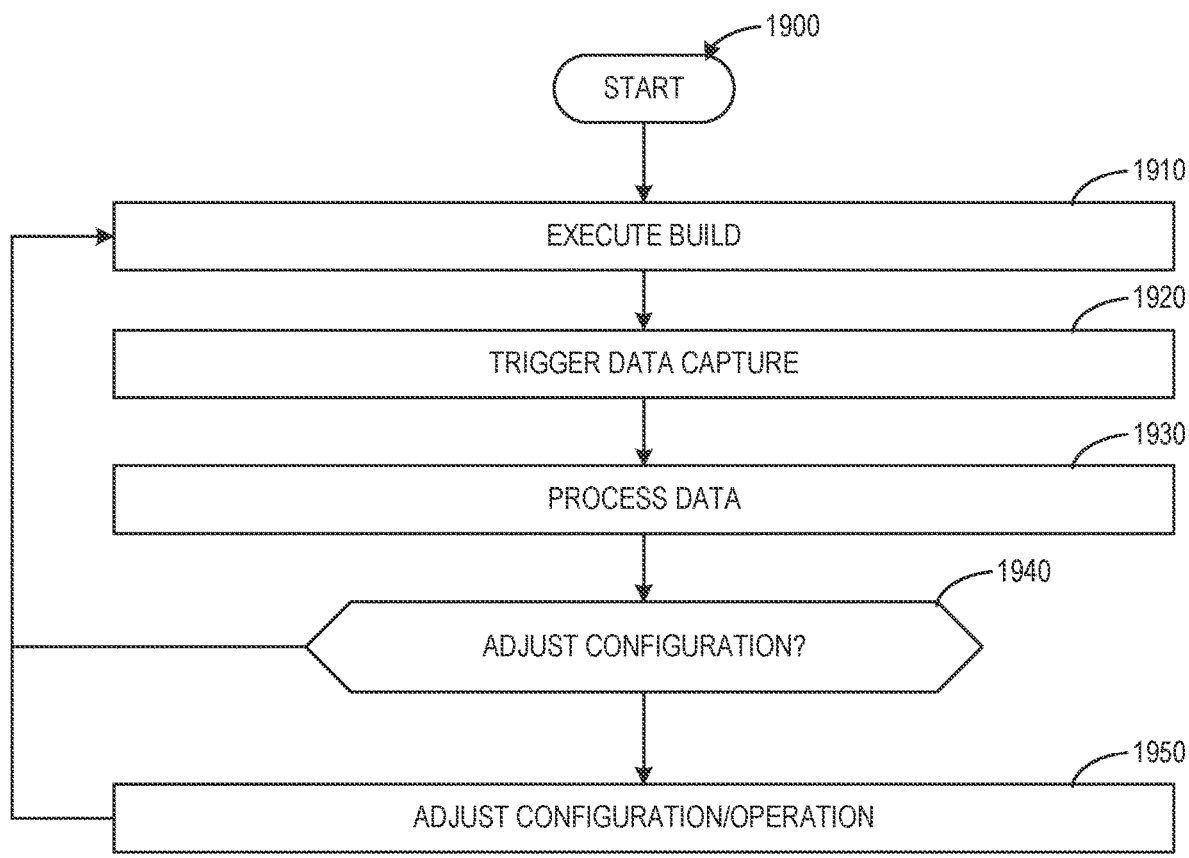
FIGS. 19-22 are flow diagrams representative of example hardware logic, machine readable instructions, hardware implemented state machines, and/or any combination thereof for implementing the example analytics processor.

FIG. 19 is a flow diagram of another example method 1900 to control an additive manufacturing machine, process, and/or build. At block 1910, a build is executed by the additive machine 100 using instructions from the additive machine controller 120. For example, the additive manufacturing machine 100 builds a part using EBM, DMLM, etc., according to settings and schematics provided by the controller 120.

At block 1920, data capture for the build and/or associated additive manufacturing machine 100 is triggered. For example, the analytics processor 510 may be periodically monitoring the additive machine 100 and/or the additive machine controller 120, and occurrence of an event, a data value, etc., outside a normal or expected range (e.g., varying from the observed trend for the build, deviating from an established margin for error, range, or threshold, shift from the programmed build configuration, etc.) triggers more complete recording and analytics of the build/machine. A spike in temperature (increase or decrease), change in motor torque data, change in meltpool image, other sensor data deviation, etc., indicates to the analytics processor 510 that the build process and/or other additive manufacturing machine 100 operation may be abnormal. As such, further data is collected and/or otherwise captured for processing.

At block 1930, captured data is processed by the analytics processor 510. For example, the data is aggregated by the example aggregator 602, and provided to one or more of the analytics containers 614 depending on the additive manufacturing machine 100, the build, the type of process, associated licensing requirements determined by the licensing processor 616, etc. The one or more analytics containers 614 process the data using one or more models, rules, computations, etc., to determine a result such as build health, process health, machine health, etc., on a layer-wise and/or overall build/process/machine basis.

At block 1940, a result is evaluated to determine whether a configuration of the additive machine 100 is to be adjusted. For example, the result may indicate normal operation or operation within tolerances or acceptable limits such that no adjustment is warranted. Alternatively, the result may be indicative of abnormal or erroneous operation affecting (or potentially affecting) build quality, safety, etc.

When the configuration is to be adjusted, then, at block 1950, a configuration of the additive machine 100 is adjusted. For example, the analytics processor 510 sends instructions/commands to adjust the configuration and/or sends an updated configuration/settings to the additive machine controller 120 to adjust operation of the additive machine 100 and/or its build as determined by the analysis of the analytics processor 510. Alternatively or additionally, the analytics processor 510 can communicate directly with the additive machine 100 to adjust the additive machine 100. Alternatively or additionally, the analytics processor 510 can communicate with the machine controller 120 to adjust operation of the controller 120 in response to analysis. Control then reverts to block 1910 to continue the build.

Figure 20:
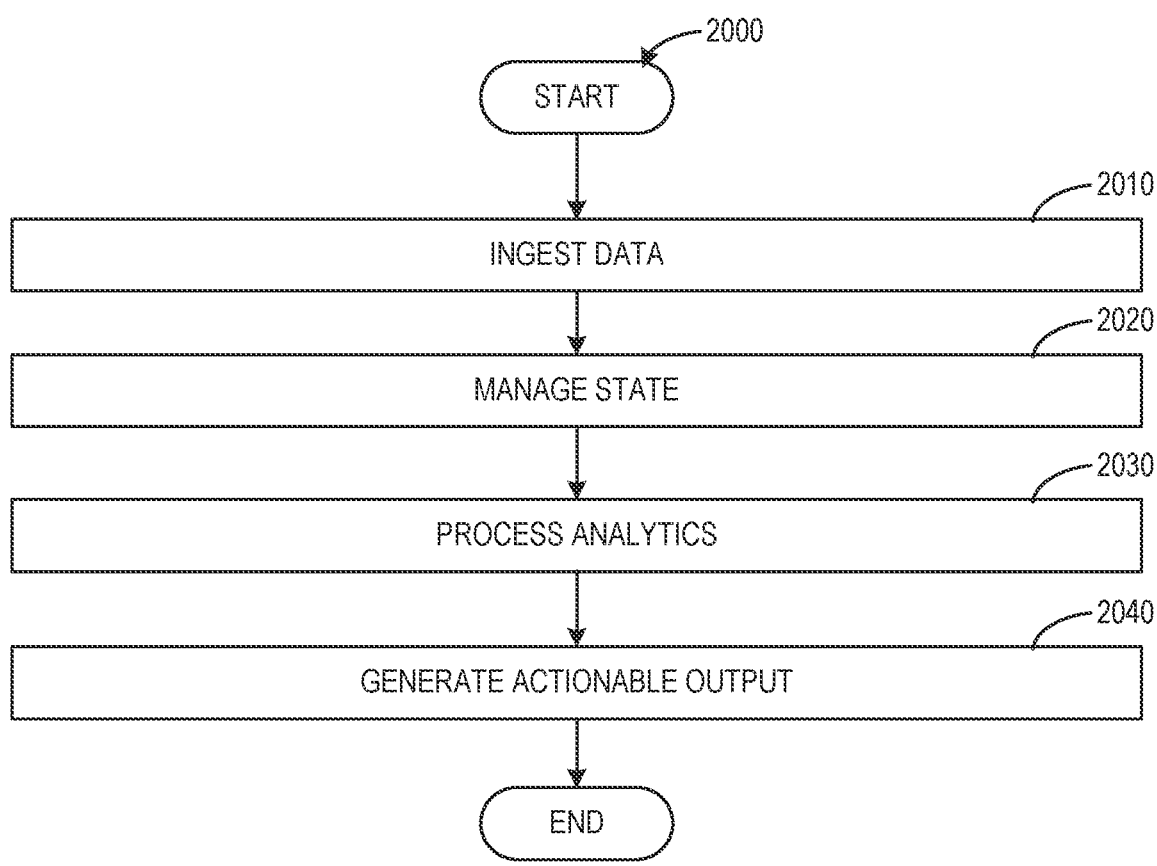

FIG. 20 is a flow diagram of an example method 2000 for monitoring, determining, and adjusting health of an additive manufacturing machine, process, and/or build, such as using the example analytics processor 510. At block 2010, data is ingested. For example, control events, build metadata, before and after recoat images, meltpool time-series data, sensor data, motor data, etc., are provided to the analytics processor 510 during and/or after a build.

At block 2020, additive manufacturing machine 100 and/or process state is managed. For example, the ingested data is aggregated by the example aggregator 602, and provided to one or more of the analytics containers 614 depending on the additive manufacturing machine 100, the build, the type of process, associated licensing requirements determined by the licensing processor 616, etc.

At block 2030, the one or more analytics containers 614 process the data using one or more models, rules, computations, etc., to determine build health, process health, machine health, etc., on a layer-wise and/or overall build/process/machine basis. Output(s)/outcome(s) of the analytics can be provided to the aggregator 602, the HMI backend 618, the file storage 612, etc.

At block 2040, output is generated and provided. For example, one or more visualizations, interactive dashboards, etc., can be provided via the HMI backend 618 and the HMI 620. One or more adjustments, changes in setting/parameter/configuration, etc., can be provided to the additive machine controller 120, the additive machine 100, etc.

As such, for a given build and/or the additive machine 100, data capture can be triggered to increase a volume of data gathered from the additive manufacturing machine 100 and analyzed (e.g., referred to herein as hyper-logging). Hyper-logging can be pre-programmed for a specific area, geometry section, and/or other sensitive area of a build. Hyper-logging can be automatically enabled based on SPC/quality scoring, for example. In certain examples, a build simulation, distortion prediction, etc., can be used to pre-identify areas for hyper-logging.

For example, the additive manufacturing machine 100 can include over one thousand sensors (e.g., 1200, 1300, etc.), for which continuous data logging is impractical or impossible due to storage space constraints. However, as one or more build performance and/or quality metrics begin to indicate an issue based on periodic or more limited gathering of data, increased/enhanced data logging (hyper-logging) can be enabled to capture more data (e.g., from more sensors (e.g., 1000 rather than 500, etc.), at a higher sampling rate (e.g., 50 Hertz rather than 20 Hertz, etc.) to assist in modeling, troubleshooting, and comparison, for example. For certain complex or challenging part geometries, hyper-logging can be configured/enabled before and after certain layers having the sensitive/challenging geometry (e.g., ten layers above and ten layers below a given layer of a heat exchanger part having a downskin contour, etc.).

Based on metrics and scoring, subsystem and/or component health can be predicted. Overall additive manufacturing machine 100 usage can be calculated (e.g., on-time percentage, etc.) to help understand usage-based wear and to trigger predictive maintenance of subsystem components. Based on scoring and analysis, some builds can be corrected, while others can be discarded, saving a waste of resources and post-processing time and reducing bottlenecks. In certain examples, scoring/assessment can be given a confidence factor or ratio comparing the build to other good/successful builds without anomalies.

In certain examples, future hybrid digital/physical models can be generated based on a snapshot of hyper-logged data. As such, development of future models can be accelerated and future predictions can be informed. Certain problem areas (e.g., fuel nozzle, etc.) can be proactively identified and configured for hyper-logging, for example.

When warranted (e.g., based on the gathered data, associated analytics, etc.), adjustments can be made to the current build, future build, and/or the underlying additive machine 100, and the build can continue. Certain examples perform layer-by-layer analysis based on sensor and image data fed into a hybrid model of data science and physics to generate health metrics for the additive machine 100 and the current and/or future build process. Metrics are used to determine a score for the layer and one or more quality scores for the machine. Adjustments can be made based on a) the layer score, b) the machine quality score(s), and/or c) a cumulative assessment over the layer combined with scores from previous layers of the build.

For example, incidents of re-melt, voltage trip events, etc., in successive layers can result in bad (e.g., faulty, weak, error/failure-prone, etc.) microstructure of the part. Monitoring occurrence of such incidents over multiple layers can be scored and drive an assessment of a defect in the build process and resulting defect in the part. Based on the score/assessment, the build can be adjusted to correct the part, stopped to discard the part, modified for future build, etc.

Figure 21:
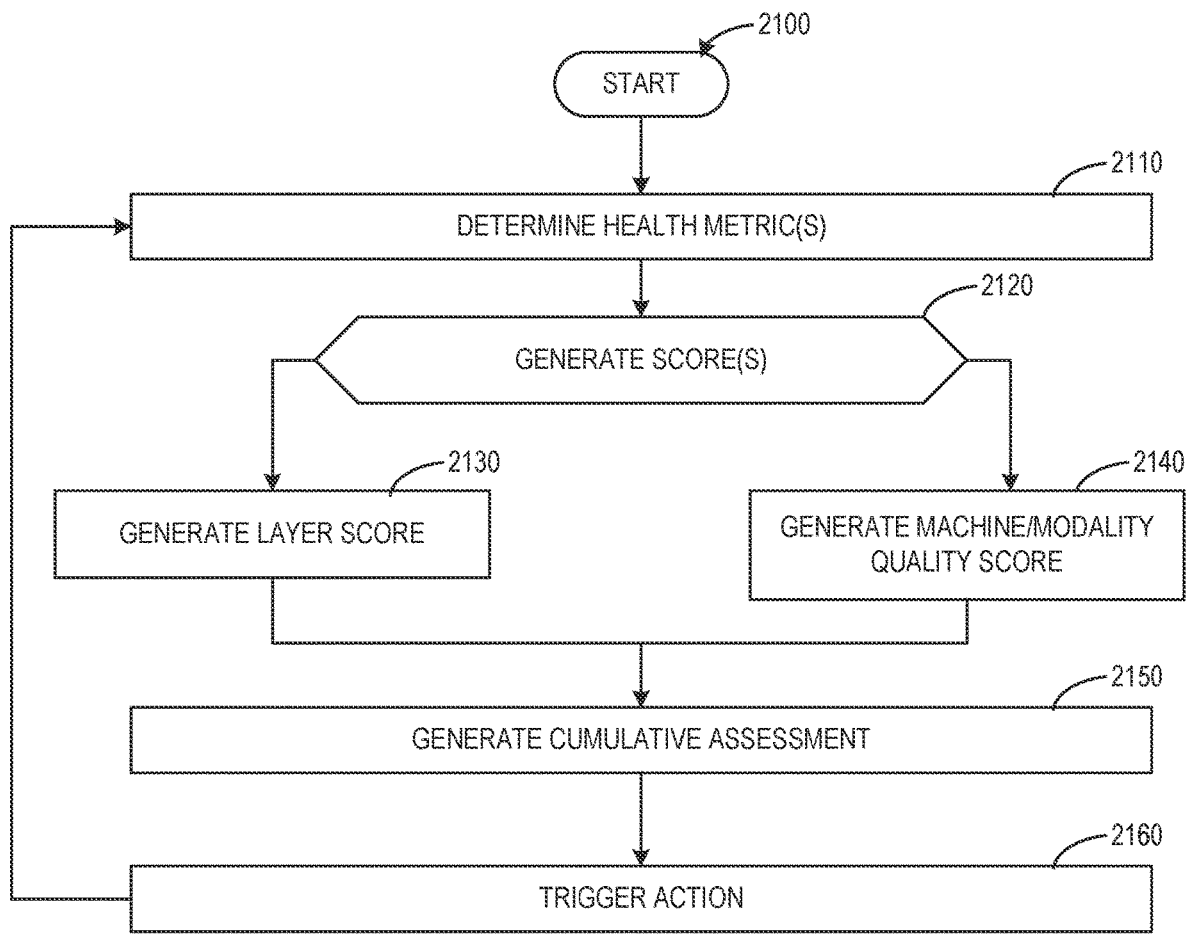

FIG. 21 illustrates an example process 2100 to determine a score and/or other evaluation for a build and/or the associated additive machine 100. At block 2110, one or more health metrics are determined for a build being performed by the additive machine 100. For example, inertization leak, chiller health, process chamber condition, heater condition, filter condition, etc., can be evaluated for a build in the additive machine 100. A value for the health metric can be determined through application of a model (e.g., an ML model, etc.), comparison to a range or threshold (in some example, along with an extent of deviation), etc.

At block 2120, health metrics can be used to generate one or more scores. At block 2130, values for the health metrics are used to generate a score for a layer of the build associated with the health metrics. For example, health metrics associated with the layer can be combined (e.g., using a model, comparison to a range or threshold, evaluation of a degree of deviation, etc.) to determine a layer score. In some examples, certain health metrics can be weighted over other health metrics in the combination forming the layer score.

At block 2140, values for the health metrics are used to generate a quality score for the additive machine 100. For example, health metrics associated with one or more layers, overall build, other machine health, etc., can be combined (e.g., using a model, comparison to a range or threshold, evaluation of a degree of deviation, etc.) to determine a machine quality score. In some examples, certain health metrics can be weighted over other health metrics in the combination forming the machine or modality quality score.

At block 2150, a cumulative assessment is generated using the available scores. For example, individual layer scores combined with the machine quality score can form a cumulative assessment for a state of the build, the additive machine 100, etc.

At block 2160, an action is triggered based on the scores. The ongoing and/or future build can be adjusted based on the assessment and/or on individual scores. For example, one or more parameters associated with the health metrics can be adjusted, other machine 100 and/or build settings can be adjusted, control from the controller 120 can be adjusted, etc., to bring the build and/or machine 100 into better operating condition and/or other compliance with build requirements, targets, quality, performance, etc. In some examples, the additive machine 100 can be initially configured for a certain quality, and the process 2100 can be used to monitor the additive machine 100 to ensure that the machine 100 maintains the desired quality level and adjust the additive manufacturing machine 100, if warranted, to meet the desired quality level (perhaps within a certain tolerance). Configuration can be adjusted based on one or more defined setpoints, thresholds, and/or tolerance and calibration limits, for example. In certain examples, a build can be stopped, the additive manufacturing machine 100 can be taken offline or shut down, etc., if the cumulative assessment determines that the issue(s) cannot be fixed with a modification of parameters, etc.

Figure 22:
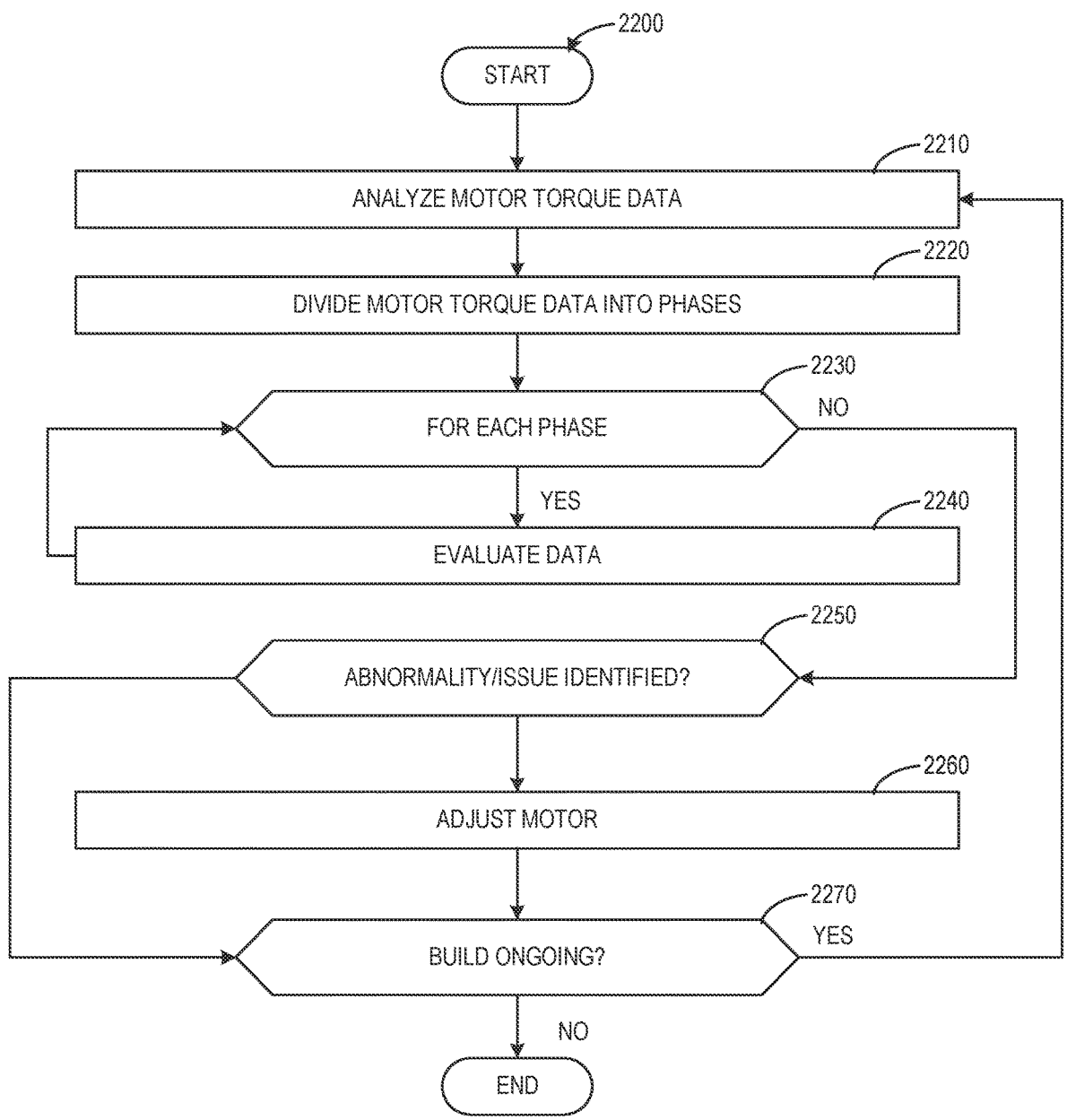

In certain examples, an identified error relates to uneven and/or otherwise defective powder distribution in a powder bed 110 on the build plate 111. FIG. 22 illustrates a flow diagram of an example method 2200 for rake and/or recoater motor adjustment to correct for defects identified in powder distribution. At block 2210, motor torque data is analyzed over the build area 111. For example, data (e.g., torque data) from one or more sensors 150-151 associated with the rake/recoater motor 108 can be gathered and analyzed to determine imperfection(s).

At block 2220, the motor torque data is divided into three phases: fetch, spread, and sweep. For each phase (block 2230), at block 2240, the torque data for each phase is evaluated. For example, the torque data of each phase can be compared to a previously determined ground truth (e.g., indicating a uniform, orderly powder bed 110) for each phase. Each phase has a different criterion to indicate a powder layering defect for that phase: i) a difference in torque based on fetch direction indicates uneven powder fetching, ii) waviness in torque data indicates waviness in the powder bed, and iii) a sudden rise in rake torque indicates part swelling, for example. In certain examples, a maximum torque for each layer can be extracted for each phase. Left to right fetch, right to left fetch, left to right spread, right to left spread, right to left sweep, left to right sweep, etc., can be evaluated, and a torque value greater than a normal and/or standard deviation of motor torque can be identified as an abnormality or problem in a phase, for example.

When an abnormality and/or other issue is identified from the motor torque data (block 2250), then, at block 2260, the motor for the rake and/or recoater 108 can be adjusted. For example, speed, movement, range, timing, etc., can be adjusted during the build and/or maintenance can be triggered to repair and/or replace the rake/recoater 108 (e.g., stopping the build). If the build is ongoing (block 2270), monitoring can continue at block 2210. Otherwise, the method 2200 can end.

Figure 23:
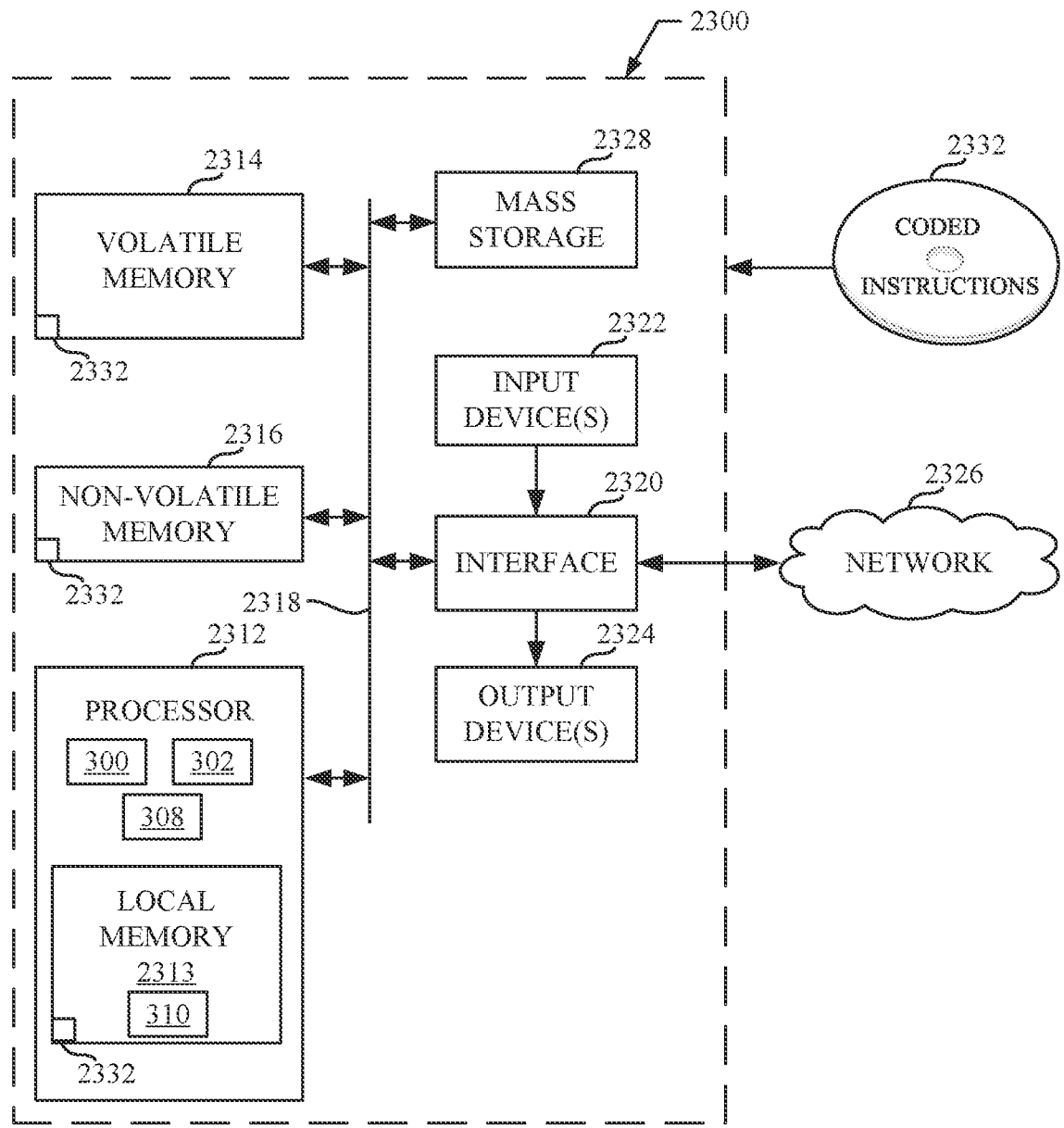
FIG. 23 is a block diagram of an example processing platform including processor circuitry structured to execute the example machine readable instructions of FIGS. 19-22 to implement the example analytics processor.

FIG. 23 is a block diagram of an example processor platform 2300 structured to execute the instructions of FIGS. 19, 20, 21, and/or 22 to implement the example analytics processor 510, etc. The processor platform 2300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2300 of the illustrated example includes a processor 2312. The processor 2312 of the illustrated example is hardware. For example, the processor 2312 can be implemented by one or more integrated circuits, logic circuits, microprocessors, GPUs, DSPs, or controllers from any desired family or manufacturer. The hardware processor may be a semiconductor based (e.g., silicon based) device.

The processor 2312 of the illustrated example includes a local memory 2313 (e.g., a cache and/or other memory circuitry). The processor 2312 of the illustrated example is in communication with a main memory/memory circuitry including a volatile memory 2314 and a non-volatile memory 2316 via a bus 2318. The volatile memory 2314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2316 may be implemented by flash memory and/or any other desired type of memory device/memory circuitry. Access to the main memory 2314, 2316 is controlled by a memory controller.

The processor platform 2300 of the illustrated example also includes an interface circuit 2320. The interface circuit 2320 may be implemented by any type of interface standard, such as an Ethernet interface, a universal serial bus (USB), a Bluetooth® interface, a near field communication (NFC) interface, and/or a PCI express interface.

In the illustrated example, one or more input devices 2322 are connected to the interface circuit 2320. The input device(s) 2322 permit(s) a user to enter data and/or commands into the processor 2312. The input device(s) can be implemented by, for example, an audio sensor, a microphone, a camera (still or video), a keyboard, a button, a mouse, a touchscreen, a track-pad, a trackball, and/or a voice recognition system.

One or more output devices 2324 are also connected to the interface circuit 2320 of the illustrated example. The output devices 2324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 2320 of the illustrated example, thus, typically includes a graphics driver card, a graphics driver chip and/or a graphics driver processor.

The interface circuit 2320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2326. The communication can be via, for example, an Ethernet connection, a digital subscriber line (DSL) connection, a telephone line connection, a coaxial cable system, a satellite system, a line-of-site wireless system, a cellular system, etc.

The processor platform 2300 of the illustrated example also includes one or more mass storage devices 2328 for storing software and/or data. Examples of such mass storage devices 2328 include floppy disk drives, hard drive disks, compact disk drives, Blu-ray disk drives, redundant array of independent disks (RAID) systems, and digital versatile disk (DVD) drives.

The machine executable instructions 2332 of FIGS. 19-22 may be stored in the mass storage device 2328, in the volatile memory 2314, in the non-volatile memory 2316, and/or on a removable non-transitory computer readable storage medium such as a CD or DVD.

Figure 24:
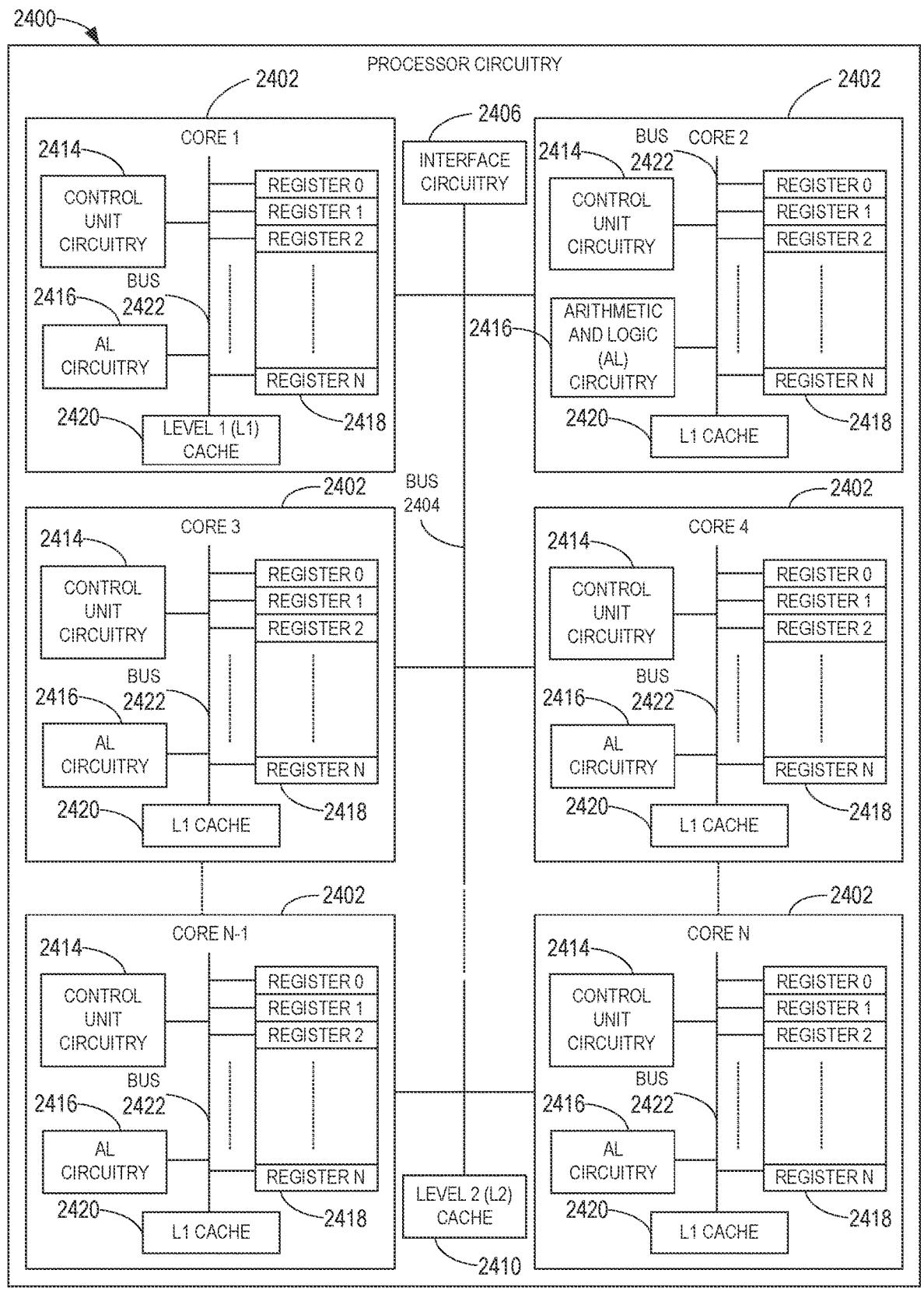
FIG. 24 is a block diagram of an example implementation of the processor circuitry of FIG. 23.

FIG. 24 is a block diagram of an example implementation of the processor circuitry 2312 of FIG. 23. In this example, the processor circuitry 2312 of FIG. 23 is implemented by a microprocessor 2400. For example, the microprocessor 2400 may implement multi-core hardware circuitry such as a CPU, a DSP, a GPU, an XPU, etc. Although it may include any number of example cores 2402 (e.g., 1 core), the microprocessor 2400 of this example is a multi-core semiconductor device including N cores. The cores 2402 of the microprocessor 2400 may operate independently or may cooperate to execute machine readable instructions. For example, machine code corresponding to a firmware program, an embedded software program, or a software program may be executed by one of the cores 2402 or may be executed by multiple ones of the cores 2402 at the same or different times. In some examples, the machine code corresponding to the firmware program, the embedded software program, or the software program is split into threads and executed in parallel by two or more of the cores 2402. The software program may correspond to a portion or all of the machine readable instructions and/or operations represented by the flowcharts of FIGS. 19-22.

The cores 2402 may communicate by an example bus 2404. In some examples, the bus 2404 may implement a communication bus to effectuate communication associated with one(s) of the cores 2402. For example, the bus 2404 may implement at least one of an Inter-Integrated Circuit (I2C) bus, a Serial Peripheral Interface (SPI) bus, a PCI bus, or a PCIe bus. Additionally or alternatively, the bus 2404 may implement any other type of computing or electrical bus. The cores 2402 may obtain data, instructions, and/or signals from one or more external devices by example interface circuitry 2406. The cores 2402 may output data, instructions, and/or signals to the one or more external devices by the interface circuitry 2406. Although the cores 2402 of this example include example local memory 2420 (e.g., Level 1 (L1) cache that may be split into an L1 data cache and an L1 instruction cache), the microprocessor 2400 also includes example shared memory 2410 that may be shared by the cores (e.g., Level 2 (L2_cache)) for high-speed access to data and/or instructions. Data and/or instructions may be transferred (e.g., shared) by writing to and/or reading from the shared memory 2410. The local memory 2420 of each of the cores 2402 and the shared memory 2410 may be part of a hierarchy of storage devices including multiple levels of cache memory and the main memory (e.g., the main memory 2314, 2316 of FIG. 23). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2402 may be referred to as a CPU, DSP, GPU, etc., or any other type of hardware circuitry. Each core 2402 includes control unit circuitry 2414, arithmetic and logic (AL) circuitry (sometimes referred to as an ALU) 2416, a plurality of registers 2418, the L1 cache 2420, and an example bus 2422. Other structures may be present. For example, each core 2402 may include vector unit circuitry, single instruction multiple data (SIMD) unit circuitry, load/store unit (LSU) circuitry, branch/jump unit circuitry, floating-point unit (FPU) circuitry, etc. The control unit circuitry 2414 includes semiconductor-based circuits structured to control (e.g., coordinate) data movement within the corresponding core 2402. The AL circuitry 2416 includes semiconductor-based circuits structured to perform one or more mathematic and/or logic operations on the data within the corresponding core 2402. The AL circuitry 2416 of some examples performs integer based operations. In other examples, the AL circuitry 2416 also performs floating point operations. In yet other examples, the AL circuitry 2416 may include first AL circuitry that performs integer based operations and second AL circuitry that performs floating point operations. In some examples, the AL circuitry 2416 may be referred to as an Arithmetic Logic Unit (ALU). The registers 2418 are semiconductor-based structures to store data and/or instructions such as results of one or more of the operations performed by the AL circuitry 2416 of the corresponding core 2402. For example, the registers 2418 may include vector register(s), SIMD register(s), general purpose register (s), flag register(s), segment register(s), machine specific register(s), instruction pointer register(s), control register(s), debug register(s), memory management register(s), machine check register(s), etc. The registers 2418 may be arranged in a bank as shown in FIG. 24. Alternatively, the registers 2418 may be organized in any other arrangement, format, or structure including distributed throughout the core 2402 to shorten access time. The bus 2422 may implement at least one of an I2C bus, a SPI bus, a PCI bus, or a PCIe bus Each core 2402 and/or, more generally, the microprocessor 2400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 25:
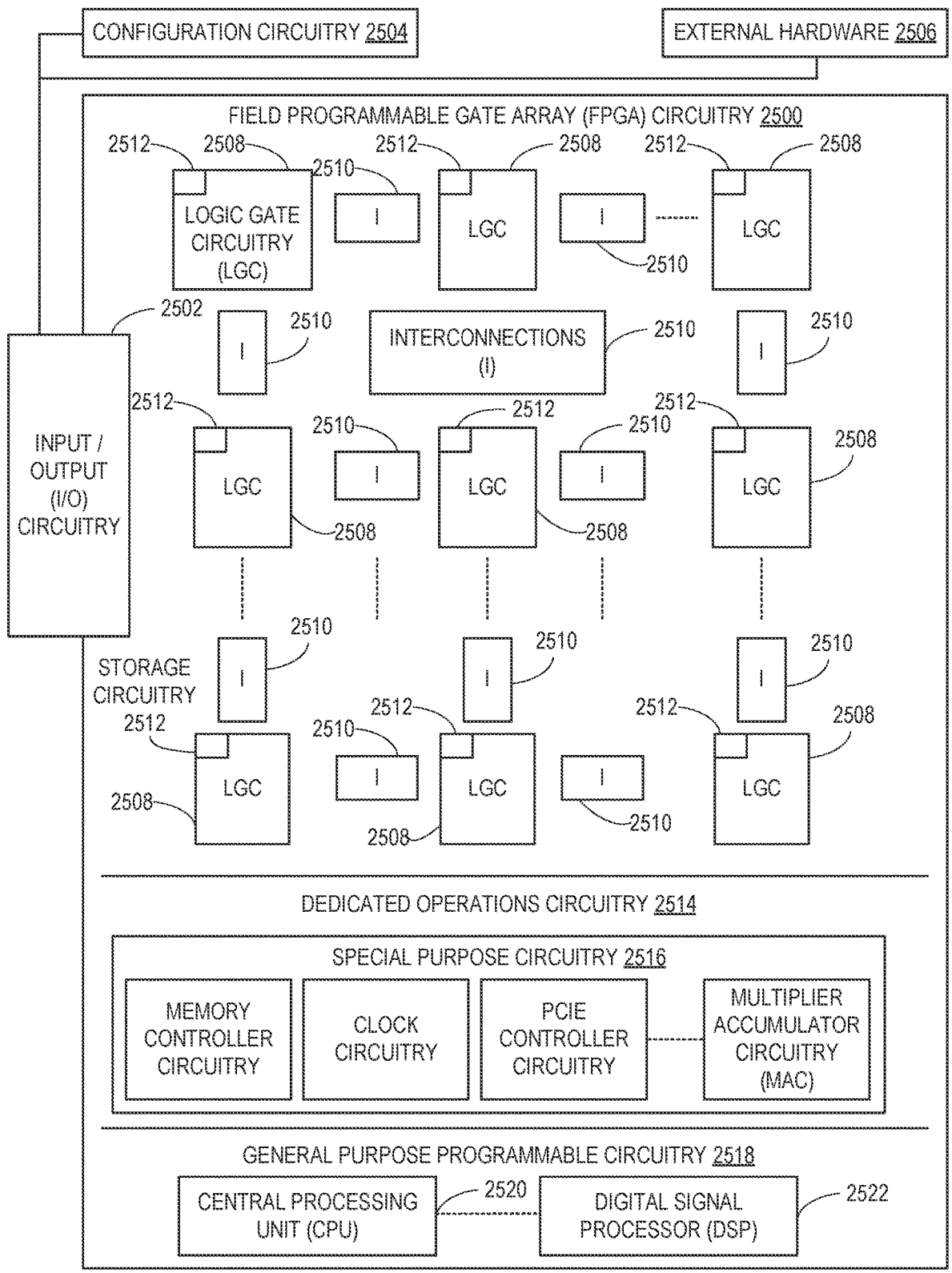
FIG. 25 is a block diagram of another example implementation of the processor circuitry of FIG. 23.

FIG. 25 is a block diagram of another example implementation of the processor circuitry 2312 of FIG. 23. In this example, the processor circuitry 2312 is implemented by FPGA circuitry 2500. The FPGA circuitry 2500 can be used, for example, to perform operations that could otherwise be performed by the example microprocessor 2400 of FIG. 24 executing corresponding machine readable instructions. However, once configured, the FPGA circuitry 2500 instantiates the machine readable instructions in hardware and, thus, can often execute the operations faster than they could be performed by a general purpose microprocessor executing the corresponding software.

More specifically, in contrast to the microprocessor 2400 of FIG. 24 described above (which is a general purpose device that may be programmed to execute some or all of the machine readable instructions represented by the flowcharts of FIGS. 19-22 but whose interconnections and logic circuitry are fixed once fabricated), the FPGA circuitry 2500 of the example of FIG. 25 includes interconnections and logic circuitry that may be configured and/or interconnected in different ways after fabrication to instantiate, for example, some or all of the machine readable instructions represented by the flowcharts of FIGS. 19-22. In particular, the FPGA 2500 may be thought of as an array of logic gates, interconnections, and switches. The switches can be programmed to change how the logic gates are interconnected by the interconnections, effectively forming one or more dedicated logic circuits (unless and until the FPGA circuitry 2500 is reprogrammed). The configured logic circuits enable the logic gates to cooperate in different ways to perform different operations on data received by input circuitry. Those operations may correspond to some or all of the software represented by the flowcharts of FIGS. 19-22. As such, the FPGA circuitry 2500 may be structured to effectively instantiate some or all of the machine readable instructions of the flowcharts of FIGS. 19-22 as dedicated logic circuits to perform the operations corresponding to those software instructions in a dedicated manner analogous to an ASIC. Therefore, the FPGA circuitry 2500 may perform the operations corresponding to the some or all of the machine readable instructions of FIGS. 19-22 faster than the general purpose microprocessor can execute the same.

In the example of FIG. 25, the FPGA circuitry 2500 is structured to be programmed (and/or reprogrammed one or more times) by an end user by a hardware description language (HDL) such as Verilog. The FPGA circuitry 2500 of FIG. 25, includes example input/output (I/O) circuitry 2502 to obtain and/or output data to/from example configuration circuitry 2504 and/or external hardware (e.g., external hardware circuitry) 2506. For example, the configuration circuitry 2504 may implement interface circuitry that may obtain machine readable instructions to configure the FPGA circuitry 2500, or portion(s) thereof. In some such examples, the configuration circuitry 2504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2506 may implement the microprocessor 2400 of FIG. 24. The FPGA circuitry 2500 also includes an array of example logic gate circuitry 2508, a plurality of example configurable interconnections 2510, and example storage circuitry 2512. The logic gate circuitry 2508 and interconnections 2510 are configurable to instantiate one or more operations that may correspond to at least some of the machine readable instructions of FIGS. 19-22 and/or other desired operations. The logic gate circuitry 2508 shown in FIG. 25 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2508 to enable configuration of the electrical structures and/or the logic gates to form circuits to perform desired operations. The logic gate circuitry 2508 may include other electrical structures such as look-up tables (LUTs), registers (e.g., flip-flops or latches), multiplexers, etc.

The interconnections 2510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2508 to program desired logic circuits.

The storage circuitry 2512 of the illustrated example is structured to store result(s) of the one or more of the operations performed by corresponding logic gates. The storage circuitry 2512 may be implemented by registers or the like. In the illustrated example, the storage circuitry 2512 is distributed amongst the logic gate circuitry 2508 to facilitate access and increase execution speed.

The example FPGA circuitry 2500 of FIG. 25 also includes example Dedicated Operations Circuitry 2514. In this example, the Dedicated Operations Circuitry 2514 includes special purpose circuitry 2516 that may be invoked to implement commonly used functions to avoid the need to program those functions in the field. Examples of such special purpose circuitry 2516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2500 may also include example general purpose programmable circuitry 2518 such as an example CPU 2520 and/or an example DSP 2522. Other general purpose programmable circuitry 2518 may additionally or alternatively be present such as a GPU, an XPU, etc., that can be programmed to perform other operations.

As such, the example FPGA circuitry 2500 can be used to (re)align and/or calibrate multi-laser alignment, stitching, other aspect of additive build execution, programming, etc., In certain examples, the FPGA circuitry 2500 can be used for scoring and data processing, together and/or in further combination with hyper-logging of data/events, etc.

Although FIGS. 24 and 25 illustrate two example implementations of the processor circuitry 2312 of FIG. 23, many other approaches are contemplated. For example, as mentioned above, modern FPGA circuitry may include an onboard CPU, such as one or more of the example CPU 2520 of FIG. 25. Therefore, the processor circuitry 2312 of FIG. 23 may additionally be implemented by combining the example microprocessor 2400 of FIG. 24 and the example FPGA circuitry 2500 of FIG. 25. In some such hybrid examples, a first portion of the machine readable instructions represented by the flowcharts of FIGS. 19-22 may be executed by one or more of the cores 2402 of FIG. 24 and a second portion of the machine readable instructions represented by the flowcharts of FIGS. 19-22 may be executed by the FPGA circuitry 2500 of FIG. 25.

In certain examples, the FPGA circuitry 2500 is leveraged for edge computing. In certain examples, the FPGA circuitry 2500 is implemented in conjunction with the analytics processor 510 for improved timeliness and/or data fusion. A TPM can also be incorporated to provide and enable hardware and/or software root of trust security for stronger compute/memory/CPU.GPU/etc., at a second/sub-second time constraint. The FPGA provides millisecond analysis and response such that some data can flow to the FGPA 2500 and some data flows to the analytics processor 510 to provide a quicker response from the FPGA 2500 and possibly a slower response from the analytics processor 510. In certain examples, a connection between the FPGA 2500 and the analytics processor 510 allows insights from the FPGA 2500 to flow to the analytics processor 510 to improve the detection and correction of errors by the analytics processor 510.

As such, varying hardware, firmware, and/or software configuration(s) can be used to satisfy time constraints for a particular issue (e.g., a real-time layerwise build correction issue, etc.). Fusion of data as well as metadata insights (e.g., from the FPGA, etc.), can inform the digital record and 'signature' or fingerprint of a build, which can flow from the FPGA with detections and actions to be part of the build record in the example aggregator module 602 of the analytics processor 510. The FPGA 2500 and/or the analytics processor 510 can utilize a TPM and/or other security element. A combination of millisecond, subsecond, and second time constraints, data analysis, and closed loop controls can more fully define a build's digital pedigree from which build-to-build analysis can be useful and informative.

As such, build variability can be accommodated by the analytics processor 510 and associated framework.

In certain examples, the additive manufacturing machine 100 (with or without the machine controller 120) implements a means for building a part. The analytics processor 510 (with or without the meltpool data acquisition controller 520 and/or the interface 530) implements a means for analyzing the means for building.

It should now be understood that that the devices, systems, and methods described herein monitor, determine, and adjust health of an additive manufacturing device and/or an associated process, build, etc. The systems and methods ingest data, manage state, process analytics, and generate an actionable output for layer-wise, multi-layer, build-wise, and machine-wise adjustment. Such monitoring, processing, and adjustment is not possible manually and relies on an analytics processor to achieve. In addition, the systems and methods according to the present disclosure enhances the accuracy of diagnosing builds and/or additive manufacturing device by determining and reacting to specific and overall health of the machine, process, and/or build. Further, incorporating such functionality into the additive manufacturing machine itself risks unacceptable load, exposure, and associated risk for corruption, faulty parts, and inoperability due to a multitude of factors including volume of data, processing power for modeling and analysis, security concerns, etc. An adaptive monitoring, analytics, and adjustment approach for parts of varying geometry increases build robustness, part integrity, and dynamic process improvement for current and future builds, for example.

Further examples and combinations thereof are provided by the subject matter of the following clauses:

An example apparatus includes: an additive manufacturing machine to build a part, the additive manufacturing machine including first processor circuitry and first memory circuitry; and an analytics processor, separate from and in a trusted relationship with the additive manufacturing machine, to process, based on a trigger, data from monitoring of the additive manufacturing machine and the build of the part, the analytics processor including a hybrid model fusing additive process physics and data science to process the data to identify an abnormality in at least one of the build or the additive manufacturing machine and to adjust a configuration of the additive manufacturing machine during the build to address the abnormality, the analytics processor including second processor circuitry and second memory circuitry.

The apparatus of any preceding clause, further including an additive machine controller to interact with the analytics processor to adjust at least one of the configuration of the additive manufacturing machine or the build.

The apparatus of any preceding clause, wherein the analytics processor includes a least one container to securely process and model adjustments based on the data.

The apparatus of any preceding clause, wherein the analytics processor is to process the data according to at least one parameter, the at least one parameter weighted in the processing according to at least one sensitivity slider.

The apparatus of any preceding clause, wherein the data includes at least one of meltpool time series data or image data.

The apparatus of any preceding clause, wherein the image data includes at least one of a rake image or a recoater image.

The apparatus of any preceding clause, wherein the abnormality includes an abnormal powder distribution, wherein the data includes motor torque data for at least one of a rake or a recoater, and wherein the analytics processor identifies the abnormality based on analysis of the motor torque data, the analytics processor to adjust the at least one of the rake or the recoater to address the abnormality.

The apparatus of any preceding clause, wherein the identifying and adjusting by the analytics processor occurs on a layer-wise basis, the data relating to a plurality of layers of the build of the part.

The apparatus of any preceding clause, wherein the analytics processor is to identify the abnormality based on health metrics, at least one of a layer score or a machine quality score determined based on the health metrics, and a cumulative assessment based on the at least one of the layer score or the machine quality score.

The apparatus of any preceding clause, wherein the cumulative assessment and associated scores are tracked over time to determine a deviation which triggers maintenance.

The apparatus of any preceding clause, wherein the additive manufacturing machine is to build the part in a first process, the analytics processor is to process the data in a second process, and the analytics processor is to adjust the additive manufacturing machine to a third process.

The apparatus of any preceding clause, further including a graphical user interface to display information about the build including layers of the build and indicators providing a status regarding at least one of parameters or metrics associated with at least one of the build or the additive manufacturing machine, the graphical user interface interactive to retrieve additional information and interact with settings associated with the at least one of parameters or metrics.

The apparatus of any preceding clause, wherein the analytics processor includes a trusted platform module.

The apparatus of any preceding clause, further including at least one sensor to obtain the data.

A non-transitory computer readable storage medium including instructions which, when executed, cause a processor to at least: process, based on a trigger, data from monitoring of an additive manufacturing machine building a part, the processor separate from and in a trusted relationship with the additive manufacturing machine; identify, using a hybrid model fusing additive process physics and data science to process the data, an abnormality in at least one of the building of the part or the additive manufacturing machine; and adjust a configuration of the additive manufacturing machine during the build to address the abnormality.

The non-transitory computer readable storage medium of any preceding clause, wherein the instructions, when executed, cause the processor to process the data according to at least one parameter, the at least one parameter weighted in the processing according to at least one sensitivity slider.

The non-transitory computer readable storage medium of any preceding clause, wherein the instructions, when executed, cause the processor to identify the abnormality including an abnormal powder distribution, wherein the data includes motor torque data for at least one of a rake or a recoater, and wherein the processor identifies the abnormality based on analysis of the motor torque data, the processor to adjust the at least one of the rake or the recoater to address the abnormality.

The non-transitory computer readable storage medium of any preceding clause, wherein the instructions, when executed, cause the processor to identify and adjust on a layer-wise basis, the data relating to a plurality of layers of the building of the part.

The non-transitory computer readable storage medium of any preceding clause, wherein the instructions, when executed, cause the processor to identify the abnormality based on health metrics, at least one of a layer score or a machine quality score determined based on the health metrics, and a cumulative assessment based on the at least one of the layer score or the machine quality score.

An example method includes: processing, based on a trigger and using a processor, data from monitoring of an additive manufacturing machine building a part, the processor separate from and in a trusted relationship with the additive manufacturing machine; identifying, using the processor with a hybrid model fusing additive process physics and data science to process the data, an abnormality in at least one of the building of the part or the additive manufacturing machine; and adjusting, using the processor, a configuration of the additive manufacturing machine during the build to address the abnormality.

An example apparatus includes: means for building a part; and means for analyzing the means for building, wherein the means for analyzing is separate from and in a trusted relationship with the means for building, to process, based on a trigger, data from monitoring of the means for building and the build of the part, the means for analyzing to process the data to identify an abnormality in at least one of the build or the means for building and to adjust a configuration of the means for building during the build to address the abnormality.

An example apparatus or method of any preceding clause, further including hyper-logging based on a trigger.

An example apparatus or method of any preceding clause, wherein the trigger is generated by at least one of a metric value or a model.

An example apparatus or method of any preceding clause, wherein the analysis includes a combination of layer-wise and multi-layer analysis.

An example apparatus or method of any preceding clause, wherein the analysis varies based on a geometry of the part.

An example apparatus or method of any preceding clause, further including a plurality of models running in a plurality of containers, an output of the respective models to be compared to select an adjustment to the configuration.

An example apparatus of any preceding clause, further including one or more trusted platform modules to establish the trusted relationship.

An example apparatus of any preceding clause, further including a plurality of analytics processors.

An example apparatus of any preceding clause, wherein the analytics processor includes a field programmable gate array.

While particular examples have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus comprising:
    an additive manufacturing machine to build a part, the additive manufacturing machine including first processor circuitry and first memory circuitry; and
    an analytics processor, separate from the additive manufacturing machine, the processor and the additive manufacturing machine configured with a root of trust between the analytics processor and the additive manufacturing machine to secure communication between the analytics processor and the additive manufacturing machine, the analytics processor to process, based on a trigger, data from monitoring of the additive manufacturing machine and the ongoing build of the part, the analytics processor including a hybrid model, the hybrid model fusing additive process physics and data science by combining an additive process physics module and a data science module, the hybrid model to process the data by computing, using the additive process physics module, physics-based metrics from the data that are analyzed by the data science module to identify an abnormality in at least one of the ongoing build or the additive manufacturing machine and to adjust a configuration of the additive manufacturing machine during the build to address the abnormality, the analytics processor including second processor circuitry and second memory circuitry.

2. The apparatus of claim 1, further including an additive machine controller to interact with the analytics processor to adjust at least one of the configuration of the additive manufacturing machine or the build.

3. The apparatus of claim 1, wherein the analytics processor includes at least one container to securely process and model adjustments based on the data.

4. The apparatus of claim 1, wherein the analytics processor is to process the data according to at least one parameter, the at least one parameter weighted in the processing according to at least one sensitivity slider.

5. The apparatus of claim 1, wherein the data includes at least one of meltpool time series data or image data.

6. The apparatus of claim 5, wherein the image data includes at least one of a rake image or a recoater image.

7. The apparatus of claim 1, wherein the abnormality includes an abnormal powder distribution, wherein the data includes motor torque data for at least one of a rake or a recoater, and wherein the analytics processor identifies the abnormality based on analysis of the motor torque data, the analytics processor to adjust the at least one of the rake or the recoater to address the abnormality.

8. The apparatus of claim 1, wherein the identifying and adjusting by the analytics processor occurs on a layer-wise basis, the data relating to a plurality of layers of the build of the part.

9. The apparatus of claim 1, wherein the analytics processor is to identify the abnormality based on health metrics, at least one of a layer score or a machine quality score determined based on the health metrics, and a cumulative assessment based on the at least one of the layer score or the machine quality score.

10. The apparatus of claim 9, wherein the cumulative assessment and associated scores are tracked over time to determine a deviation which triggers maintenance.

11. The apparatus of claim 1, wherein the additive manufacturing machine is to build the part in a first process, the analytics processor is to process the data in a second process, and the analytics processor is to adjust the additive manufacturing machine to a third process.

12. The apparatus of claim 1, further including a graphical user interface to display information about the build including layers of the build and indicators providing a status regarding at least one of parameters or metrics associated with at least one of the build or the additive manufacturing machine, the graphical user interface interactive to retrieve additional information and interact with settings associated with the at least one of parameters or metrics.

13. The apparatus of claim 1, wherein the analytics processor includes a trusted platform module to establish the root of trust.

14. The apparatus of claim 1, further including at least one sensor to obtain the data.

15. A non-transitory computer readable storage medium comprising instructions which, when executed, cause a processor to at least:
process, based on a trigger, data from monitoring of an additive manufacturing machine building a part, the processor separate from the additive manufacturing machine, the processor and the additive manufacturing machine configured with a root of trust between the processor and the additive manufacturing machine to secure communication between the processor and the additive manufacturing machine;
identify, using a hybrid model fusing additive process physics and data science to process the data, an abnormality in at least one of the building of the part or the additive manufacturing machine, the hybrid model fusing additive process physics and data science by combining an additive process physics module and a data science module, the hybrid model to process the data by computing, using the additive process physics module, physics-based metrics from the data that are analyzed by the data science module to identify the abnormality; and
adjust a configuration of the additive manufacturing machine during the build to address the abnormality.

16. The non-transitory computer readable storage medium of claim 15, wherein the instructions, when executed, cause the processor to process the data according to at least one parameter, the at least one parameter weighted in the processing according to at least one sensitivity slider.

17. The non-transitory computer readable storage medium of claim 15, wherein the instructions, when executed, cause the processor to identify the abnormality including an abnormal powder distribution, wherein the data includes motor torque data for at least one of a rake or a recoater, and wherein the processor identifies the abnormality based on analysis of the motor torque data, the processor to adjust the at least one of the rake or the recoater to address the abnormality.

18. The non-transitory computer readable storage medium of claim 15, wherein the instructions, when executed, cause the processor to identify and adjust on a layer-wise basis, the data relating to a plurality of layers of the building of the part.

19. The non-transitory computer readable storage medium of claim 15, wherein the instructions, when executed, cause the processor to identify the abnormality based on health metrics, at least one of a layer score or a machine quality score determined based on the health metrics, and a cumulative assessment based on the at least one of the layer score or the machine quality score.

20. A method comprising:
processing, based on a trigger and using a processor, data from monitoring of an additive manufacturing machine building a part, the processor separate from the additive manufacturing machine, the processor and the additive manufacturing machine configured with a root of trust between the processor and the additive manufacturing machine to secure communication between the processor and the additive manufacturing machine;
identifying, using the processor with a hybrid model fusing additive process physics and data science to process the data, an abnormality in at least one of the building of the part or the additive manufacturing machine, the hybrid model fusing additive process physics and data science by combining an additive process physics module and a data science module, the hybrid model to process the data by computing, using the additive process physics module, physics-based metrics from the data that are analyzed by the data science module to identify the abnormality; and adjusting, using the processor, a configuration of the additive manufacturing machine during the build to address the abnormality.

* * * * *